United States Patent
Phallen et al.

(10) Patent No.: US 7,861,740 B2
(45) Date of Patent: Jan. 4, 2011

(54) DIGITAL FLOW CONTROL

(75) Inventors: Iver J. Phallen, Youngstown, NY (US); Douglas Vogt, Grand Island, NY (US)

(73) Assignee: Niagara Dispensing Technologies, Inc., Amherst, NY (US)

( * ) Notice: Subject to any disclaimer, the term of this patent is extended or adjusted under 35 U.S.C. 154(b) by 646 days.

(21) Appl. No.: 11/611,837

(22) Filed: Dec. 15, 2006

(65) Prior Publication Data
US 2007/0187438 A1    Aug. 16, 2007

Related U.S. Application Data

(60) Provisional application No. 60/751,120, filed on Dec. 15, 2005.

(51) Int. Cl.
*F16K 31/02* (2006.01)
(52) U.S. Cl. ............... 137/487.5; 137/613; 137/614.11
(58) Field of Classification Search ............. 137/487.5, 137/613, 614.11
See application file for complete search history.

(56) References Cited

U.S. PATENT DOCUMENTS

| | | | |
|---|---|---|---|
| 1,667,141 A * | 4/1928 | Crowley | .................. 137/613 |
| 1,707,630 A | 4/1929 | Erceg | |
| 2,143,585 A | 1/1939 | Minea | |
| 2,210,634 A | 8/1940 | Rice | |
| 2,225,996 A | 12/1940 | Johnson | |
| 2,284,135 A | 5/1942 | Cornelius | |
| 2,313,550 A | 3/1943 | Huber | |
| 2,450,315 A | 9/1948 | Vetrano | |
| 2,568,084 A * | 9/1951 | Mockridge | ............. 137/614.11 |
| 2,810,407 A | 10/1957 | Carlisi et al. | |

(Continued)

FOREIGN PATENT DOCUMENTS

DE    35 15 762    5/1985

(Continued)

OTHER PUBLICATIONS

PCT/US2006/062198, Notification of Transmittal of The International Search Report and the Written Opinion of the International Searching Authority, or the Declaration, mailed Nov. 14, 2007.

(Continued)

*Primary Examiner*—John Rivell
*Assistant Examiner*—William McCalister
(74) *Attorney, Agent, or Firm*—Fish & Richardson P.C.

(57) ABSTRACT

A digital flow control assembly for controlling the volumetric flow rate of fluids includes a fluid flow conduit, a plurality of serially-arranged flow nodes positioned along a length of the fluid flow conduit, and a device for generating a signal. The device for generating a signal is used to adjust one or more of the plurality of serially-arranged flow nodes to maintain a desired volumetric flow rate of fluid in the fluid flow conduit. A method for controlling the volumetric flow rate of fluids includes providing a fluid flow conduit, providing a plurality of serially-arranged flow nodes positioned along a length of the fluid flow conduit, and providing a feedback signal to adjust one or more of the plurality of serially-arranged flow nodes to maintain a desired volumetric flow rate of fluid in the fluid flow conduit.

38 Claims, 48 Drawing Sheets

U.S. PATENT DOCUMENTS

| | | | |
|---|---|---|---|
| 2,924,238 A | 2/1960 | Cornelius | |
| 3,084,718 A | 4/1963 | Ash | |
| 3,107,705 A | 10/1963 | Isserstedt | |
| 3,195,788 A | 7/1965 | Wilson | |
| 3,468,342 A | 9/1969 | Craft | |
| 3,497,175 A * | 2/1970 | Koland | 251/9 |
| 3,857,277 A | 12/1974 | Moore | |
| 3,881,636 A | 5/1975 | D'Aubreby | |
| 4,094,445 A | 6/1978 | Bevan | |
| 4,120,425 A | 10/1978 | Bethurum | |
| 4,171,006 A | 10/1979 | Steere, Jr. | |
| 4,180,235 A | 12/1979 | Pasternack | |
| 4,231,397 A | 11/1980 | Te Riele | |
| 4,456,030 A | 6/1984 | Bogossian | |
| 4,501,405 A | 2/1985 | Usry | |
| 4,517,651 A | 5/1985 | Kawasaki et al. | |
| 4,648,421 A | 3/1987 | Chant et al. | |
| 4,750,646 A | 6/1988 | Gerich | |
| 4,850,387 A | 7/1989 | Bassill | |
| 4,869,396 A | 9/1989 | Horino et al. | |
| 4,886,190 A | 12/1989 | Kirschner et al. | |
| 4,917,348 A | 4/1990 | Phallen et al. | |
| 4,991,628 A | 2/1991 | Makela et al. | |
| 5,000,352 A | 3/1991 | Cleland | |
| 5,016,786 A | 5/1991 | Horino et al. | |
| 5,022,557 A | 6/1991 | Turner | |
| 5,062,548 A | 11/1991 | Hedderick et al. | |
| 5,079,927 A | 1/1992 | Rodino et al. | |
| 5,115,841 A | 5/1992 | Horino et al. | |
| 5,115,942 A | 5/1992 | Merrill et al. | |
| 5,127,551 A | 7/1992 | Black et al. | |
| 5,129,548 A | 7/1992 | Wisniewski | |
| 5,129,549 A | 7/1992 | Austin | |
| 5,163,920 A | 11/1992 | Olive | |
| 5,168,905 A | 12/1992 | Phallen | |
| RE34,337 E | 8/1993 | Bennett | |
| 5,299,715 A | 4/1994 | Feldman | |
| 5,337,784 A | 8/1994 | Grubb | |
| 5,368,198 A | 11/1994 | Goulet | |
| 5,368,205 A | 11/1994 | Groh | |
| 5,370,283 A | 12/1994 | Nelson et al. | |
| 5,437,395 A | 8/1995 | Bull et al. | |
| 5,458,149 A | 10/1995 | Shiffler | |
| 5,573,145 A | 11/1996 | Groh | |
| 5,603,363 A | 2/1997 | Nelson | |
| 5,607,083 A | 3/1997 | Vogel et al. | |
| 5,732,563 A | 3/1998 | Bethuy et al. | |
| 5,797,436 A | 8/1998 | Phallen et al. | |
| 5,842,617 A | 12/1998 | Younkle et al. | |
| 5,845,815 A | 12/1998 | Vogel | |
| 5,878,796 A | 3/1999 | Phallen | |
| 5,881,917 A | 3/1999 | Jones et al. | |
| 5,901,884 A | 5/1999 | Goulet et al. | |
| 5,996,650 A | 12/1999 | Phallen et al. | |
| 6,019,257 A | 2/2000 | Rasmussen | |
| 6,058,986 A | 5/2000 | Bethuy et al. | |
| 6,186,193 B1 | 2/2001 | Phallen et al. | |
| 6,216,918 B1 | 4/2001 | Saveliev et al. | |
| 6,230,767 B1 | 5/2001 | Nelson | |
| 6,234,222 B1 | 5/2001 | Nelson | |
| 6,234,223 B1 | 5/2001 | Nelson | |
| 6,237,652 B1 | 5/2001 | Nelson | |
| 6,247,614 B1 | 6/2001 | Whitney et al. | |
| 6,324,850 B1 | 12/2001 | Davis | |
| 6,345,735 B1 | 2/2002 | Harvey et al. | |
| 6,354,341 B1 | 3/2002 | Saveliev et al. | |
| 6,354,342 B1 | 3/2002 | Gagliano | |
| 6,360,556 B1 | 3/2002 | Gagliano | |
| 6,360,923 B1 | 3/2002 | Vlooswijk | |
| 6,382,467 B2 | 5/2002 | Saveliev et al. | |
| 6,397,909 B1 | 6/2002 | Nelson | |
| 6,431,403 B1 | 8/2002 | Davis | |
| 6,443,335 B1 | 9/2002 | Pinedjian et al. | |
| 6,449,966 B1 | 9/2002 | Bethuy et al. | |
| 6,449,970 B1 | 9/2002 | Gagliano | |
| 6,450,369 B1 | 9/2002 | Heyes | |
| 6,454,142 B1 | 9/2002 | Meynet | |
| 6,474,504 B1 | 11/2002 | Simmons et al. | |
| 6,478,200 B1 | 11/2002 | Davis | |
| 6,530,400 B2 | 3/2003 | Nelson | |
| 6,546,737 B1 | 4/2003 | Heyes et al. | |
| 6,564,971 B2 | 5/2003 | Heyes | |
| 6,581,899 B2 | 6/2003 | Williams | |
| 6,598,763 B2 | 7/2003 | Van Der Meer et al. | |
| 6,609,391 B2 | 8/2003 | Davis | |
| 6,641,004 B2 | 11/2003 | Nielson | |
| 6,648,025 B2 | 11/2003 | Smith et al. | |
| 6,669,051 B1 | 12/2003 | Phallen et al. | |
| 6,681,594 B1 | 1/2004 | Nelson | |
| 6,695,168 B2 | 2/2004 | Pinedjian et al. | |
| 6,695,177 B2 | 2/2004 | Blicher | |
| 6,698,629 B2 | 3/2004 | Taylor-McCune | |
| 6,779,685 B2 | 8/2004 | Nelson | |
| 6,827,238 B2 | 12/2004 | Barker et al. | |
| 6,840,281 B1 | 1/2005 | Amidzich | |
| 7,040,359 B2 | 5/2006 | Younkle | |
| 2001/0010318 A1 | 8/2001 | Saveliev et al. | |
| 2002/0113087 A1 | 8/2002 | Ziesel | |
| 2003/0024952 A1 | 2/2003 | Mackenzie et al. | |
| 2003/0051499 A1 | 3/2003 | Gagliano | |
| 2003/0071093 A1 | 4/2003 | Pinedjian et al. | |
| 2003/0080142 A1 | 5/2003 | Meheen | |
| 2003/0121934 A1 | 7/2003 | Taylor-McCune et al. | |
| 2003/0192615 A1 | 10/2003 | Smith et al. | |
| 2003/0197139 A1 | 10/2003 | Williams | |
| 2004/0177893 A1 | 9/2004 | Younkle | |
| 2004/0195393 A1 | 10/2004 | Younkle | |
| 2004/0232173 A1 | 11/2004 | Saveliev et al. | |
| 2005/0016592 A1 * | 1/2005 | Jeromson et al. | 137/487.5 |
| 2005/0045480 A1 | 3/2005 | Krumme | |
| 2005/0072487 A1 | 4/2005 | Younkle | |
| 2005/0194399 A1 | 9/2005 | Proctor | |
| 2005/0236435 A1 | 10/2005 | Pfieffer et al. | |
| 2006/0151528 A1 | 7/2006 | Wauters et al. | |
| 2007/0056296 A1 | 3/2007 | Gagliano | |

FOREIGN PATENT DOCUMENTS

| | | |
|---|---|---|
| DE | 40 41 033 | 9/1992 |
| DE | 93 14 741.4 | 2/1994 |
| EP | 0 111 629 | 8/1983 |
| EP | 0 300 701 | 1/1989 |
| EP | 0 861 801 | 9/1998 |
| EP | 1 099 661 A1 | 5/2001 |
| GB | 649146 | 1/1951 |
| GB | 1335396 | 10/1973 |
| GB | 1597955 | 9/1981 |
| GB | 2 108 638 | 5/1983 |
| GB | 2 232 228 | 12/1990 |
| GB | 2 252 098 | 7/1992 |
| GB | 2 283 299 | 5/1995 |
| GB | 2 322 691 | 9/1998 |
| GB | 2 415 763 A | 1/2006 |
| JP | 2000-327096 A | 11/2000 |
| WO | WO 98/31935 | 7/1998 |
| WO | WO 01/34470 | 5/2001 |
| WO | WO 02/40179 A2 | 5/2002 |
| WO | WO 02/40179 A3 | 5/2002 |
| WO | WO 02/92446 | 11/2002 |

WO    WO 2004/60121    7/2004

OTHER PUBLICATIONS

Micro Matic Beverage Dispensing Equipment catalog, wholesale edition (copyright 2004), Published by Micro Matic of Northridge, California, USA, pp. 10, 16, 17 and 18.
PCT/US2006/062186, Notification of Transmittal of the International Search Report and the Written Opinion of the International Searching Authority, or the Declaration, mailed Feb. 20, 2008.

PCT/US2007/087637, Notification of Transmittal of the International Search Report and the Written Opinion of the International Searching Authority, or the Declaration, mailed Apr. 15, 2008.
PCT/US2006/062203, Notification of Transmittal of the International Search Report and the Written Opinion of the International Searching Authority, or the Declaration, mailed Apr. 21, 2008.
PCT/US2006/062202, Notification of Transmittal of the International Search Report and the Written Opinion of the International Searching Authority, or the Declaration, mailed May 6, 2008.

* cited by examiner

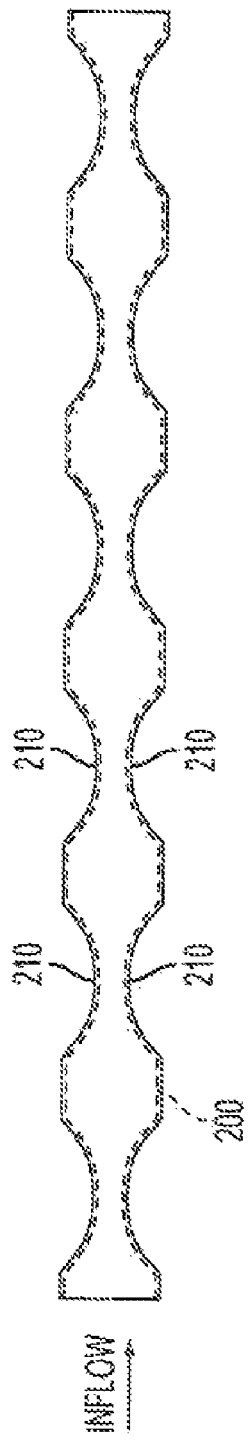

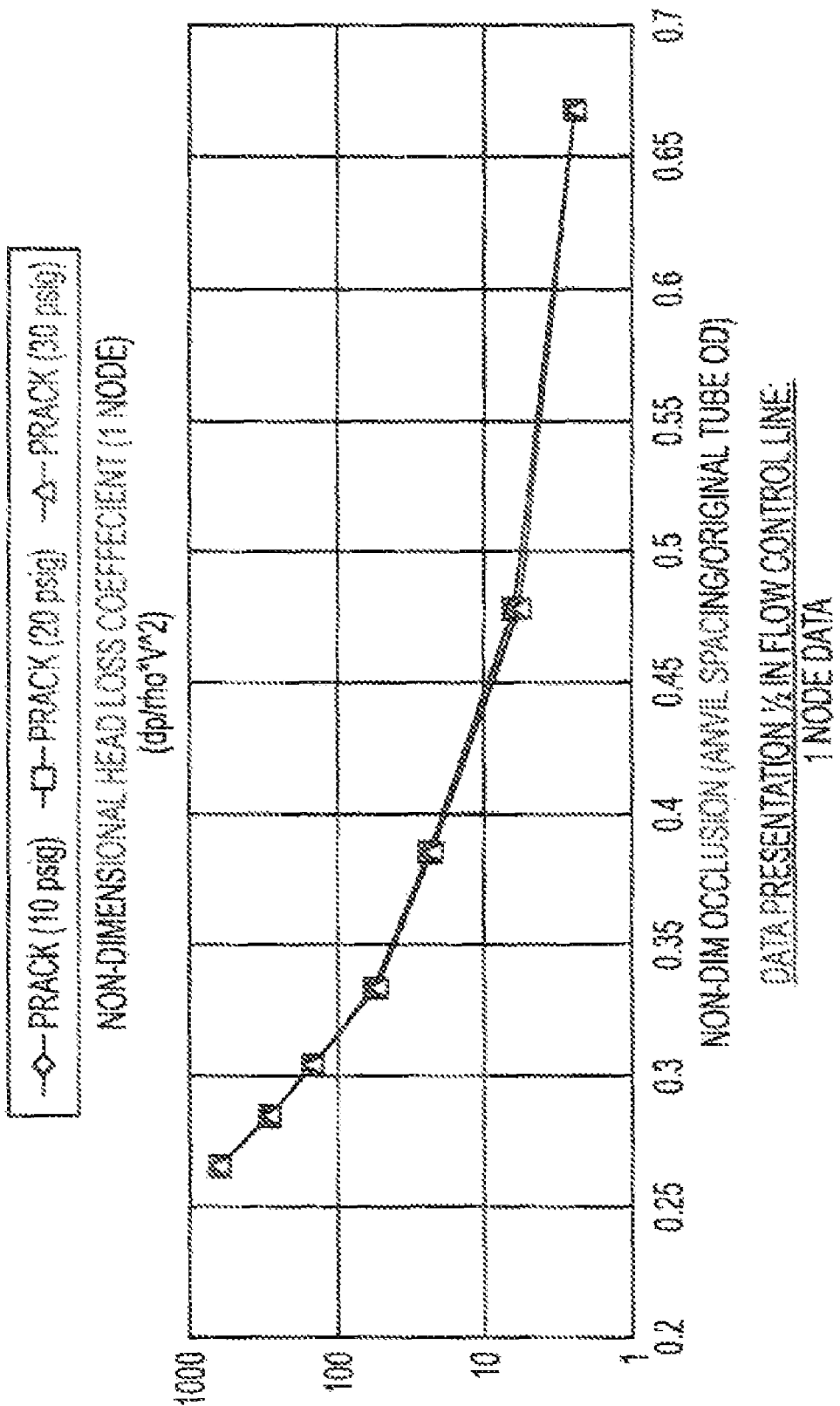

DIGITAL FLOW CONTROL

CROSS-REFERENCE TO RELATED APPLICATIONS

This application claims the benefit of U.S. Provisional Application No. 60/751,120, filed Dec. 15, 2005, the entirety of which is incorporated herein by reference.

TECHNICAL FIELD

This description relates to controlling the volumetric flow rate of fluids.

BACKGROUND

The control and management of fluids, and particularly liquids, is a practice and requirement of nearly every aspect of present day technology. As a result, a large number of liquid flow rate control devices have been devised and are in widespread use.

Particular volumetric flow rate control devices are point control devices having structure that limits and alters liquid flow rate as a function of a single or discrete point or location of restriction. Of these types, orifice plates, needle valves, ball valves, and plug valves are all widely used fixed or adjustable flow orifice devices. Each of these devices typically has a single fixed location or point of restriction which serves to entirely or principally define the pressure drop (the differential pressure between the pressure measured at the flow input and the pressure measured at the flow output) across the device. With a given motive force applied to the liquid (by, for example, a pump, gravity, or a pressurized vessel), this restriction causes flow at the liquid output to be reduced when compared to flow produced under the same conditions in the absence of the device.

For the purposes of this disclosure, a flow control device is a discrete device, made to the purpose of defining, establishing, limiting, or varying the liquid volumetric rate of flow through it, and which allows variable or adjustable liquid volumetric flow rate as a function of its structure and a physical or geometric change within the device.

The term "flow control" can be defined as a structure or device having the intended purpose of altering, establishing or defining the volumetric flow rate of a liquid. The term "control" can be defined as a volumetric liquid flow rate defining device which is manually adjusted and invariant in its flow rate control characteristics or structure unless manually altered or adjusted. Thus, a flow rate control may be thought of as a passive volumetric liquid flow control device which is not automatically adjustable or automatically interactive with or reactive to changing conditions. The term "flow controller" can be defined as a structure or device having the intended purpose of altering, establishing or defining the volumetric flow rate of a liquid. The term "controller" can be defined as a volumetric liquid flow rate defining device that can be automatically controlled and adjusted in its flow rate control characteristics, in response to some externally derived signal, command, time, or event. Thus, a flow controller may be thought of as an active, interactive, or dynamic volumetric liquid flow control device. In instances where the distinction between a flow rate control and a flow rate controller are unimportant, either may be referred to as a flow rate control device.

SUMMARY

According to one general aspect, a digital flow control assembly for controlling the volumetric flow rate of fluids includes a fluid flow conduit, multiple serially-arranged flow nodes positioned along a length of the fluid flow conduit, and a device for generating a signal used to adjust one or more of the serially-arranged flow nodes to maintain a desired volumetric flow rate of fluid in the fluid flow conduit.

Implementations of this aspect may include one or more of the following features. For example, the serially-arranged flow nodes may sum to define a total flow resistance through the fluid flow conduit. The flow resistance of each flow node may be added in a manner equivalent to discrete electrical resistances.

Each of the flow nodes may be discretely mechanically adjustable, ranging from a minimum flow setting to a maximum flow setting. Each mechanical adjustment of each flow node may be equipped with a Vernier scale dial readout or a digital readout of flow position.

The flow nodes also may be commonly mechanically adjustable, ranging from a minimum flow setting to a maximum flow setting. The mechanical adjustment common to all flow nodes may be provided with a Vernier scale dial readout or a digital readout of all commonly adjusted flow positions.

In addition, each of the flow nodes may define a flow, and the flow of each flow node may be fixed and nonadjustable. Each of the flow nodes may be discretely actuated to allow electronically controlled adjustment of the flow of each flow node from a minimum flow setting to a maximum flow setting, or all of the flow nodes may be commonly actuated to allow electronically controlled adjustment of the flow rate through the digital flow control assembly, ranging from a minimum flow setting to a maximum flow setting. A rate of fluid flow through the digital flow control assembly may be incrementally altered by at least sixty percent of the total flow range value of the device in twenty milliseconds or less. A previously defined flow rate within the flow range of the digital flow control assembly may be reproduced to within two tenths of one percent of a defined value under steady state inflow and outflow pressure conditions.

Furthermore, a second digital flow control assembly may be placed in series flow with the digital flow control assembly to increase the possible flow regulation resolution by the equivalent total number of nodes in series flow divided by the number of nodes in the digital flow control assembly. Some of the serially-arranged flow nodes may serve as a flow control valve in its fully closed position. The fully closed position of each flow node serving as a flow control valve may be encoded. When some of the flow nodes serve as a flow control valve, the flow rate through the assembly may allow the device to define a liquid batch or dose. Two or more flow nodes serving as control valves may provide redundant valving as a function of their series-arranged structure.

The digital flow control assembly may also include a common actuator for controlling the flow of the flow nodes, and the common actuator may be encoded to provide discrete position registrations, or to provide digital or analog readout of the entire range of flow adjustment. The assembly may further include one or more discrete actuators for controlling the flow of the flow nodes, and the discrete actuators may be encoded to provide discrete position registrations or to provide digital or analog readout of the entire range of flow adjustment of the node. The serially-arranged flow nodes may define a variable internodal spacing between consecutive nodes to minimize liquid flow turbulence within a given flow rate range. The fluid flow conduit and flow nodes may be constructed of rigid materials, or of a deformable or flexible conduit.

Moreover, the flow nodes may be variably spaced in order to accommodate flow system layout or spacing constraints. Multiple fixed or manually adjustable flow control nodes may be combined with discretely automatically adjustable or commonly automatically adjustable flow control nodes within the same assembly. Each of the flow nodes may be discretely adjusted to a mechanically defined high flow opening and to a mechanically defined low flow opening, with all flow control nodes discretely and simultaneously shifted between the two flow positions. Each of the flow nodes may be commonly adjustable to a mechanically-defined low flow opening and to a mechanically-defined high flow opening, with all flow control nodes commonly and simultaneously shifted between the two flow positions. Flow of fluid through the assembly may be adjusted based upon at least one externally derived process signal, such as temperature, pressure, pH, or conductivity.

The digital flow control assembly may also include an inflow pressure sensor for measuring pressure just prior to entry of fluid into the digital flow control assembly, and an outflow pressure sensor for measuring pressure at a point just beyond the digital flow control assembly. Correspondingly, the inflow and outflow pressure sensors may allow for measurement of the volumetric flow rate through the assembly. The assembly may automatically adjust itself to a desired volumetric flow rate within an adjustable flow range of the assembly. One or more of the flow nodes may be coarsely adjustable for purposes of establishing a flow rate through the assembly to within about ten percent of the desired value, and the remainder of the flow nodes may be finely adjusted in order to adjust the coarse flow rate to within about one percent or less of the desired value. A gas saturated liquid at a defined temperature range may be flow-rate controlled over a dynamic range of at least 8:1, without dissolved gas substantially leaving solution as a function of flow through the assembly.

One or more of the serially-arranged flow nodes may be mechanically or automatically adjusted to achieve linearization of flow rate across a variable flow range of the assembly. The serially-arranged flow nodes may be configured in a parallel configuration to provide for parallel fluid pathways. The spacing between the serially-arranged flow nodes may be sufficient to provide an internal fluid flow wake structure that includes fluid separation and recirculation zones downstream of the flow nodes, and substantial reattachment of the fluid to an inner wall of the conduit, before a subsequent node is approached. The device for generating the signal may be a fluid flowmeter.

At least two of the flow nodes may be simultaneously adjustable and at least two of the plurality of flow nodes may be independently adjustable to provide a desired fluid flow restriction through the assembly. In addition, one or more of the flow nodes may be independently adjustable and the remainder of the flow nodes may be simultaneously adjustable to provide a desired fluid flow restriction through the assembly.

According to another general aspect, a method for controlling the volumetric flow rate of fluids includes providing a fluid flow conduit, providing multiple serially-arranged flow nodes positioned along a length of the fluid flow conduit, and providing a feedback signal to adjust the serially-arranged flow nodes to maintain a desired volumetric flow rate of fluid in the fluid flow conduit.

Implementations of this aspect may include one or more of the following features. For example, adjusting the flow nodes may include discretely or commonly mechanically adjusting the flow nodes, ranging from a minimum flow setting to a maximum flow setting. Adjusting the flow nodes also may include discretely or commonly actuating the flow nodes, using electronically controlled adjustment of each flow aperture of each flow node from a minimum flow setting to a maximum flow setting.

The method may also include providing a second digital flow control assembly placed in series flow with the digital flow control assembly to increase the possible flow regulation resolution by the equivalent total number of nodes in series flow divided by the number of nodes in the digital flow control assembly. The method may further include providing a common actuator for controlling the flow aperture of the serially-arranged flow nodes, as well as encoding the common actuator to provide discrete position registrations, or to provide digital or analog readout of the entire range of flow aperture adjustment. In addition, the method may include providing one or more discrete actuators for controlling the flow aperture of the flow nodes, as well as encoding the discrete actuators to provide discrete position registrations, or to provide digital or analog readout of the entire range of flow adjustment of the node.

Furthermore, the method may include providing an inflow pressure sensor for measuring pressure just prior to entry of fluid into a digital flow control assembly, and providing an outflow pressure sensor for measuring pressure at a point just beyond the digital flow control assembly. Correspondingly, the inflow and outflow pressure sensors may allow for measurement of the volumetric flow rate through the assembly. Adjusting the flow nodes may include coarsely adjusting some of the flow nodes for purposes of establishing a flow rate through the assembly to within about ten percent of the desired value, as well as finely adjusting the remainder of the flow nodes in order to adjust the coarse flow rate to within about one percent or less of the desired value. Adjusting the flow nodes may also include mechanically or automatically adjusting some of the flow nodes to achieve linearization of flow rate across a variable flow range of the assembly.

In other aspects, a fluid volumetric flow rate control device may include an integrated series arranged plurality of flow restrictive elements which sum to define a total flow resistance. An aperture in the plurality of flow restrictive elements may be larger in square area than the aperture of a flow rate equivalent single point liquid flow rate control device. A liquid flow rate control device may be arranged such that, as the number of flow restrictive elements is increased, the differential pressure drop required across each element to establish a particular flow rate is decreased.

A liquid flow rate control device may include a flow restrictive element that can be a controllable flow node.

Each discretely controllable flow node may be a digital node. More generally, a liquid flow rate control device, referred to as a digital flow rate control, may include a number of flow nodes that defines the digital base number. For example, 10 nodes yield a base 10 digital flow rate control device.

In a digital flow rate control device, discretely defining a flow orifice dimension for each flow node may allow a digital linear control of liquid flow rate in which the number of steps of linear control range is equivalent to the number of nodes.

In a digital flow rate control device, each integrated flow node may be discretely mechanically adjustable ranging from a minimum flow orifice setting to a maximum flow orifice setting. Two or more of the integrated flow nodes may be commonly mechanically adjustable ranging from a minimum flow orifice setting to a maximum flow orifice setting.

In a digital flow rate control device, the flow orifice of each integrated flow node may be defined and fixed and nonadjustable.

In a digital flow rate control device, each integrated flow node may be discretely actuated to allow electronically controlled adjustment of each flow orifice ranging from a minimum flow setting to a maximum flow setting. Two or more of the integrated flow nodes may be commonly actuated to allow electronically controlled adjustment of the flow rate through the device ranging from a minimum flow setting to a maximum flow setting.

In particular digital flow rate control devices, the rate of flow through the device can be incrementally altered by at least sixty percent of the total flow range value of the device in twenty milliseconds or less. In such devices, any previously defined flow rate within the flow range of the device can be reproduced to within two tenths of one percent of the defined value under steady state inflow and outflow pressure conditions.

In another aspect, a digital flow rate control device includes one or more devices placed in series flow with a first device, thus increasing possible flow regulation resolution by the equivalent of the total number of nodes in series flow divided by the number of nodes in the first device. The flow resistance of each series flow node in an integrated device can be added in a manner equivalent to discrete electrical resistances.

In a digital flow rate control device, one or more of the adjustable series flow nodes can serve as a flow control valve in its fully closed or occluded position. For example, a digital flow rate control device may include multiple (two or more) flow nodes serving also as control valves to provide redundant valving as a function of their series arranged structure.

In another aspect, a digital flow rate control device may include a common actuator that controls the flow orifice of all integrated nodes and may be encoded to provide one or more discrete position registrations or to provide digital or analog readout of the entire range of flow orifice adjustment.

In another aspect, a digital flow rate control device may include discrete actuators associated with each integrated flow node that may be encoded to provide one or more discrete position registrations or to provide digital or analog readout of the entire range of flow orifice adjustment of the node.

In another aspect, a digital flow rate control device may include mechanical adjustment of each integrated flow node that is equipped with a Vernier scale dial readout or a digital readout of flow orifice position, or a mechanical adjustment common to all flow nodes that is provided with a Vernier scale dial readout or a digital readout of all commonly adjusted flow orifices. The individual mechanical adjustment for each flow node also may be encoded for flow orifice position, as may be a mechanical adjustment common to all flow nodes.

In a digital flow rate control device, the fully flow occluded or closed position of any integrated flow node also may serve as a control valve and may be discretely and particularly encoded.

A digital flow rate control device may be flow rate adjustable under all conditions of flow and pressure for which a particular device is suited or rated.

In a digital flow rate control device, inter-nodal spacing can be varied and optimized to minimize liquid flow turbulence within a given flow rate range.

In a digital flow rate control device, the liquid flow pathway and flow control nodes may be constructed of suitable rigid materials. The liquid flow pathway and flow control nodes may be defined by a deformable or flexible conduit or flow tube or hose. Both rigid flow pathway and flexible flow pathway arrangements may be constructed to meet sanitary standards.

In a digital flow rate control device, the integrated flow control nodes can be variably separated in order to accommodate flow system layout or spacing constraints.

In a digital flow rate control device, a plurality of fixed orifice or manually adjustable orifice flow control nodes may be combined with a plurality of discretely automatically adjustable or commonly automatically adjustable flow control nodes within the same device. Each of the integrated flow control nodes may be discretely adjusted to a mechanically defined high flow orifice opening and to a mechanically defined low flow orifice opening, with all flow control nodes being discretely and simultaneously shifted between the two orifice flow positions. Each of the integrated flow control nodes may be commonly adjustable to a mechanically defined low flow orifice opening and to a mechanically defined high flow orifice opening, with all flow control nodes commonly and simultaneously shifted between the two orifice flow positions.

In a digital flow rate control device, flow through the device can be adjusted, altered, or maintained based upon one or more externally derived process signals such as temperature, pressure, pH, conductivity, and the like.

In a digital flow rate control device, flow rate through the device, when calibrated, can allow the device, with one or more nodes having control valve functions, to define a liquid batch or dose.

A digital flow rate control device can be combined with a separate and discrete liquid flow meter such that the digital flow controller alters flow rate based upon a flow rate signal from the flow meter, with the combined elements forming a flow rate regulator.

In another aspect, a digital flow rate controller can be combined with an inflow pressure sensor and an outflow pressure sensor integrated into the controller structure, thereby forming an integrated self-contained and self-regulating flow rate regulator.

In a digital flow rate controller, an electronic controller can be integrated into or attached to the structure of the liquid flow rate controller itself. The electronic controller also can be separate or remote or removed from the liquid flow rate controller itself.

In a digital flow rate controller, the electronic controller can store, for on demand use, various flow controller flow rate configurations. The electronic controller can monitor flow actuator conditions and positions and integrated pressure sensors (where present) and alarm in the event a set of defined parameters is exceeded. Liquid flow rate characteristics and performance may be graphically portrayed based upon empirically and experimentally derived flow data.

In a flow rate control device, some of the plurality of integrated flow nodes may be coarsely adjusted for purposes of establishing a flow rate through the device to within ten percent of the desired value, and the remainder of the plurality of integrated flow nodes may be finely adjusted in order to adjust the coarse flow rate to within one percent or better of the desired value.

A flow rate regulator can automatically tune or adjust itself (auto tune) to a desired volumetric liquid flow rate within the adjustable flow range of the device.

In a digital flow rate control device, a gas saturated liquid at a defined temperature range can be flow rate controlled over a dynamic range of at least 8:1 without dissolved gas leaving solution as a function of flow through the digital flow rate control device.

In a digital flow rate control device, two or more individual flow rate control nodes with fixed orifices, mechanically adjustable orifices, or automatically adjustable orifices may be assembled one to the next to form an integrated digital flow rate control device.

In a digital flow rate control device, linearization of flow rate across the variable flow range of the device can be manually or automatically accomplished within and utilizing only the series sequential flow nodes incorporated into the structure of the device.

In a flow rate control device, a flow meter may be incorporated and integrated into the structure of a digital series flow restricting node flow controller, thus forming a self-contained and self-regulating digital flow rate regulator.

The details of one or more implementations of the device and method are set forth in the accompanying drawings and the description below. Other features will be apparent from the description and drawings, and from the claims.

DESCRIPTION OF DRAWINGS

FIGS. 2A and 2B show rigid formed tube digital flow controls.

Like reference symbols in the various drawings indicate like elements.

DETAILED DESCRIPTION

Figure 1:
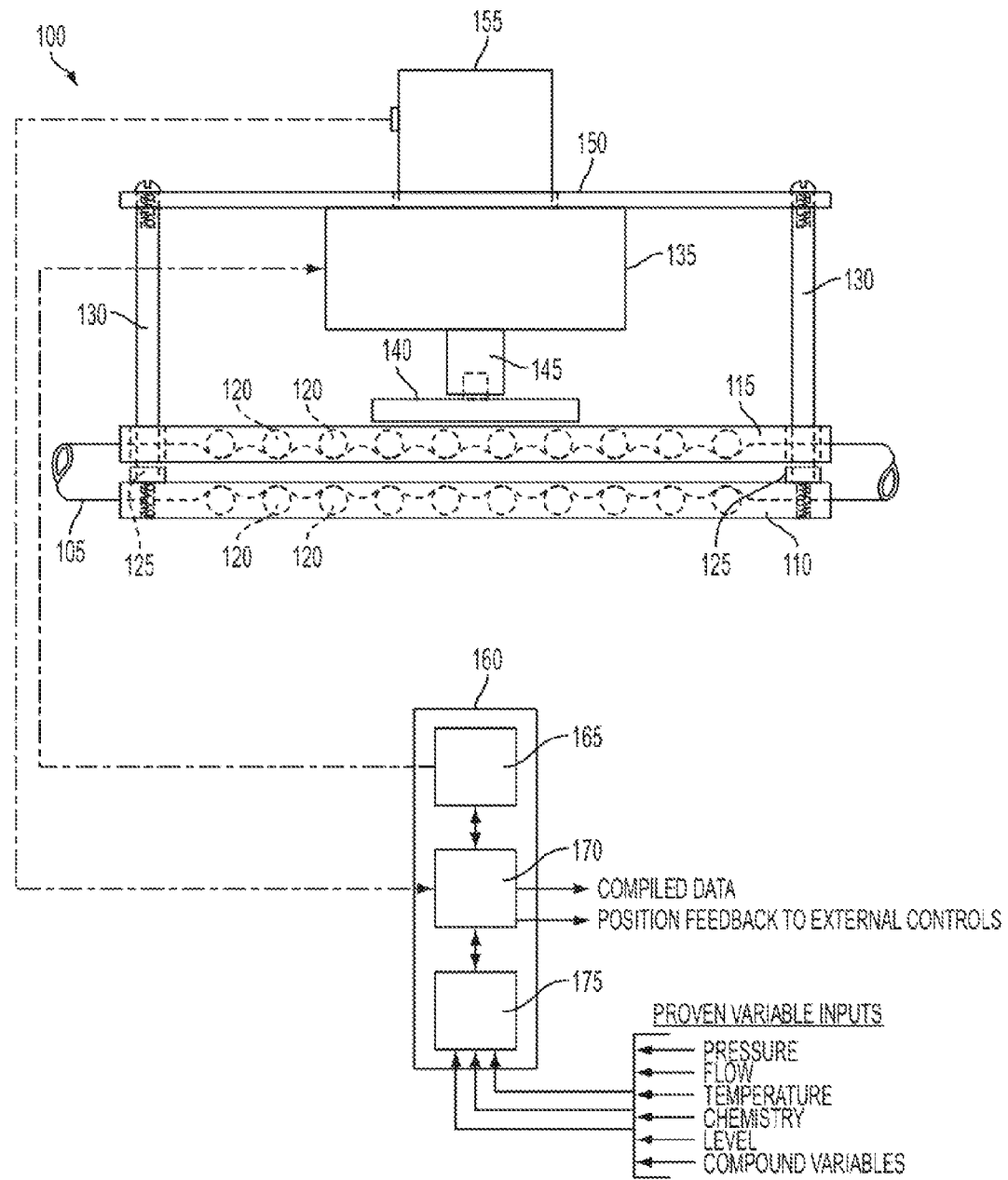
FIG. 1 shows a single actuator digital flow controller associated with an electronic controller.

Referring to FIG. 1, a digital fluid flow rate control device 100 controls flow through a flexible tube 105. The tube 105 extends between a fixed node plate 110 and a moveable node plate 115, each of which includes multiple flow restriction nodes 120. As the plate 115 moves toward the plate 110, the nodes 120 compress the flexible tube 105. Non-occlusion stops 125 are positioned between the plates 110 and 115 to prevent the plates from coming so close together that the nodes pinch the tube 105 to the extent that flow is stopped altogether. The movable plate 115 moves on tracks 130 that extend from opposite ends of the fixed plate 110.

A flow rate adjustment actuator 135 is secured to an actuator thrust plate 140 through an arm 145. The actuator 135 moves the arm 145 to cause the plate 140 to push against the plate 115 and cause the plate 115 to compress the tube 105. When the actuator 135 releases or withdraws the arm 145, fluid pressure in the tube 105 causes the tube 105 to expand, which, in turn, pushes away the plate 115. The actuator 135 is mounted on a backer plate 150 that is secured to the rails 130.

A position feedback device 155 is mounted on the actuator 135 to monitor the position of the arm 145 and thereby monitor the position of the plates 140 and 115, and the corresponding amount by which the tube 105 is compressed.

An electronic controller 160 receives an output signal of the feedback device 155 and generates a control signal to control the actuator 135. The controller 160 includes actuator driver control electronics 165, flow controller position control electronics 170, and a primary processor 175. In addition to the feedback signal, the controller 160 includes variable inputs including measurements of one or more of pressure, flow, temperature, chemistry, level and compound variables. The controller 160 may generate compiled data and feedback to external controls.

In this arrangement, a single actuator acts upon series integrated flow limiting nodes formed from a flexible tube. This device can be linearized in terms of its flow rate control curve using a digital feedback actuator, and the flow nodes can also serve as redundant sequential control valves in some cases. Particularly when paired with a fast-acting linear actuator, this arrangement can alter flow very quickly, on the order of less than 50 milliseconds to move from lowest to highest flow or the reverse.

More generally, a flow rate control device includes fixed or adjustable flow limiting and flow restricting nodes, with each node having an orifice and two or more nodes being incorporated into a single structure or assembly such that the fluid, most particularly liquids, must flow through each flow node in its movement from an infeed port of the device to an outfeed port of the device. Because each node is discrete in terms of its pressure dropping role, but is integrated into a whole, the device is referred to as a digital flow rate control or controller.

The term digital also refers to the form and mode of control of the rate of liquid flow through the devices. The flow nodes can be fixed, defined and nonadjustable. More commonly, however, the nodes are either manually or automatically adjustable, either individually and independently from one another, or by a common adjustment mechanism. Thus, in this context, digital refers to a discrete and adjustable flow node location or address, and in still another context, to the nature of the automatic controls such that each node can be electronically adjustable using a digitally controlled actuator or using an actuator in conjunction with a digital feedback device or system.

Successive pressure drops in a liquid flow pathway can sum to define a desired liquid flow rate through the pathway. The merits of using multiple series arranged flow restricting nodes instead of one are found in the mathematics of the operation of an adjustable liquid flow control, as well as the physical consequences (and benefits) of such an arrangement.

The performance of multiple nodes can be illustrated by considering a simplified model as a valid analogy. First, consider a 100 ohm potentiometer variable resistor with a center wiper such that its effective resistance can be varied from zero to its full 100 ohm value. The resistance element has an overall tolerance of 1.0 percent, or a worst case variation of 1 ohm. Now, consider 10 center wiper potentiometers, each of 10 ohms resistance, series connected, each with an overall tolerance of 1.0 percent. Each potentiometer in this case has a tolerance of 0.10 ohms and they sum to a 1.0 ohm worst case variation of the summed 100 ohms.

In this comparison it is given that either system can be adjusted to deliver a total resistance to current flow within zero to 100 ohms and each to a certain accuracy of set point.

The chances of the single 100 ohm resistor being below 100 ohms in value is nearly one in two. The other possibility is that it is above 100 ohms in value (the probability of it being exactly 100 ohms being so extremely small as to be irrelevant). The chances of each 10 ohm resistor being above or below the exact value are the same as with the larger value resistor, but it is far more likely that the net total resistance will more closely approximate the ideal 100 ohm value since some of the ten will be above 10 ohms while others will be below. Thus, in this analogy, the inherent accuracy of the ten element system is improved.

Now compare the instance where a particular resistance value is sought with the single 100 ohm potentiometer and it is adjusted to within 2.0 percent error of total span of target value, and the case where each of the ten 10 ohm potentiometers is adjusted to within 2.0 percent of its span to sum to the particular resistance value sought. Since 10×0.02×10 is 2.0 and 100×0.02 is 2.0, there appears to be no difference in the two systems. However, there is one crucial difference, that results from problems in accurately adjusting a single point system. In the single point approach, there is only one adjustment that my be right or wrong. In the ten element system, however, things are more forgiving.

Consider adjusting the 100 ohm unit to within 3.0 percent of span of the desired value instead of the target of 2.0 percent. Then consider the error effect of setting one of the ten series units to 3.0 percent and the rest to the correct 2.0 percent. In the single unit case the actual error is 3.0 percent. In the series units case the actual error is 2.10 percent. If three of the series units are badly adjusted to a 3.0 percent error, the cumulative error across the ten devices is 2.3 percent. If five of the ten units are badly adjusted to 3.0 percent error, the cumulative error across the ten devices is 2.5 percent. If nine of the ten units are badly adjusted to 3.0 percent error, the cumulative error across the ten devices is 2.9 percent, and still better than achieved with the single element device.

This analogy holds up in the case of the multi-node digital flow control device, and is empirically demonstrable. Further, in practice, the set point accuracy advantage is magnified by the understanding that each flow resistance node in the multi-point system is larger in dimension for a given flow rate than the single orifice of the single point system. Thus, with an adjustment apparatus of the same physical resolution in each case, the inherent resolution of adjustment of each node in the multi-node system must be inherently greater, both at a given node and, even more importantly, across all nodes. By example, if each adjustment apparatus has 100 increments, the total resolution of a 10 node system is one part in 1000, while the single node system is total resolution of the one part in 100.

Figure 3:
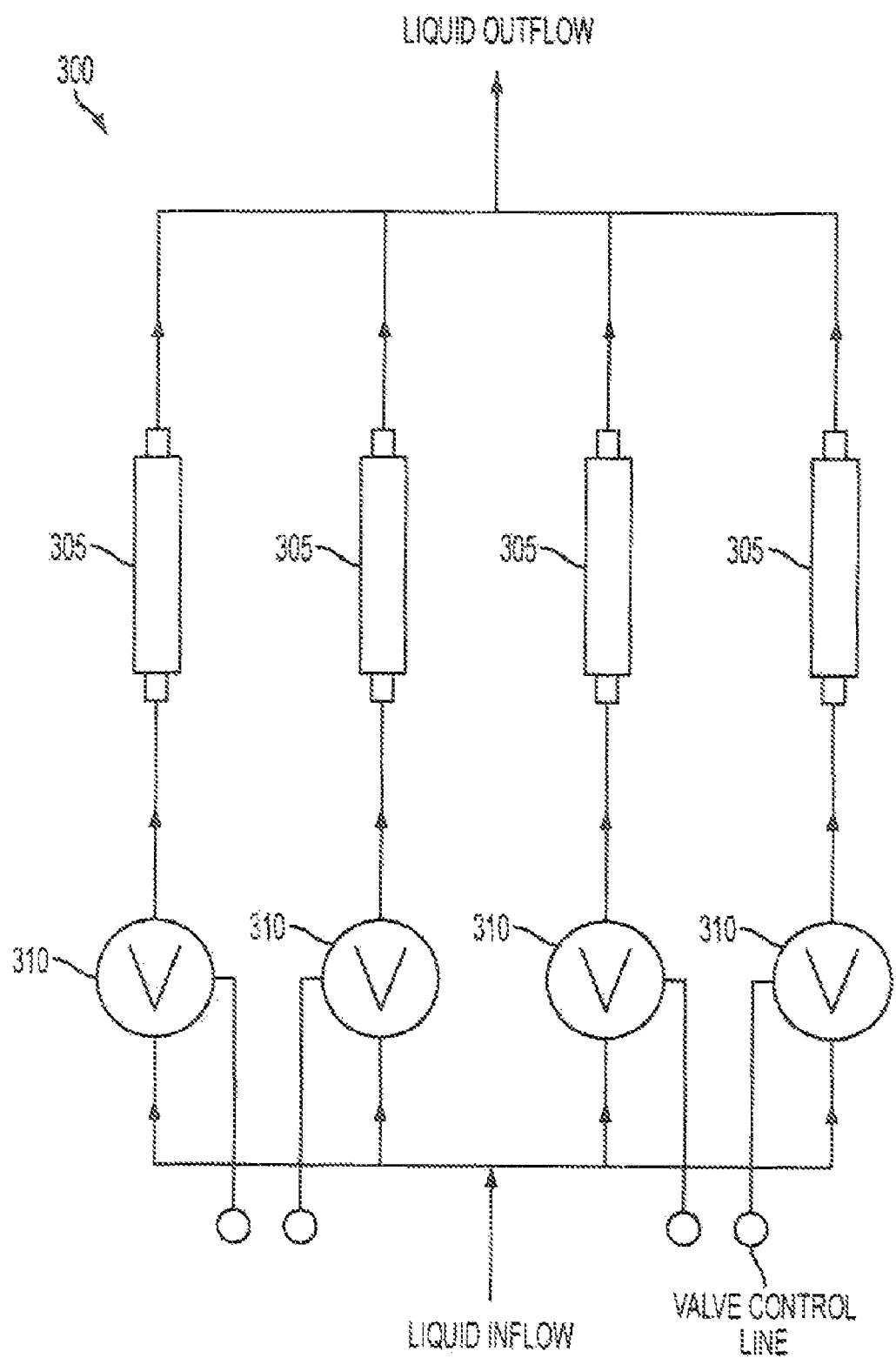
FIG. 3 shows a parallel arrangement of a digital flow control devices with control valves addressing the flow pathways.

Referring to FIGS. 2A and 2B, digital flow controls 200 and 205 disclosed herein can be of fixed and invariant flow characteristics based upon forming the integrated flow nodes from a rigid material such as a metal tube. FIG. 2A illustrates a rigid tube 200 having circumferential nodes 210, while FIG. 2B illustrates a rigid tube 205 having nodes 215 on a single side. This simple control may be employed in a liquid flow system with narrow or predictable variations in flow pressure and/or where predictable variations in flow rate with flow pressure changes are tolerable. Changing the net effective flow allowed by the device requires altering the flow pressure applied to its infeed, which may be readily accomplished since the pressure to flow relationship of these devices is proportionate and free of discontinuities. Additional devices can be added in series to reduce flow (termed a series-series arrangement) or the device can be replaced with one of overall matching dimensions but with differently dimensioned flow orifices. Another important variant is to place these differing devices in parallel with a suitable control valve (manual or automatic) on each parallel branch, allowing different predefined flow rates to be valved in and out of the flow pathway. Such an arrangement is illustrated by the system 300 of FIG. 3, which includes four flow controls 305 connected in parallel, with flow into each flow control 305 being permitted or prevented by a corresponding valve 310.

Figure 4:
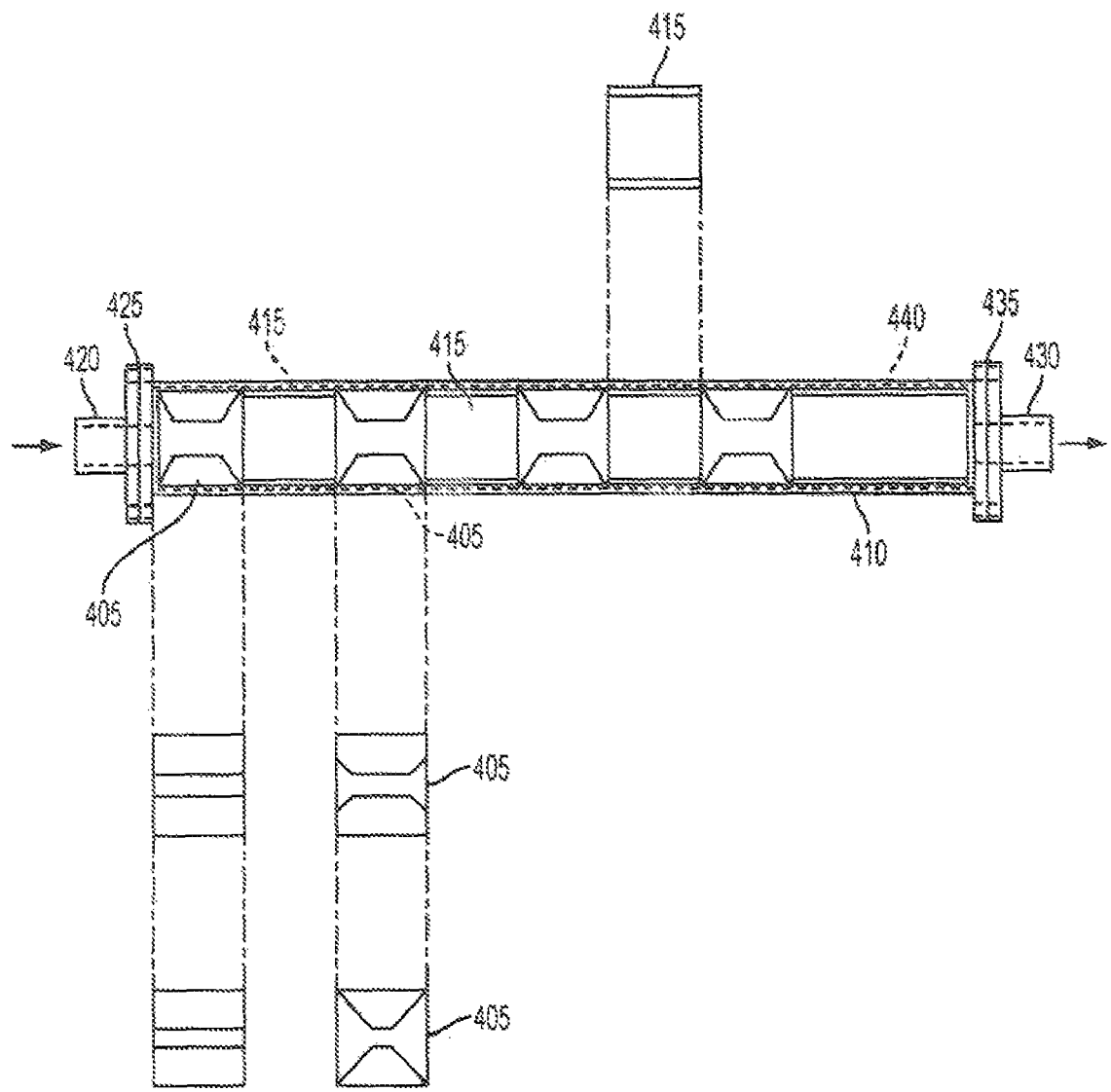
FIG. 4 shows a discrete modular digital flow control assembly.

FIG. 4 shows a nonadjustable flow control 400 that employs modular flow nodes 405 of desired flow orifice dimensions stacked inside of a flow tube 410 with inter-nodal spacers 415. The flow control 400 also includes an inflow fitting 420 extending from a flange 425, an outflow fitting 430 extending from a flange 435, and an expansion spacer tube 440. The flow control 400 is flow rate modified by changing out some or all of the nodes for others with different orifice dimensions. The inter-nodal spacers provide intervening reduced turbulence zones and may or may not be required depending upon liquid characteristics. This flow control may also be flow rate modified by adding modular flow nodes in lieu of the expansion spacer tube shown, as well as by deleting nodes.

Figure 5:
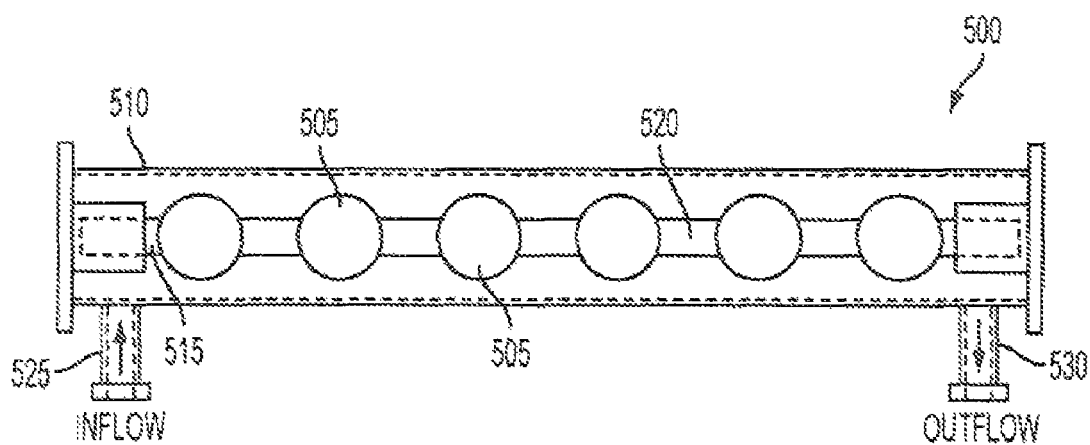
FIG. 5 shows a rigid structure provided with a fixed flow rate digital control.

FIG. 5 shows a fixed flow rate 500 that includes spherical flow restricting nodes 505 spaced apart in a flow tube 510 and supported on a coaxial support rod 515. The circumferential space between the circumference of each ball and the inner wall of the tube form a flow reducing node. The dimension of the space constitutes the degree of flow reduction and is an annular shaped flow orifice. The spherical nodes 505 are separated by internodal spacers 520 and arranged such that flow entering through an inflow port 525 passes by each of the nodes 505 before entering through an outflow port 530.

Figure 6A:
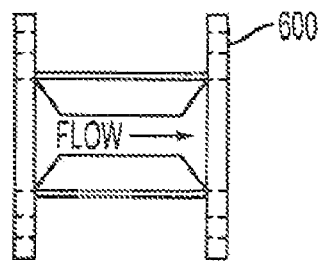
FIGS. 6A and 6B show a cross section of a discrete modular node series digital flow controller with a single unit being shown in FIG. 6A and a series of assembled units being shown in FIG. 6B.
Figure 6B:
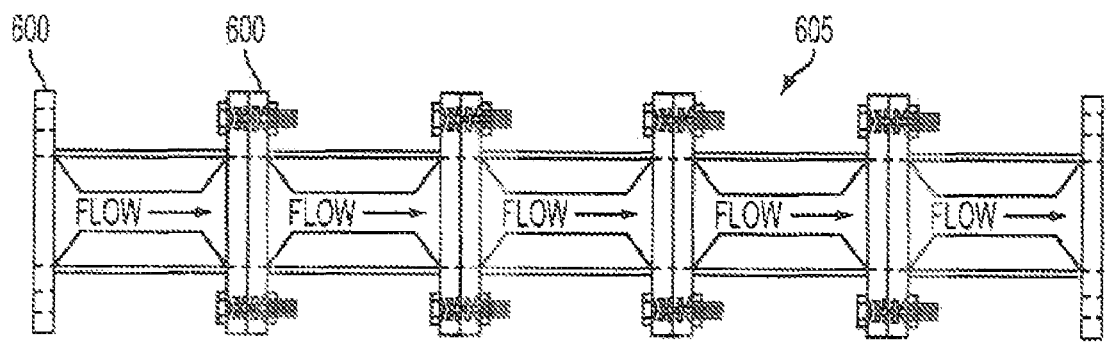
Figure 7A:
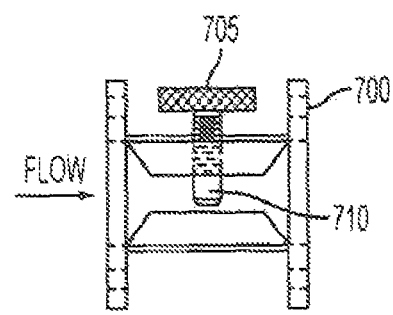
FIGS. 7A and 7B show a discrete manual modular node digital flow controller.
Figure 7B:
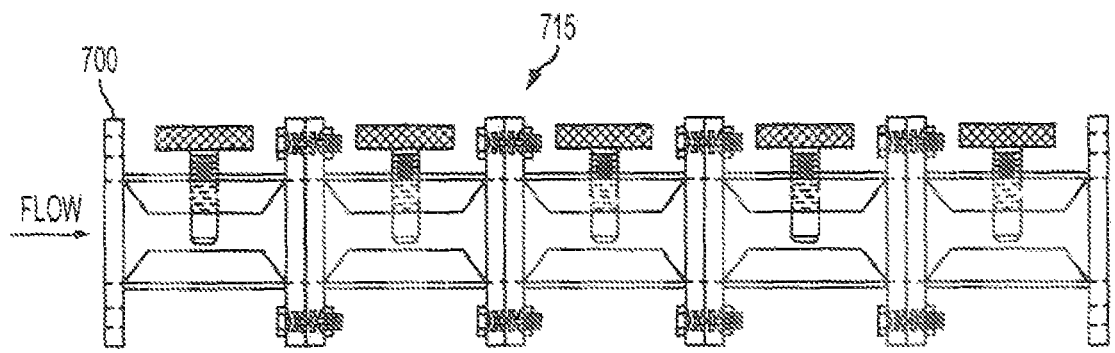

FIGS. 6A and 6B depict still another fixed orifice modular node device 600 where the nodes 600 are physically discrete until assembled and integrated together into a multi-node series arrangement 605. As shown in FIGS. 7A and 7B, a similar flow control device 700 can include a manually-adjustable control knob 705 that can be manipulated to extend or retract a post 710 into the flow path. As shown in FIG. 7B, multiple devices 700 may be connected in series to create a multi-node flow control 715.

Figure 8A:
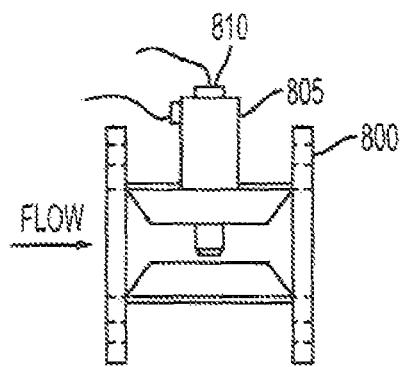
FIGS. 8A and 8B show a cross section of discrete modular node series digital flow controllers provided with encoding sensors with a single unit being shown in FIG. 8A and a series of assembled units being shown in FIG. 8B.
Figure 8B:
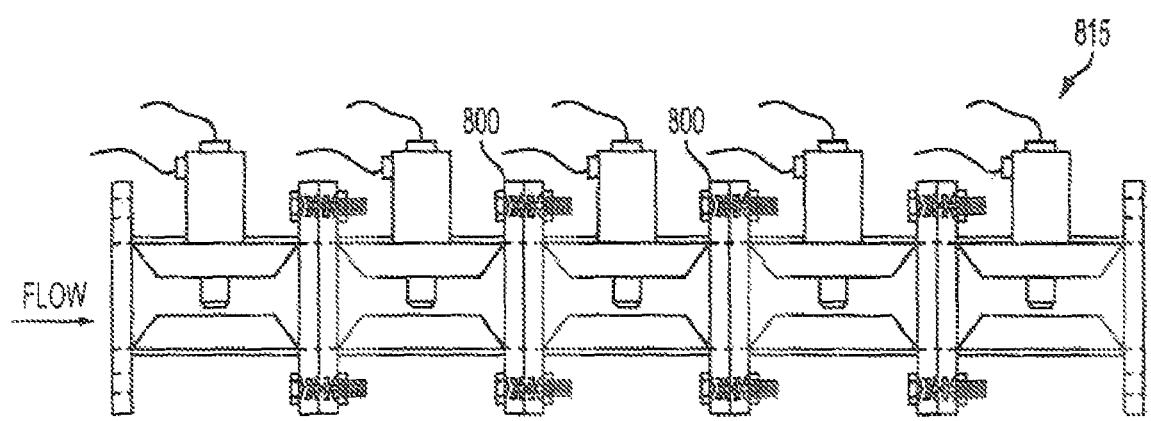

As shown in FIGS. 8A and 8B, another flow control device 800 may include an automatic actuator 805 and an encoding sensor 810 at each node. Each of these actuators may be hydraulic, magneto rheological, thermal, pneumatic, magnetic, solenoid, or motor operated (motors of all types being usable), and any other actuator types suitable to rapid precise motion may also be used. As shown in FIG. 8B, devices 800 may be connected in series to form a multi-node flow control 815.

The use of individual actuators allows the maximum flexibility in flow rate control formatting, including combining some nodes for range ability (coarse adjustment) and some for fine increment adjustment. Essentially, the pattern of use and adjustment is constrained only by the versatility of the actuators and their controlling software. The use of individual actuators also allows a straightforward control format for following external flow command signals where the number of nodes responsive to a given signal type constrains and limits the absolute magnitude of the flow change possible. This format also allows multiple signals to be segregated to a discrete flow node or nodes, allowing an unusually flexible flow rate control device scaled to and responsive to mixed or multiple control signals.

Figure 9:
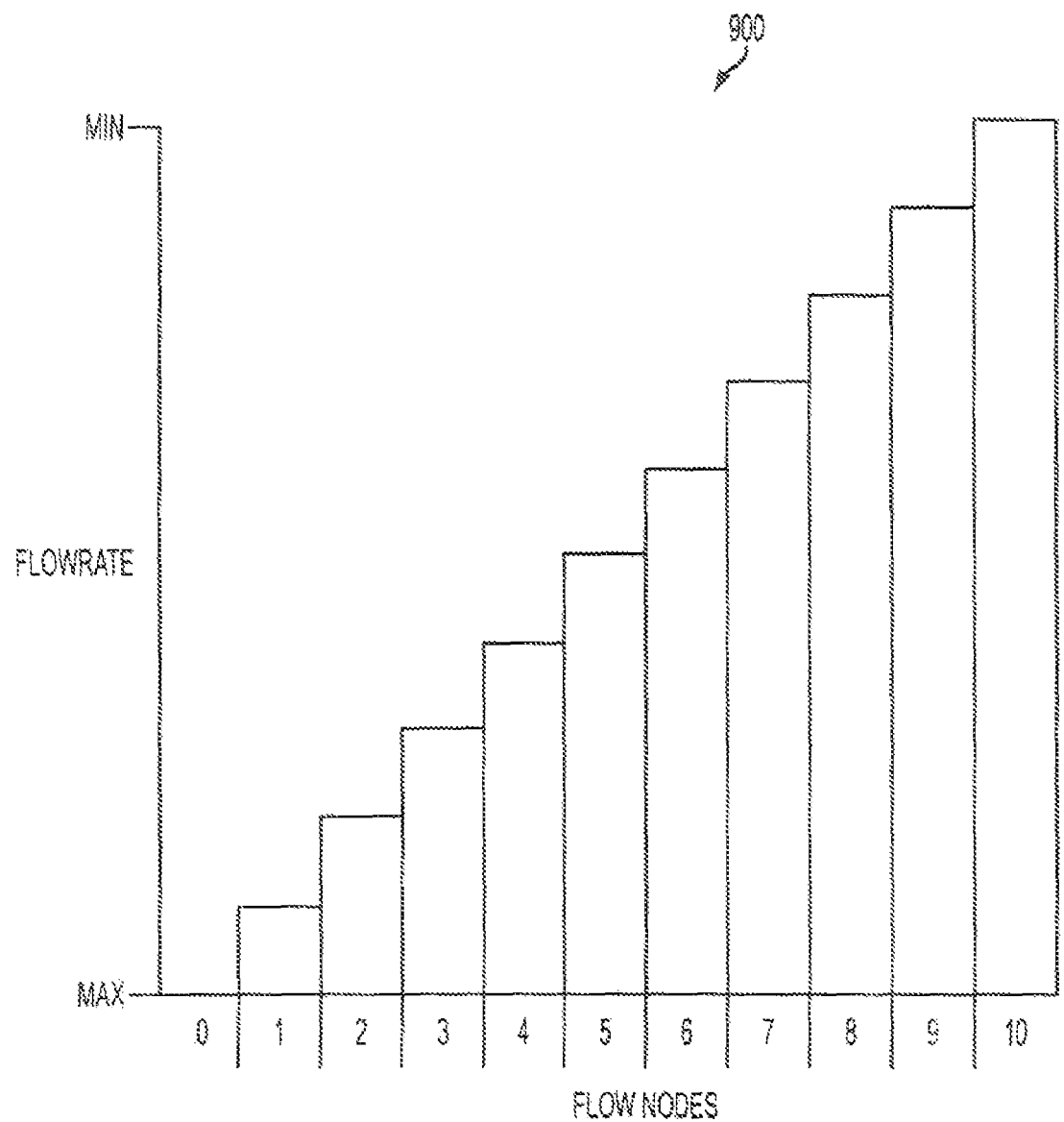
FIG. 9 shows a linearized flow range through separate flow orifice adjustment of each discrete flow node.

The use of discrete automatic actuators also allows a fast digital system to be embodied where flow nodes are fully engaged or fully disengaged into or out of the flow pathway of the flow controller. This use format may be more precisely termed ultrafast in that flow can be altered by any given flow node in twenty one-thousandths of a second or less (20 milliseconds) such that the device is useful for applications such as missile control systems, super critical liquid process environments, and signal tracking systems. The bar graph 900 of FIG. 9 illustrates the general form of control possible with this "all digital" control format. The graph shows a ten node system and the relative flow rate control pattern possible with this methodology. Although flow rate through these devices is relatively linear in basic form, full linearization as shown in the bar graph is possible with simple discrete definition and calibration at each flow node.

Figure 10A:
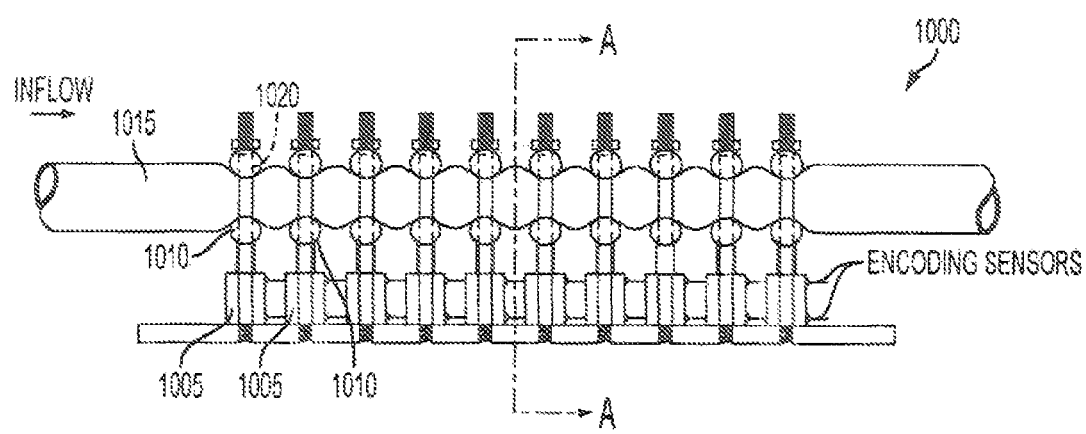
FIGS. 10A and 10B show a symmetrical, dual anvil, digital flow controller.
Figure 10B:
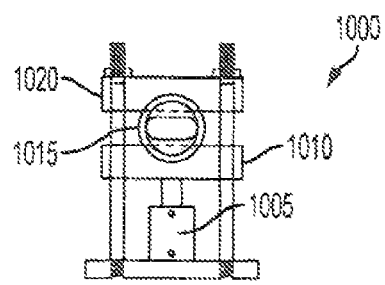

FIGS. 10A and 10B show a flow controller 1000 in which individual actuators 1005 control flow nodes 1010 comprising periodic restrictions of a flexible tube 1015.

Each actuator 1005 includes an integral encoding sensor that monitors the position of the actuator. The controller 1000 is symmetrical, in that nodes 1010 are positioned opposite fixed nodes 1020. The nodes and inter-nodal spacing combine to form well defined Laval shaped flow structures. With spacing of nodes appropriate to the flow rate range of use, flow through this device is relatively non-turbulent. In particular, this arrangement has been empirically shown to be useful in controlling the flow rate of gas saturated liquids. For example, one particular implementation is capable of varying the flow rate of beer over a dynamic range of greater than 8:1 without causing the dissolved CO2 to leave solution. This embodiment also has the particular advantage of being very sanitary in its construction, with its non-invasive flow tube. The tube used in the device can be of a particularly wide variety of chemistries, elastomers, and durometers because it need not be occluded but only restricted. Thus the over-folding or creasing of the tube when pinched to occlusion can be avoided in this device leading to greatly extended and generally indefinite service life. Nevertheless, any given node position can be restricted to occlusion, such that the flow controller 1000 can serve as a control valve. This capability is enhanced where multiple sequential nodes serve also as valves, in that a redundant valve structure is created. Also of note in this regard is the increased sealing pressure or differential pressure possible with these multiple in series valve structures. Also, the occlusive force that is required to seal against a given pressure can be shown to be reduced in this series valve structure. It is well understood that the greater the occlusive force applied to a pinch valve tube, the shorter the tube life.

Figure 11:
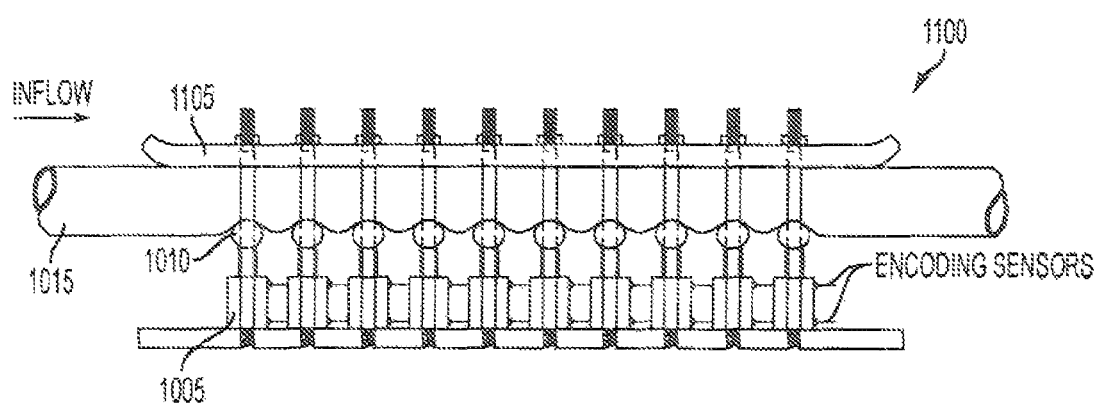
FIG. 11 shows an asymmetrical digital flow controller acting upon a flexible tube.

FIG. 11 shows a flow controller 1100 that is asymmetrical and differs from the controller 1000 in that the fixes nodes 1020 are replaced with a flat plate 1105.

As an alternative to individually adjusting the flow nodes, systems may adjust all of the flow nodes in unison. The flow rate control device 100 of FIG. 1 provides one example of a system that operates in that way.

Figure 12A:
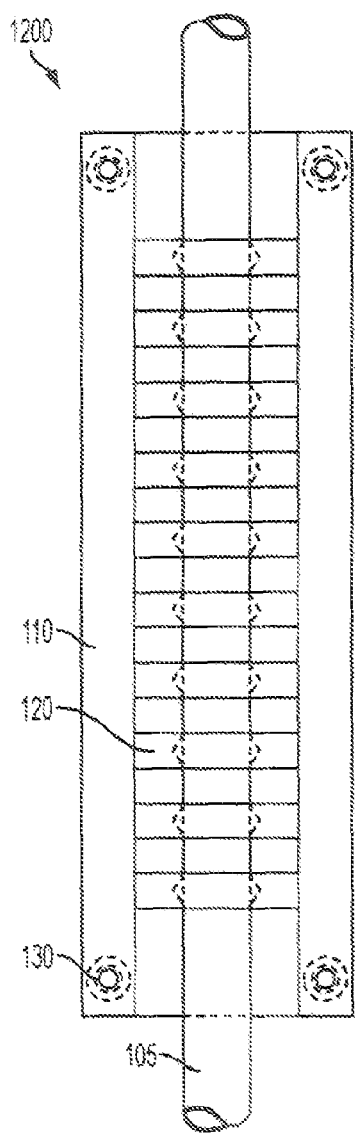
FIGS. 12A and 12B show a side elevational view (FIG. 12A) and a top plan view (FIG. 12B) of a series of digital flow rate controllers acting upon nodes of a common flexible tube, which series have a common manual actuator.
Figure 12B:
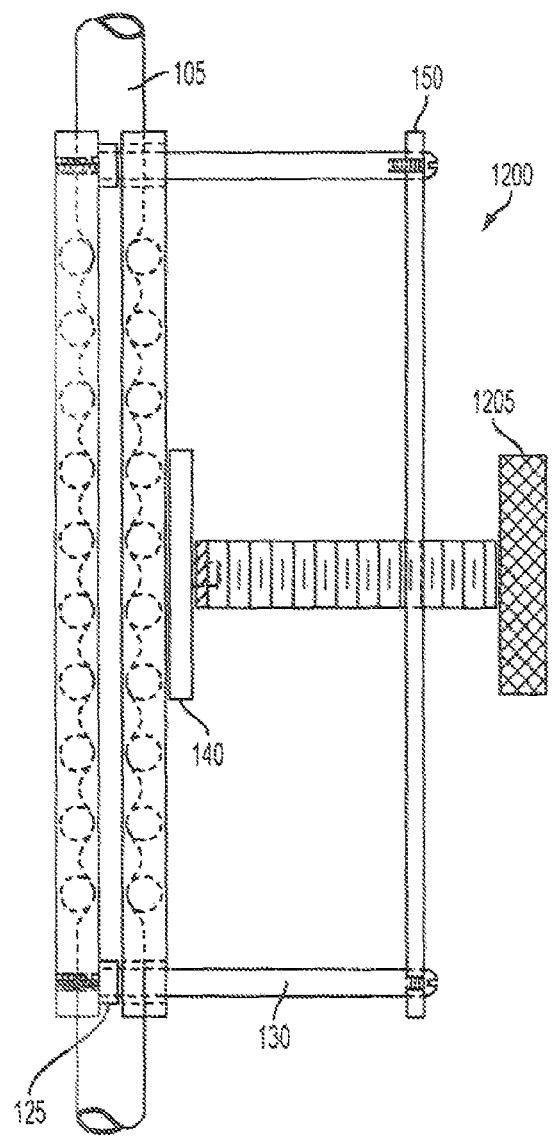

FIGS. 12A and 12B show a flow control device 1200 that is similar to the device 100 of FIG. 1 but differs in that the automatic actuator 135 has been replaced with a manual adjustment knob 1205 mounted on the backer plate 150. The adjustment knob 1205 allows manual adjustments of all flow limiting nodes simultaneously. This simple flow rate adjustment methodology can be calibrated using a mechanical dial indicator, a mechanically incremented digital shaft position indicator, or by an electronic digital readout ("DRO").

Figure 13A:
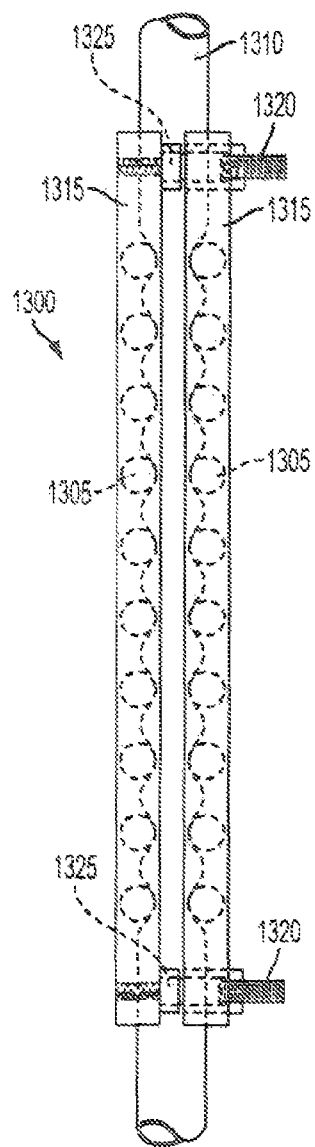
FIGS. 13A and 13B show a digital flow control assembly where a plurality of nodes formed in a flexible tube are controlled by volumetric flow-rate adjustment fasteners.
Figure 13B:
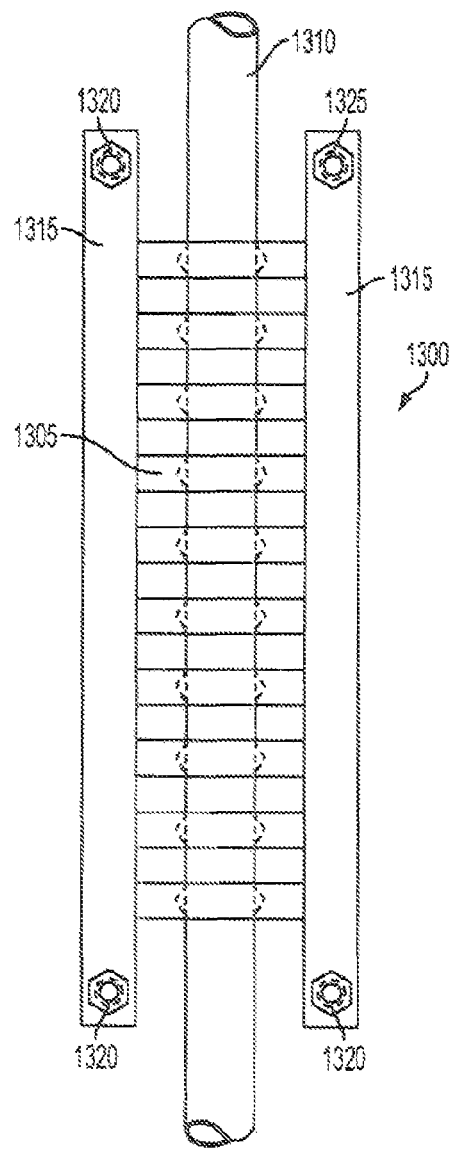

FIGS. 13A and 13B show a flow control 1300 that employs symmetrical nodes 1305 to compress a flexible tube 1310. The nodes 1305 are mounted on rails 1315, with the spacing between the rails being controlled by adjustment fasteners 1320. Non-occlusion stops 1325 prevent the rails from moving so close together that flow through the tube 1310 is occluded.

Figure 14A:
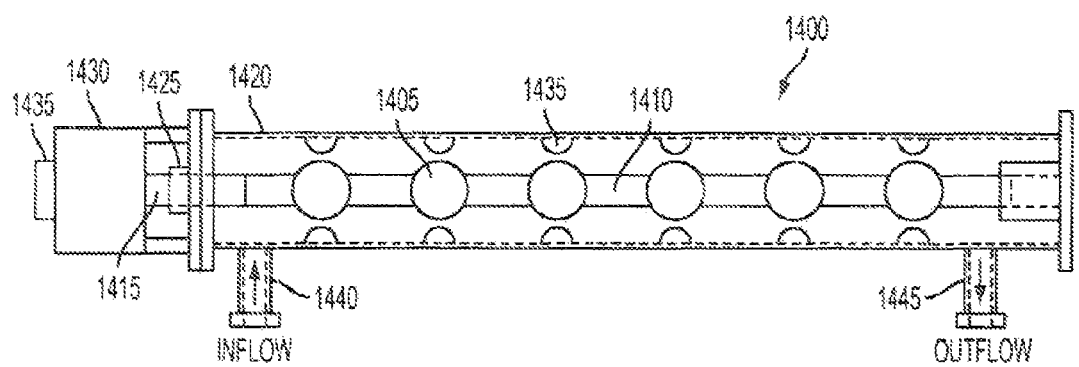
FIGS. 14A and 14B show a variable digital flow control which can be moved between a minimum flow geometry as shown in FIG. 14A and a maximum flow geometry as shown in FIG. 14B.
Figure 14B:
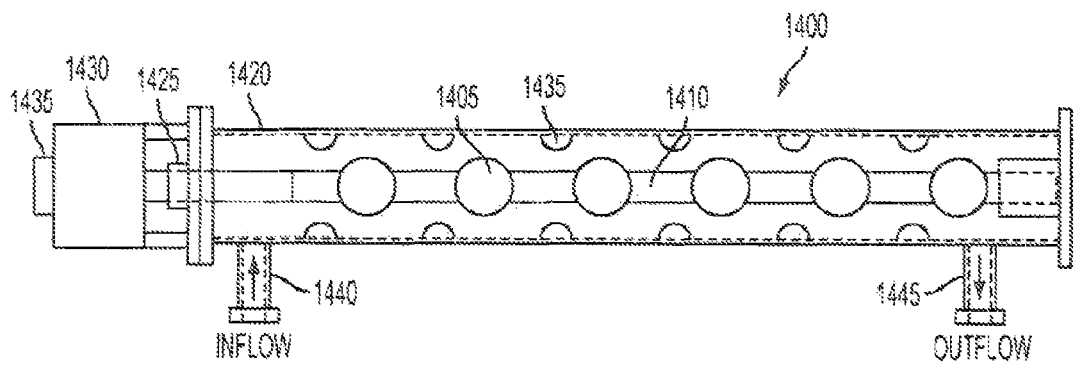

FIGS. 14A and 14B show a variable flow controller 1400 having nodes 1405 that are arranged similarly to the nodes 505 of the flow control 500 of FIG. 5. In particular, the nodes 1405 are separated by internodal spacers 1410 and are mounted on a shaft 1415 that is coaxially positioned in a tube 1420. The shaft extends through a shaft seal 1425 at the end of the tube where it is connected with an actuator 1430 having an associated position encoder 1435. The actuator 1430 is configured to move the shaft between a first position (as shown in FIG. 14A) in which the nodes 1405 are aligned with annular rings 1435 on an interior surface of the tube 1420 and flow between an inflow port 1440 and an outflow port 1445 is minimized, and a second position (as shown in FIG. 14B) in which the nodes 1405 are positioned equidistant between neighboring rings 1435 and flow is maximized. Using the encoder 1435, the actuator 1430 also is able to position the shaft in positions between those shown in FIGS. 14A and 14B.

As shown, the range of motion to effect a large and essentially linear flow control range is comparatively small and thus allows a highly responsive and very fast-adjusting device. The physical shape of each flow node can be varied widely as appropriate to the velocities of the particular application.

Figure 15A:
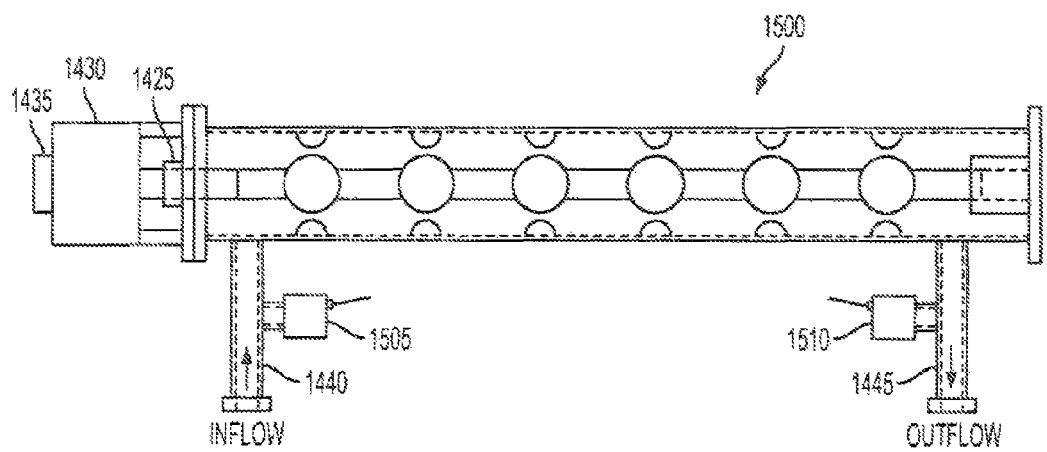
FIGS. 15A and 15B show two views of a series flow node digital flow rate controller with an integrated differential pressure flow meter forming a flow regulator.
Figure 15B:
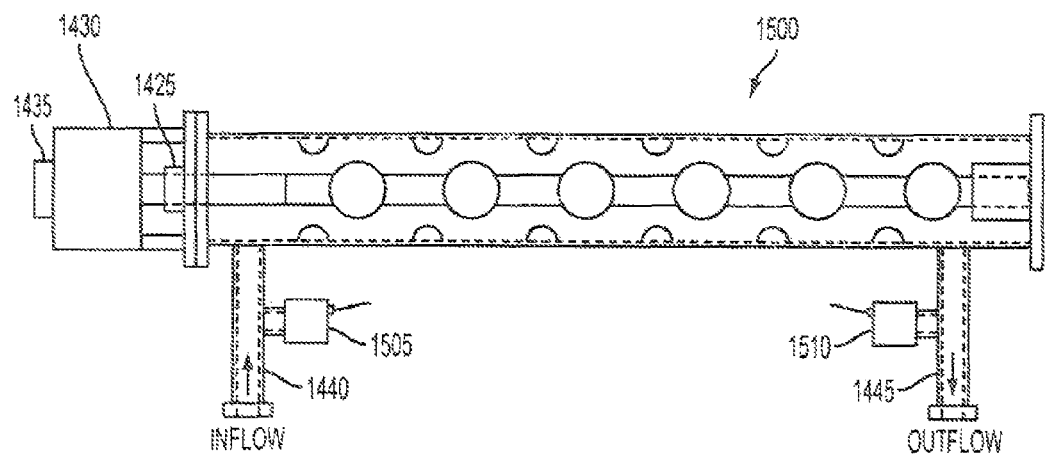

FIGS. 15A and 15B show a variable flow controller 1500 that differs from the flow controller 1400 by including an inflow pressure sensor 1505 at the inflow port 1440 and an outflow pressure sensor 1510 at the outflow port 1445. By placing a pressure sensor on each side of a single flow restricting orifice and reading the pressure differential, volumetric flow rate may be determined. The integration and combination of these sensors into a digital series flow restricting node flow rate controller provides a highly efficient and capable fully integrated flow regulator solution. When combined with a digital flow controller as herein disclosed, the rational and useful range of differential pressure signals from the spaced apart sensors is greatly increased, often by a range of two or three times over conventional configurations.

Figure 16A:
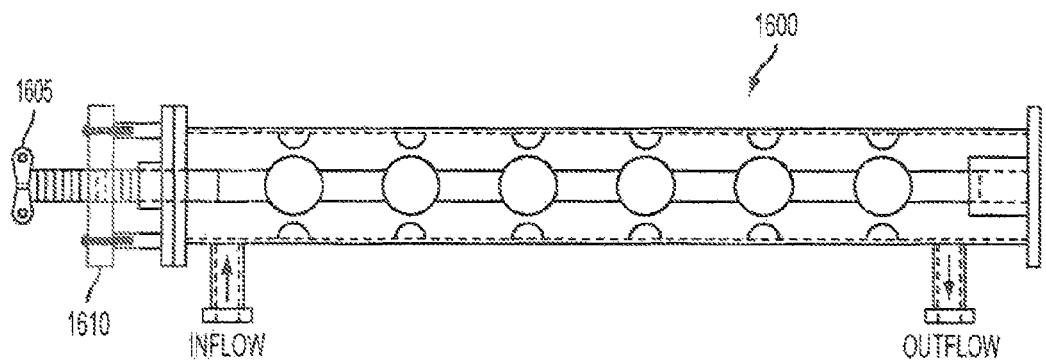
FIGS. 16A and 16B are views similar to those of FIGS. 15A and 15B but showing a manually actuated digital flow control.
Figure 16B:
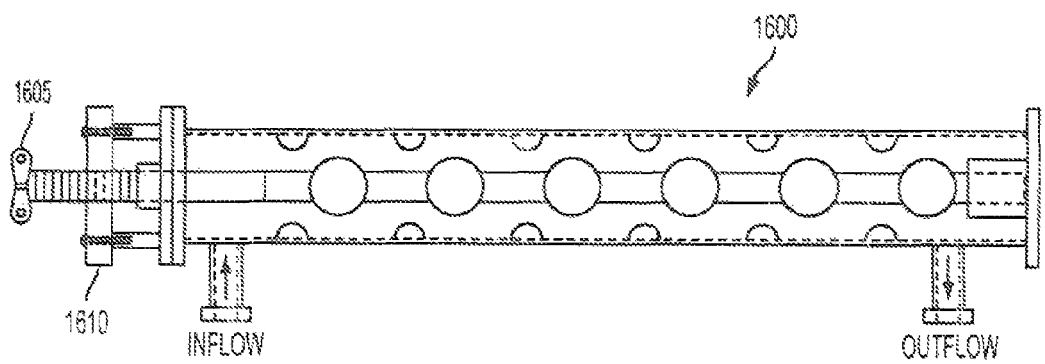

FIGS. 16A and 16B show a variable flow controller 1600 that differs from the flow controller 1400 in that the actuator 1430 is replaced with a manual actuator 1605 that extends through a threaded thrust plate 1610.

Figure 17:
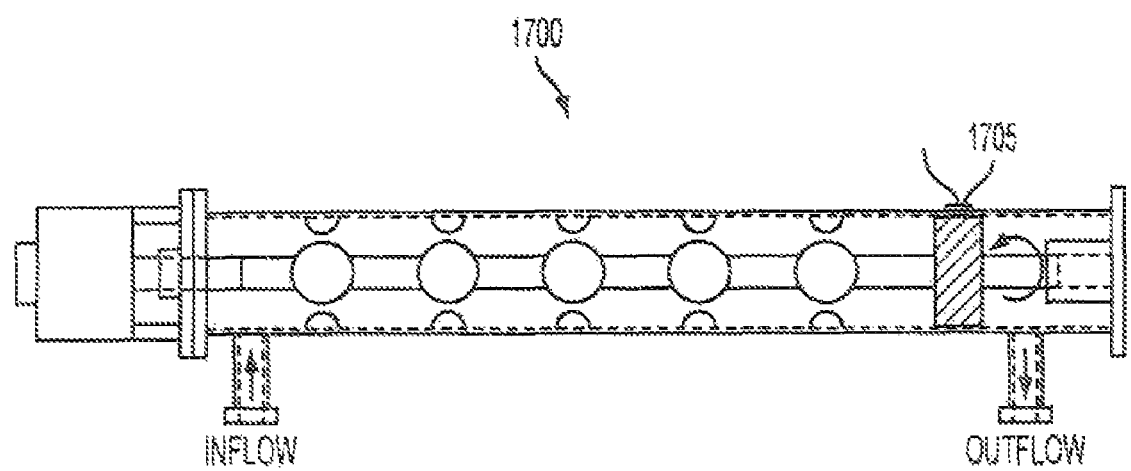
FIG. 17 shows a digital flow control with an integrated turbine flow meter forming a flow regulator.
Figure 18:
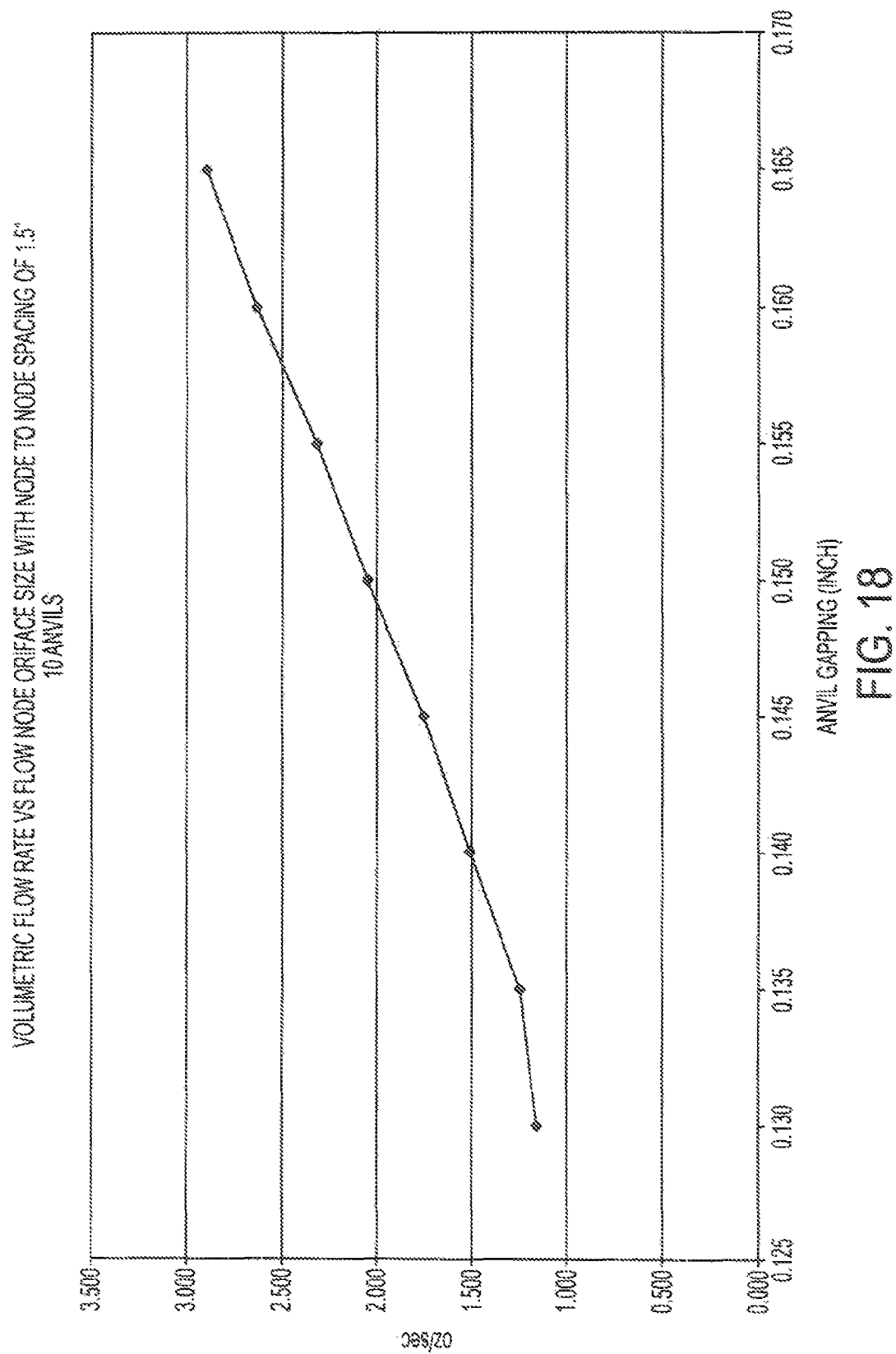
FIGS. 18-45, in the various flow plots, show the empirical behavior of various arrangements.
Figure 19:
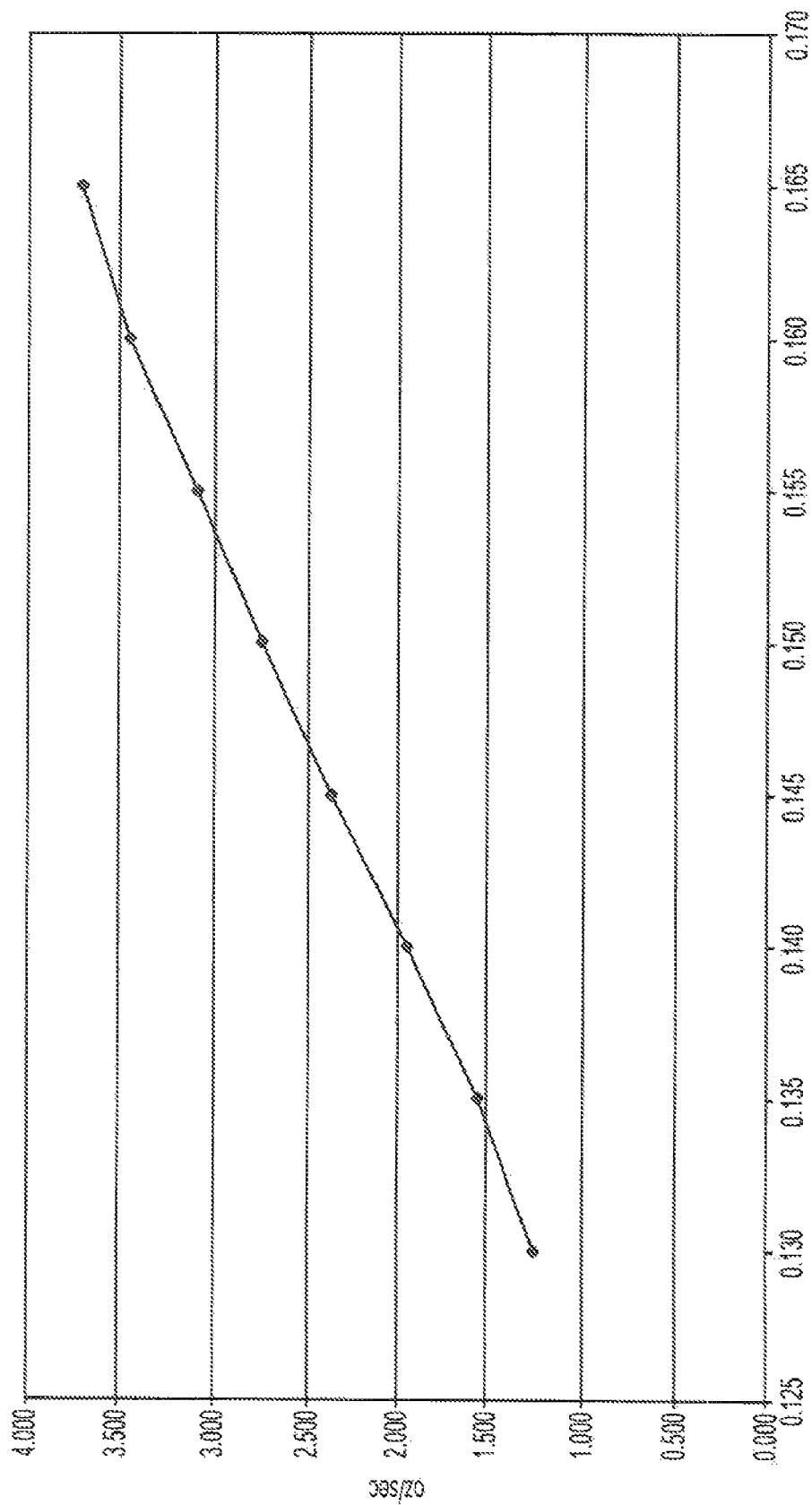
Figure 20:
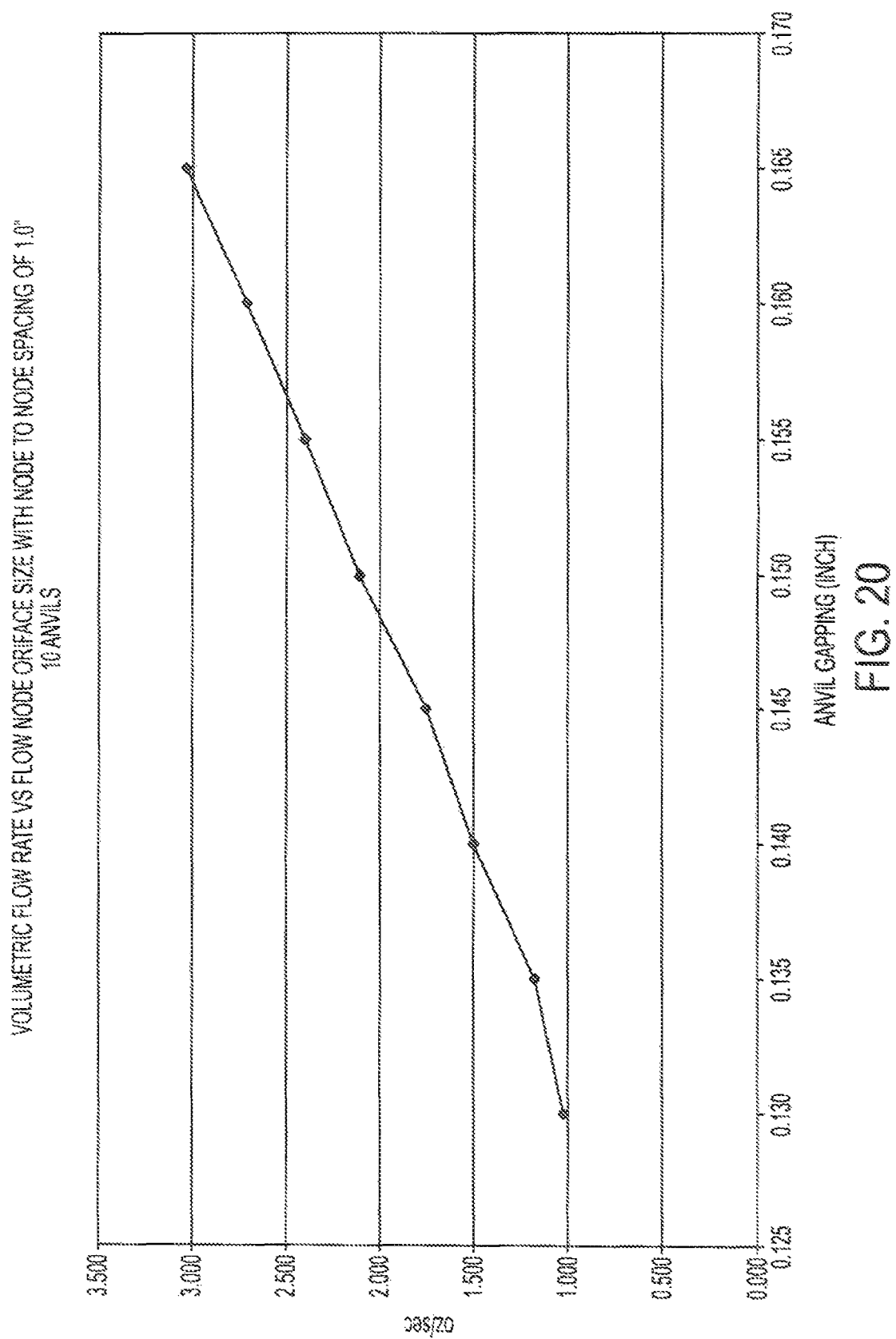
Figure 21:
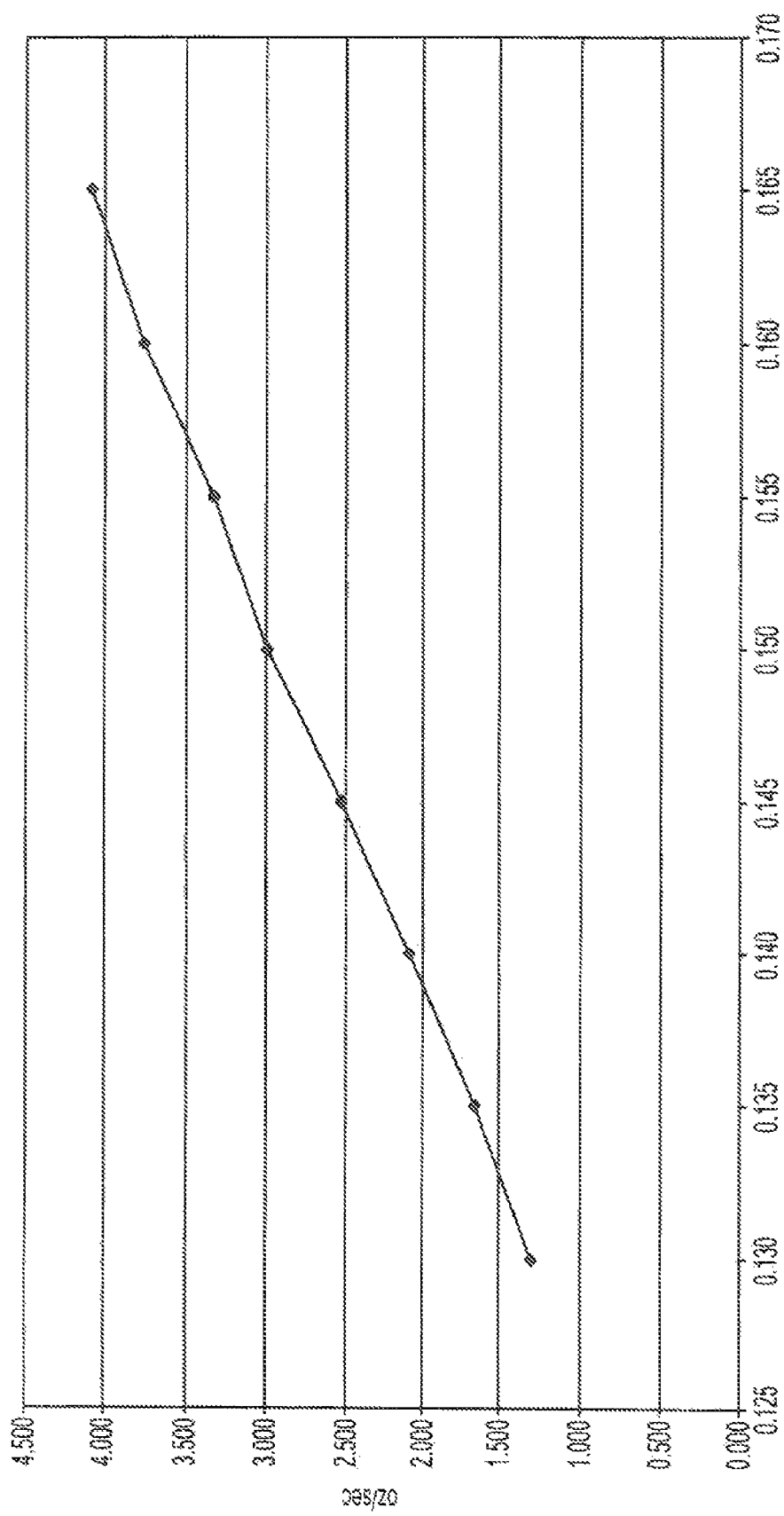
Figure 22:
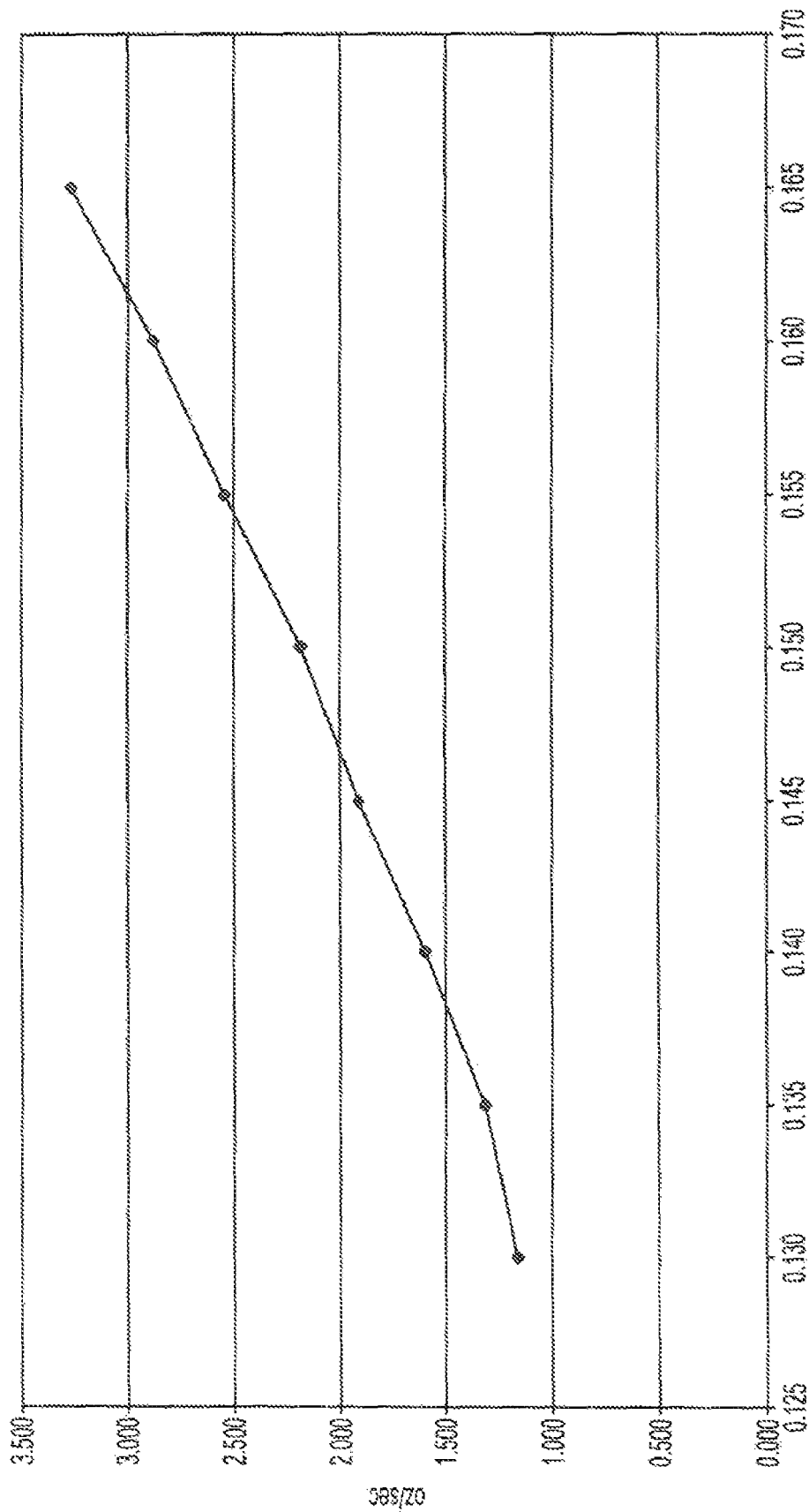

FIG. 17 shows a variable flow controller 1700 that differs from the flow controller 1400 by including an integrated turbine flow meter 1705. Inclusion of the liquid flow meter 1705 in the same liquid flow conduit as the digital flow controller permits the digital flow rate controller to function as a flow rate regulator in that it can actively hold and maintain a defined flow rate set point based upon a flow rate signal. This arrangement is particularly suited for this application because of its inherent relative linearity, its ability to be configured by adjustment, its comparatively fast speed of response, high predictability of response, essentially total lack of hysteresis or overshoot under flow adjustment, and lack of flow discontinuities in its flow rate curves, particularly at the extreme low end and extreme high end of useful flow range of a particular device.

FIG. 13 somewhat schematically shows another embodiment in which shaft mounted spheres are manually movable coaxially in relation to hemispherical-circumferential elements fitted periodically to the internal diameter of a suitable rigid flow containment cylinder. Each pair of these structures comprises a series integrated flow rate node and varying the relative position of the annular or doughnut shaped orifice formed between the paired elements of each node can vary flow rate in a nearly linear manner.

In the 48 flow plots depicted in FIGS. 18 to 45, the empirical behavior of various implementations of the device is extensively presented, with these data and graphs serving as the basis for further comments and analysis on the functional flow rate behavior of the device. The plots illustrated in FIGS. 18-23 are examples of graphical plots of empirical flow data correlating flow rate expressed in fluid ounces per second against the flow node flow aperture diameter in fractional inches, defined as the compression gap or interval set consistently between each flow node defining an anvil pair (where an "anvil" is a structure that serves to define the flow node). The general form of the flow control used to gather this data is shown variously in FIGS. 1, 11, and 13. Flexible flow conduit size and flow pressure were held constant, while anvil spacing was varied over a 2:1 range and anvil count was varied over a 2:1 range.

Figure 23:
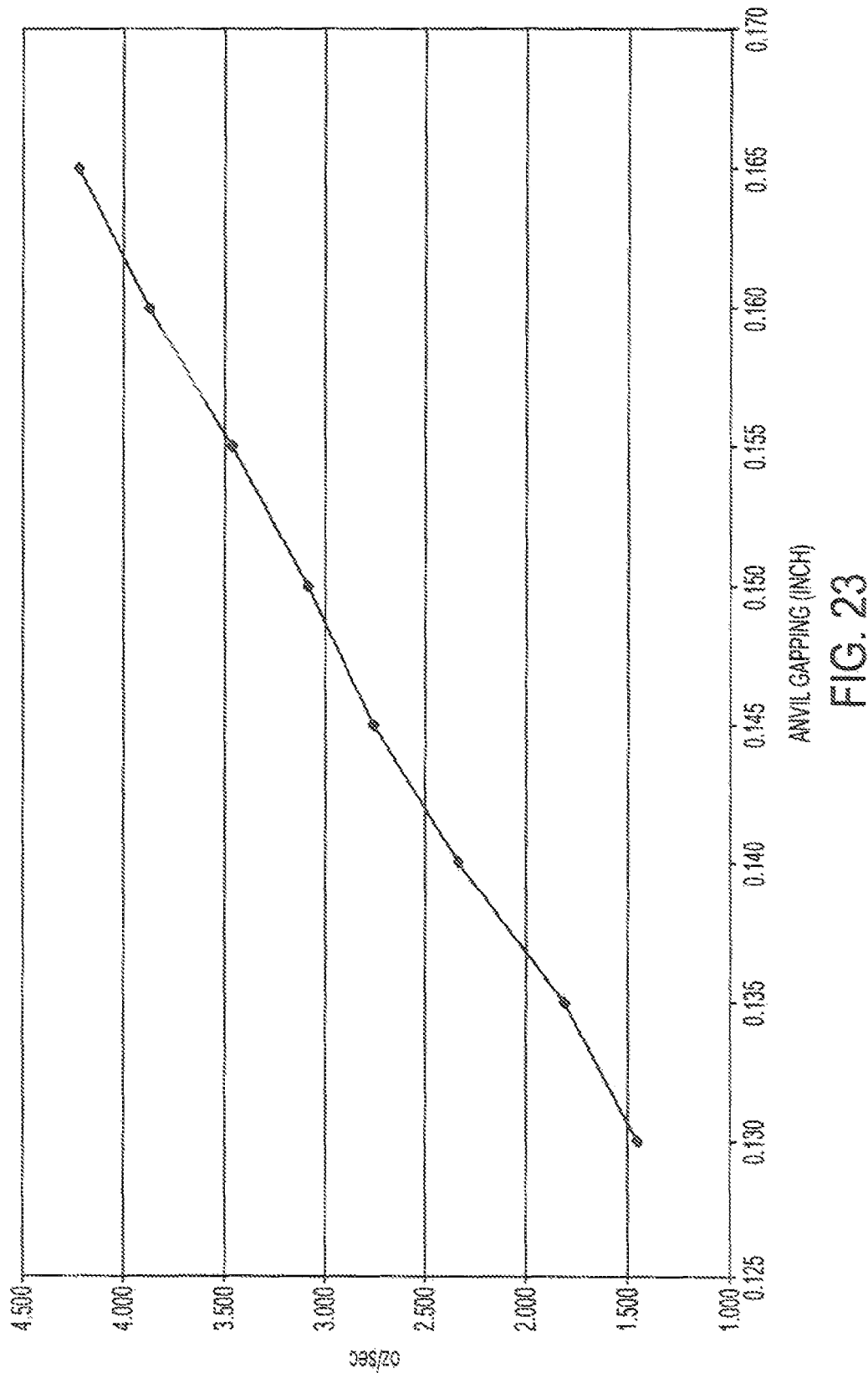
Figure 23A:
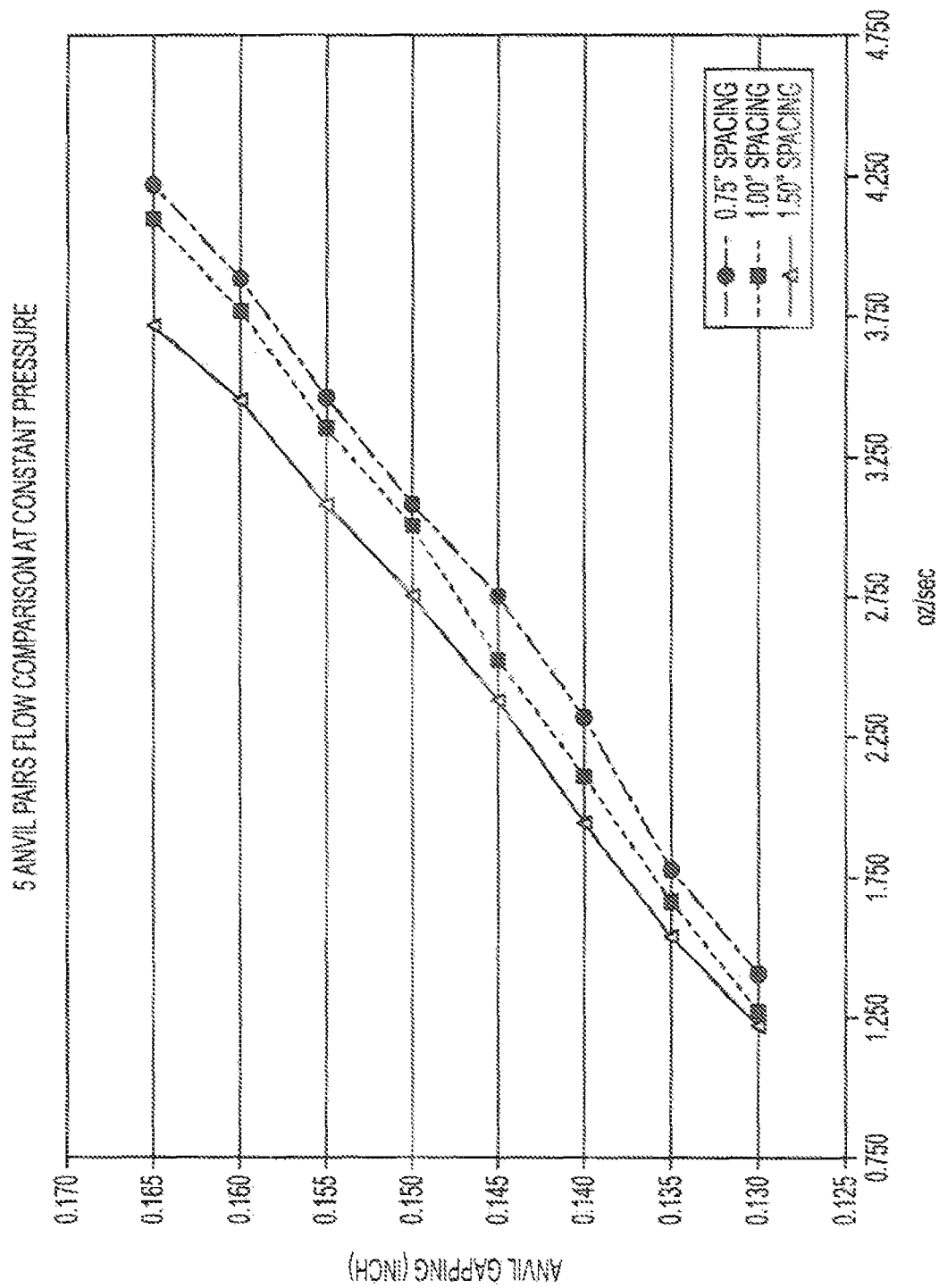
Figure 23B:
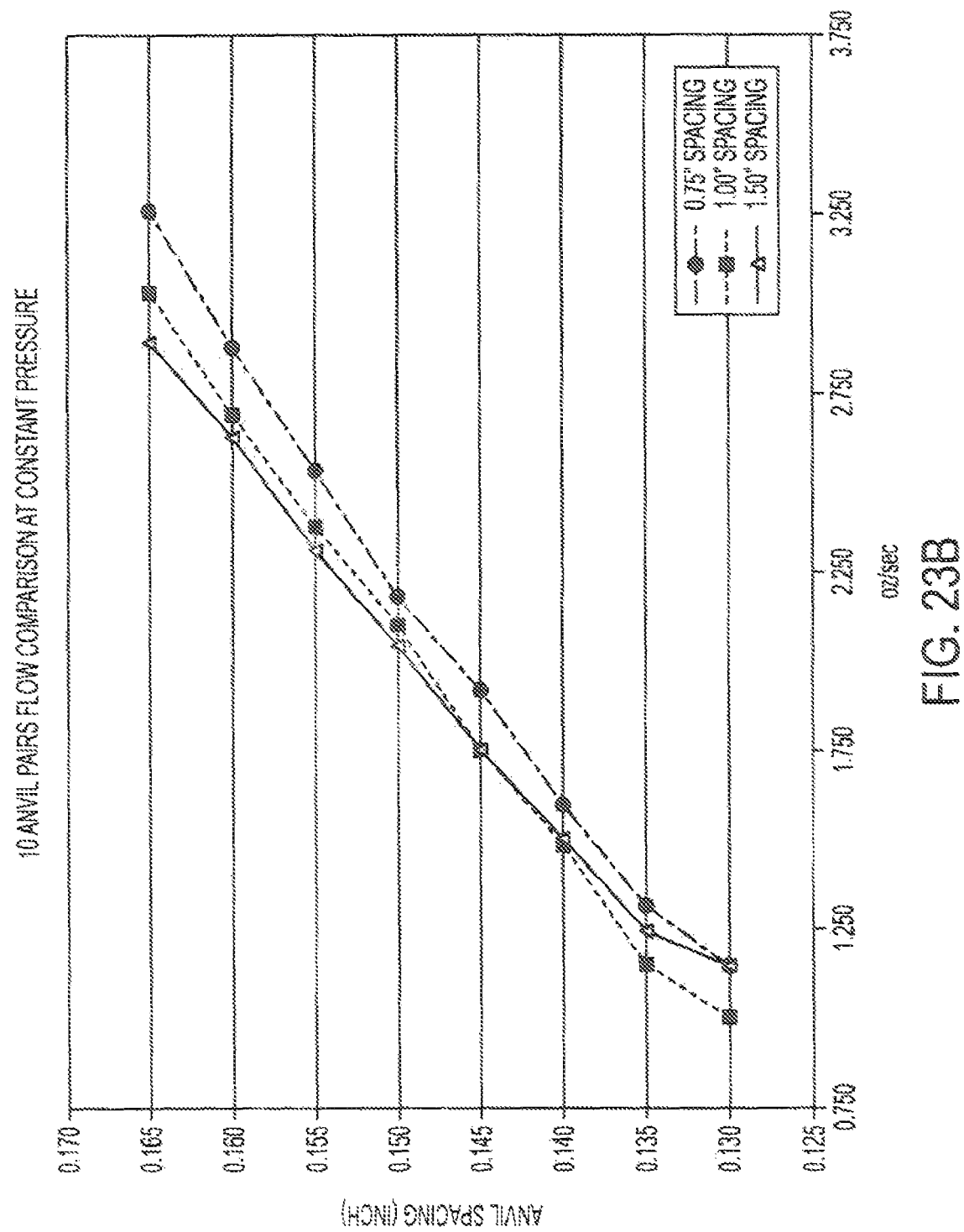
Figure 24A:
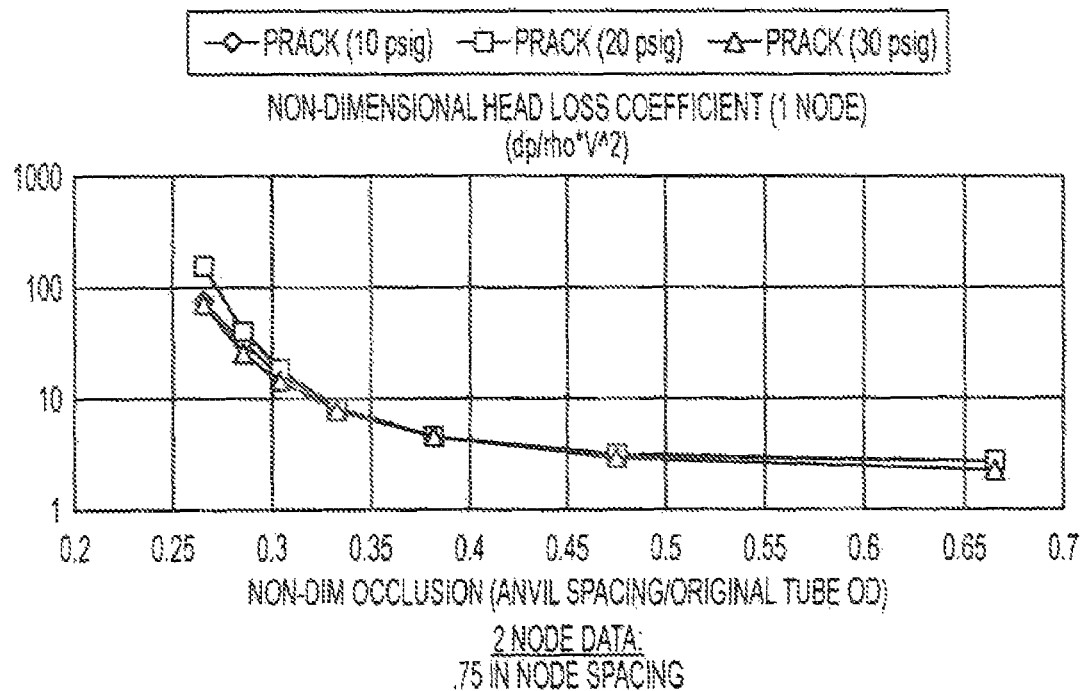
Figure 24B:
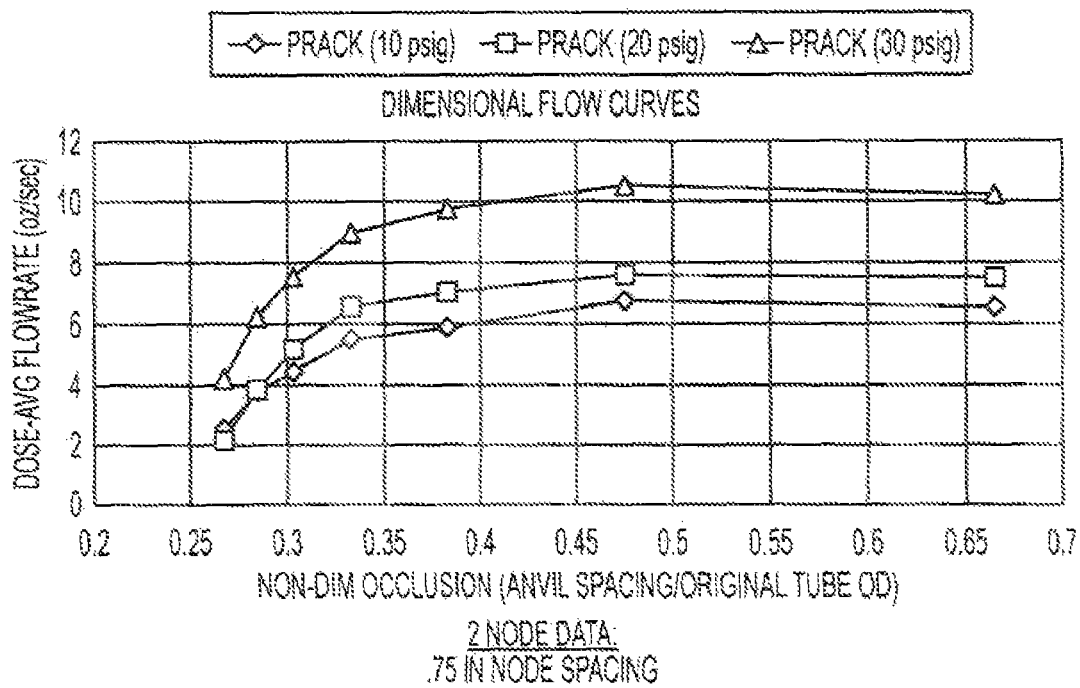

FIGS. 23A and 23B summarize these flow relationships, which can be shown to be representative of results with a broad range of flexible tube sizes and flow pressures. Thus, the flow control devices can be empirically shown to produce an average change in flow of 13.75 percent at a constant flow conduit diameter, constant flow pressure, and setting of the flow nodes gap ranging from about 0.35 to about 0.44 of the uncompressed inside diameter of the tube (termed herein as the flow orifice ratio), when the flow node count range is varied over a range of 5 nodes to 10 nodes (2:1 range) and when the center-to-center spacing of the nodes is varied from 0.75 inches to 1.5 inches (2:1) range. The flow change is inverse in relationship to the spacing of the flow nodes. Thus, flow can be varied as specified merely by changing the flow nodes spacing.

Linearity of flow rate with a change in flow nodes flow aperture sizing is also summarized in FIGS. 23A and 23B over the same range of test conditions as defined above. Thus, over the flow node aperture range defined by anvil gapping of about 0.35 to about 0.44 of the uncompressed inside diameter of the flexible tube, linearity is within 2.5 percent or better across a flow range that varies at least 3.5 times from minimum flow to maximum flow.

FIGS. 32A, 32B, 33A, and 33B are flow curve examples that show that the linear operation of the multi-node devices can be subdivided into two separate zones based upon the relative degree of flow aperture or orifice restriction expressed as a ratio of flow anvil spacing to the uncompressed inside dimension of the flexible flow tube. Thus, in the example of FIGS. 33A and 33B, at an illustrated 3:1 pressure range, a first linear range exists from an aperture ratio of 0.35 to 0.44. A second linear range extends from an orifice ratio of 0.60 to 0.87. Because of this dual zone linearity, a flow control capability is recognized in which a coarse adjustment control of flow rate and a fine adjustment control of flow rate are possible. Consider, in FIGS. 33A and 33B, that adjustment in the first linear zone of the flow aperture ratio of 0.35 to 0.44 changes flow rate through the device by a factor of 4:1 in the case of the highest pressure operating curve shown. In the second linear zone, adjustment from a flow aperture ratio from 0.67 to 0.87 changes flow rate through the device by a ratio of 1.1:1. Thus, in the first zone, each 0.01 increment of aperture ratio change causes a flow change of 0.11 of the 4:1 range. In the second zone, each 0.01 increment of aperture ratio causes a flow change of 0.037 of the 1.1:1 range. Thus, the span and resolution of adjustment per increment of flow aperture ratio change are different in each case. This, in turn, allows the flow control device to be adjusted on a coarse and fine basis.

As another example of the coarse and fine adjustment, consider a unitized ten flow node element device in which five flow nodes are adjusted to approximately reach a desired flow within the first linear zone range. The remaining five node can then be used to adjust flow with significantly higher resolution in order to more precisely and more easily reach the exact desired flow rate value. This allows adjustments that are easier and faster to achieve and reduces the effects of setpoint undershoot and overshoot (manual or automatic) or a desired flow rate setpoint. This benefit can also be gained by using two separate devices in series flow, one operating in the high resolution zone, and one operating in the low resolution zone.

Figure 25:
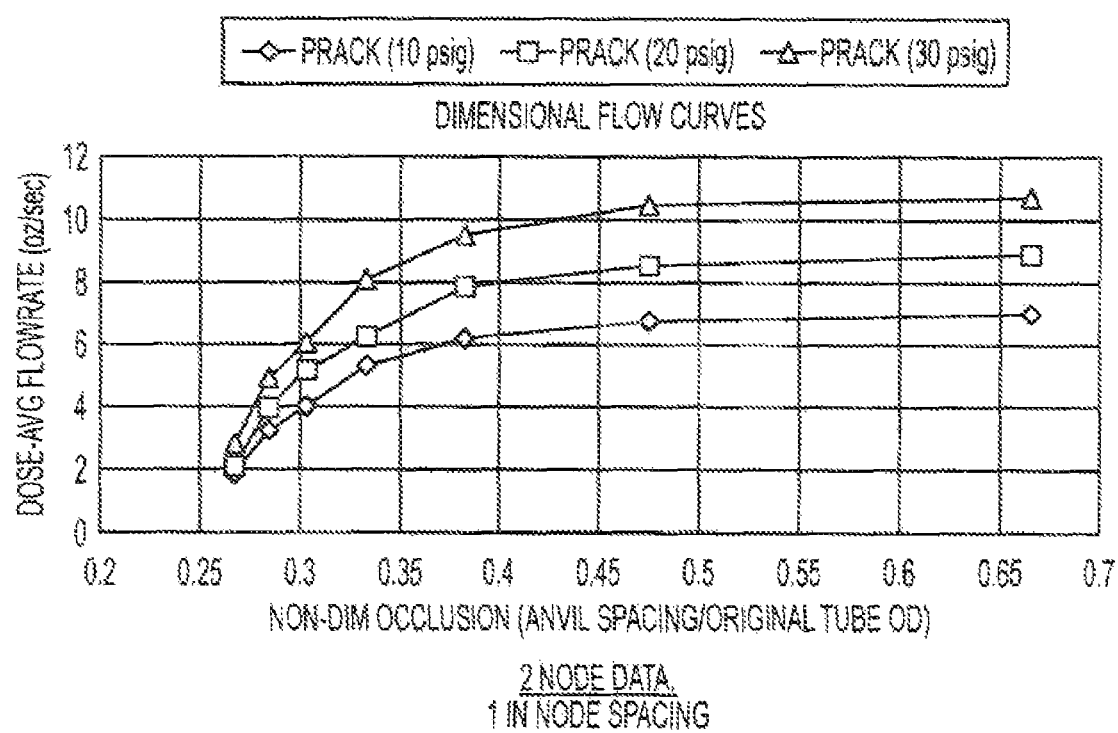
Figure 26A:
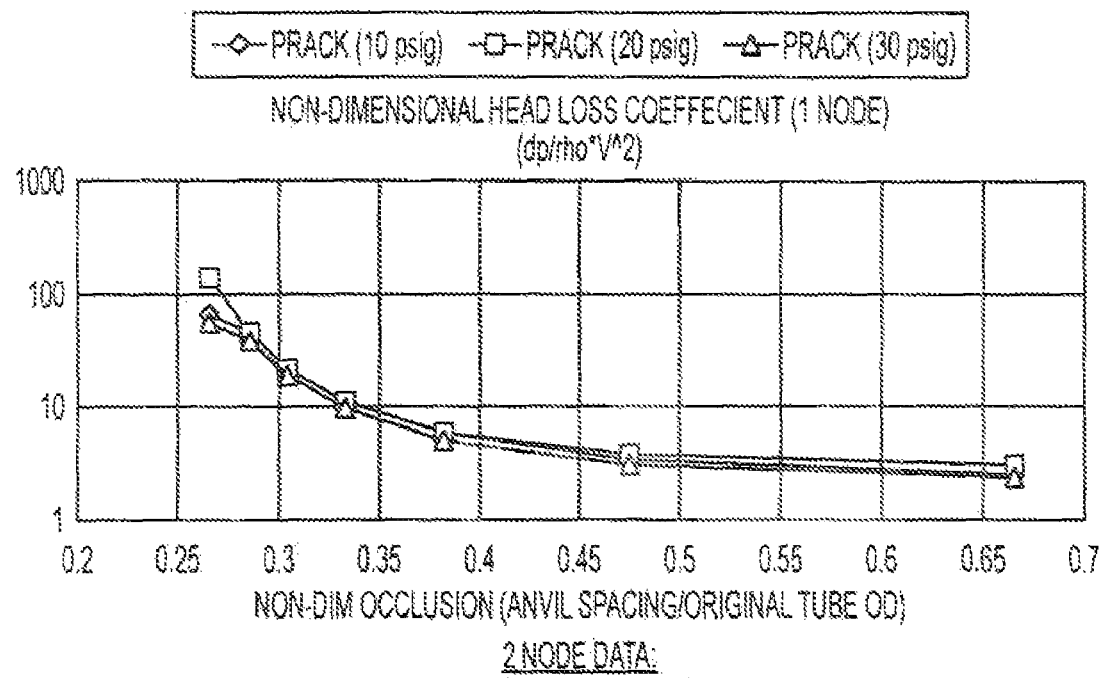
Figure 26B:
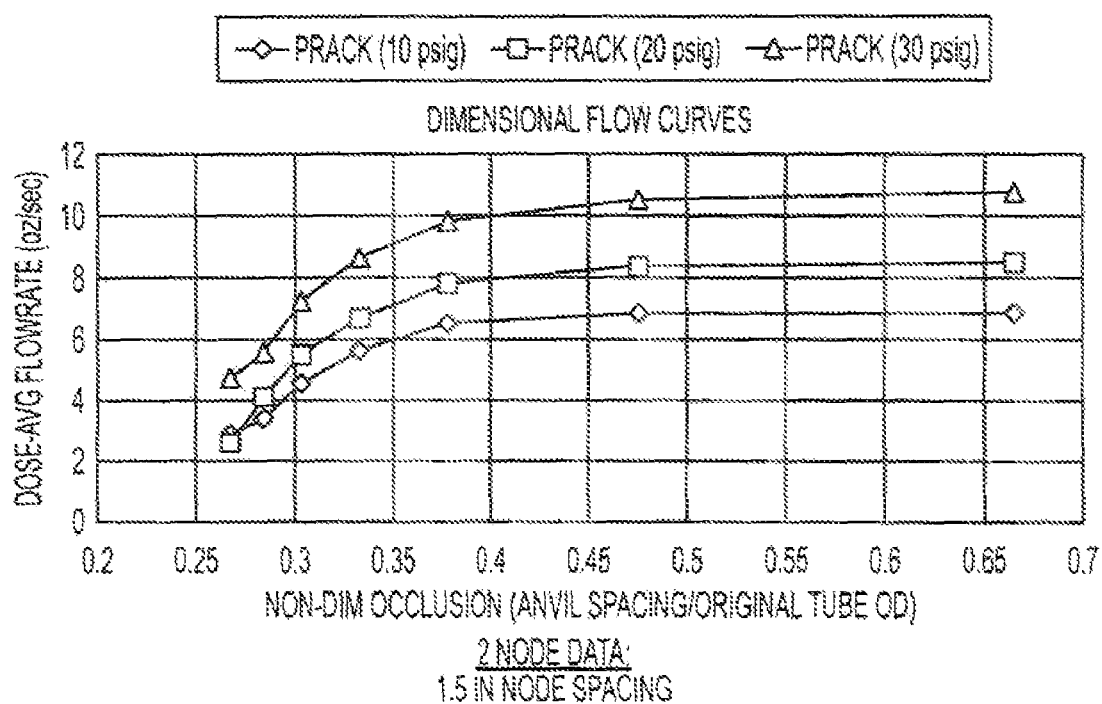
Figure 27A:
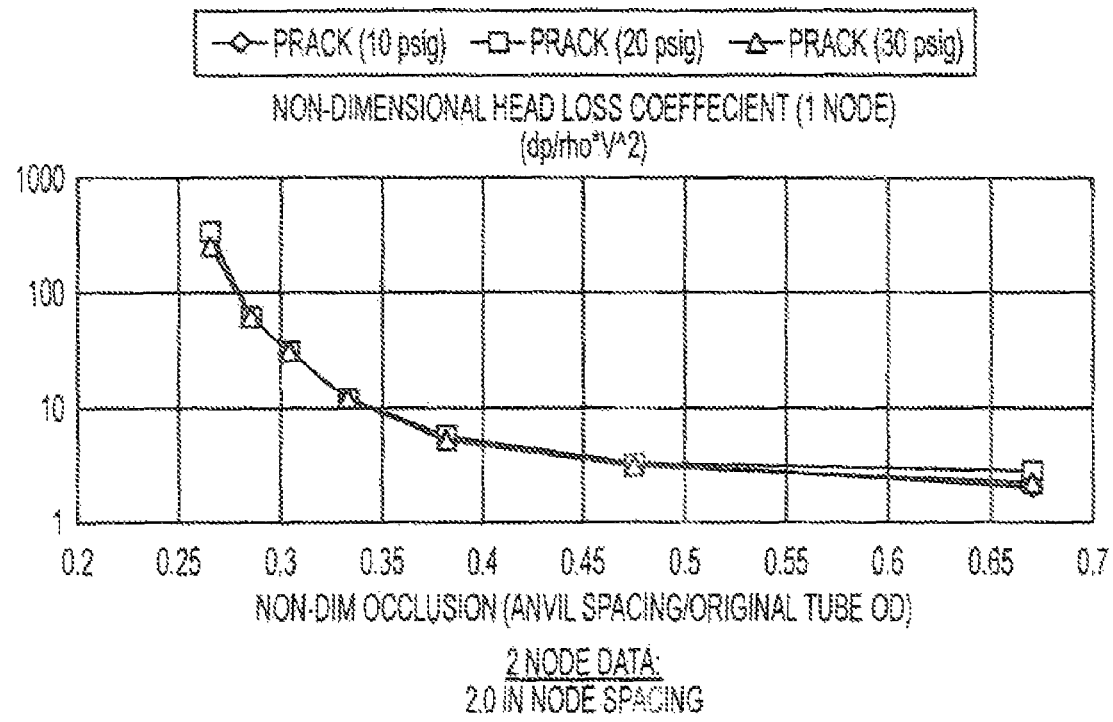
Figure 27B:
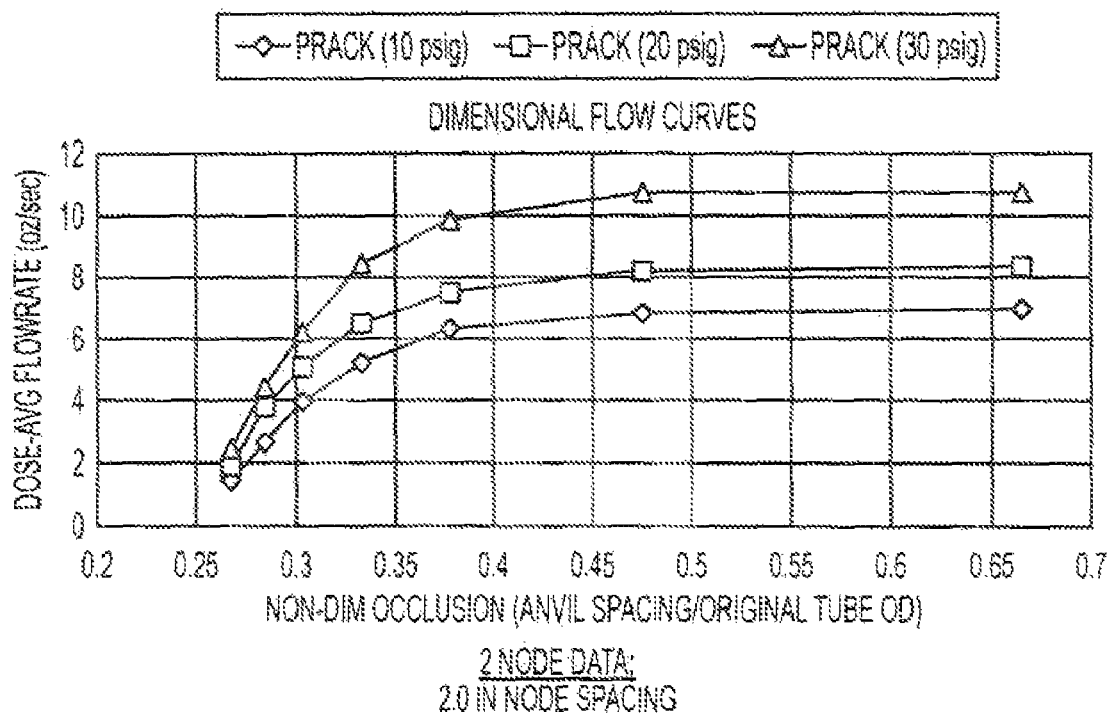
Figure 28A:
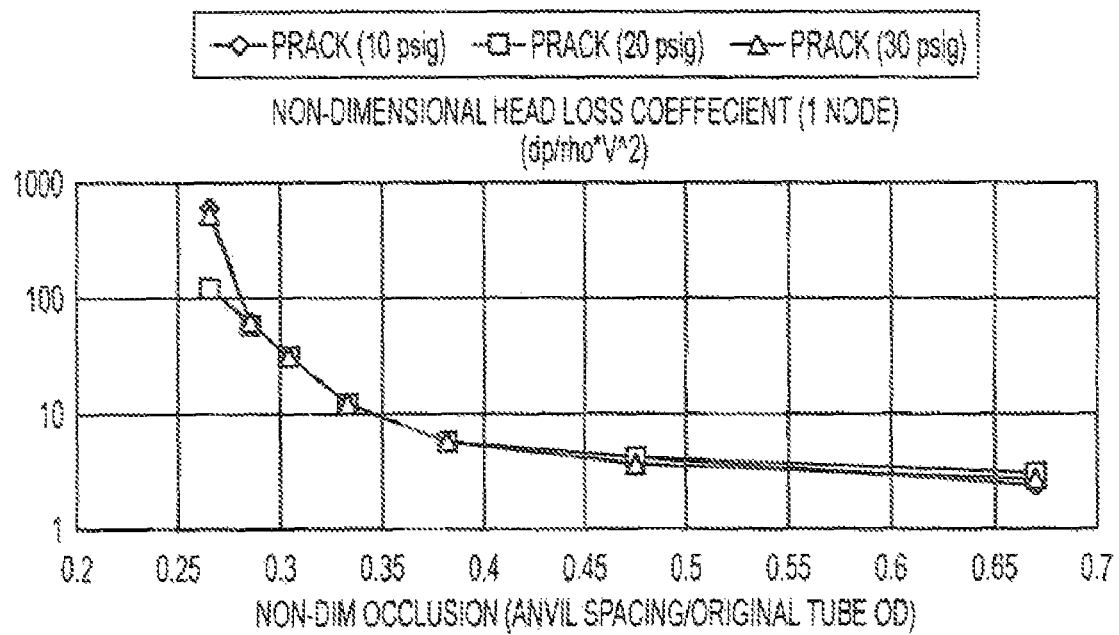
Figure 28B:
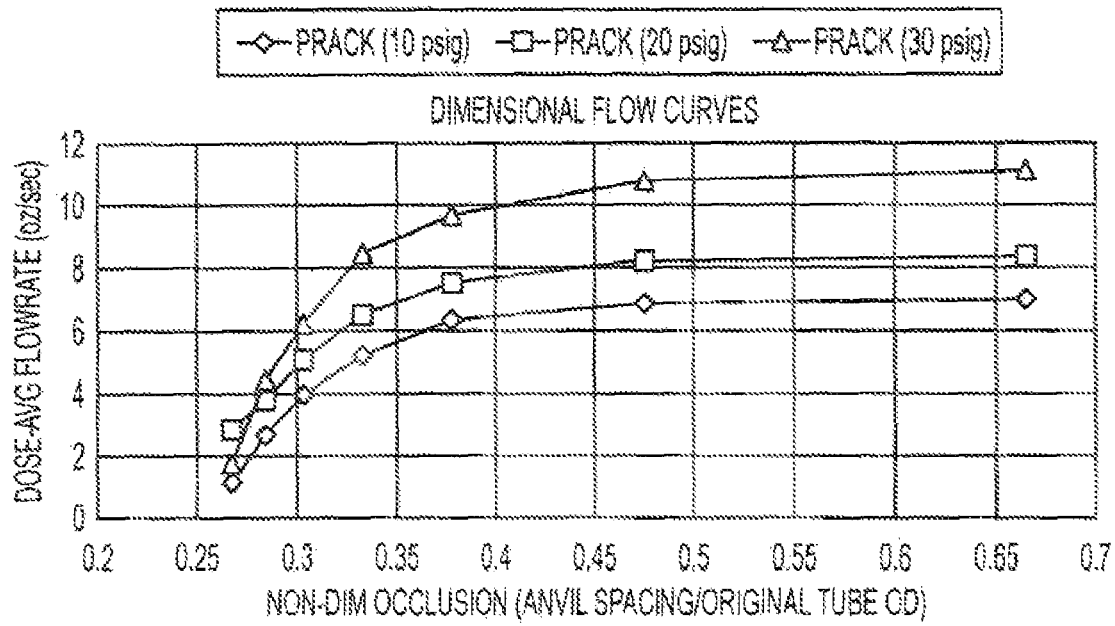
Figure 29A:
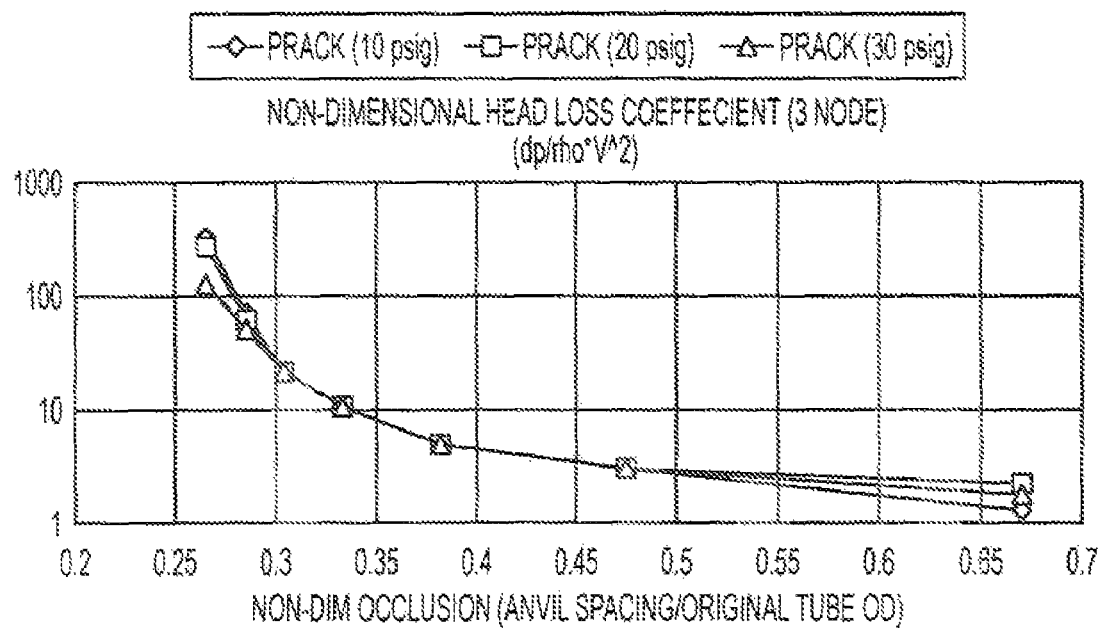
Figure 29B:
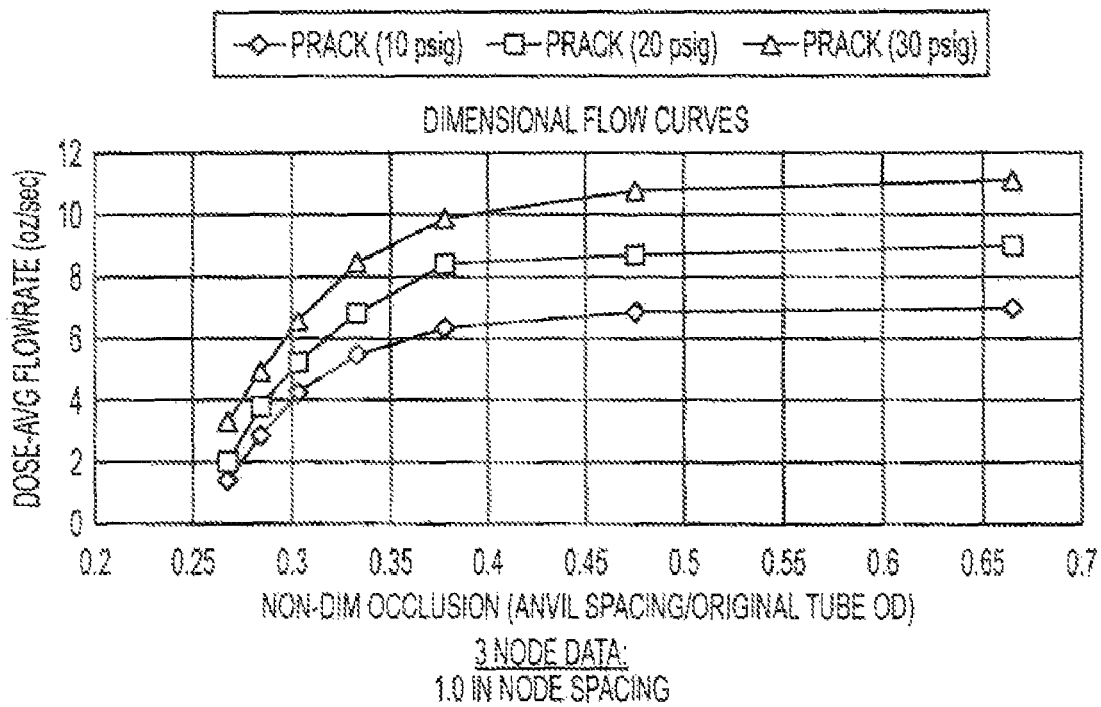
Figure 30A:
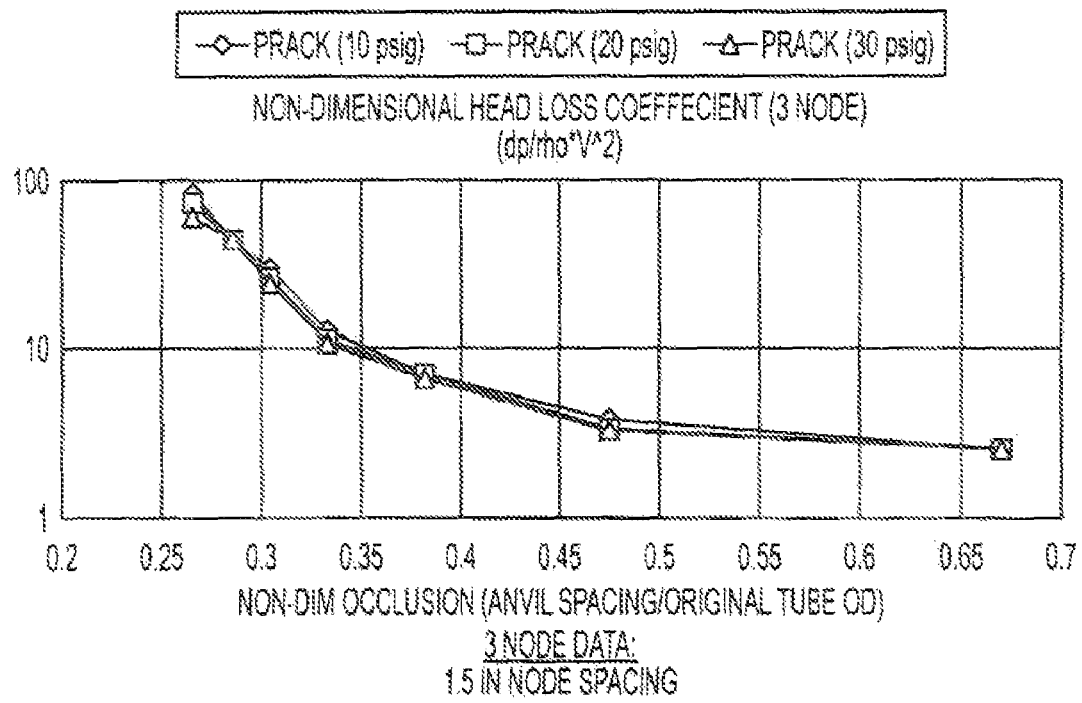
Figure 30B:
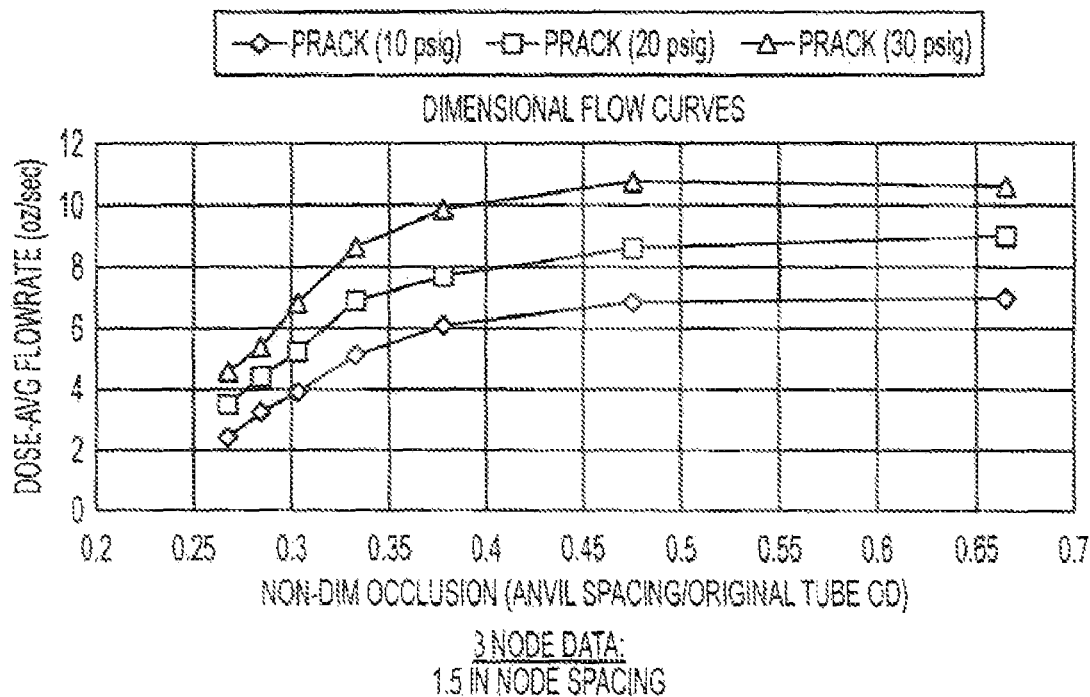
Figure 31A:
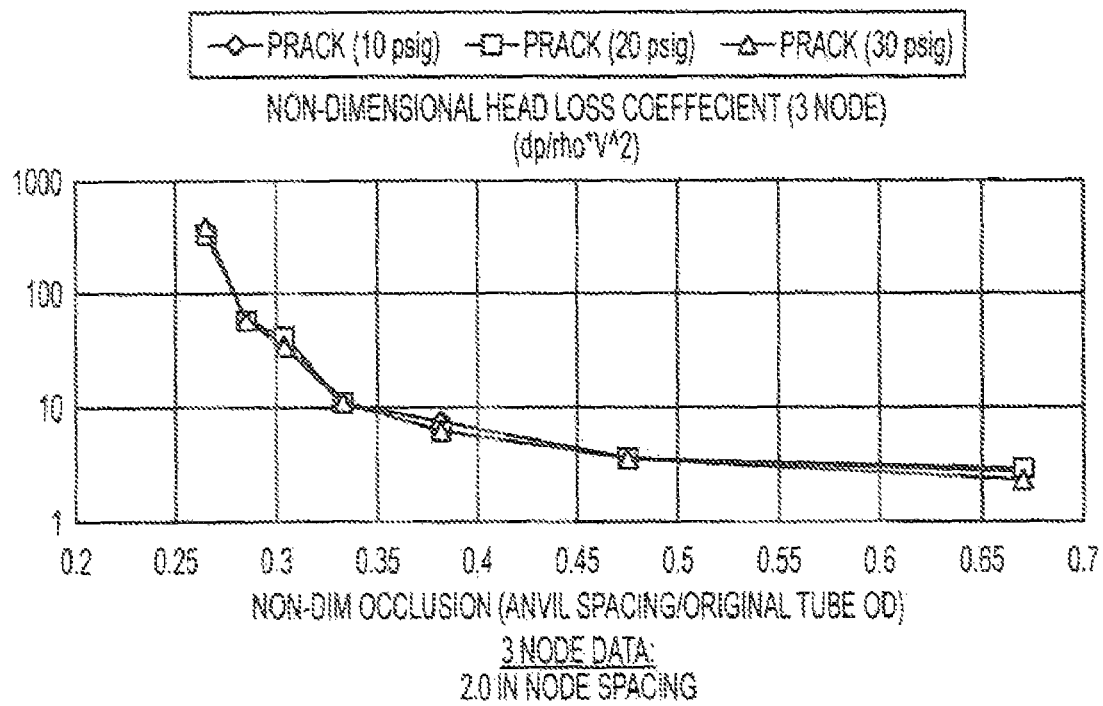
Figure 31B:
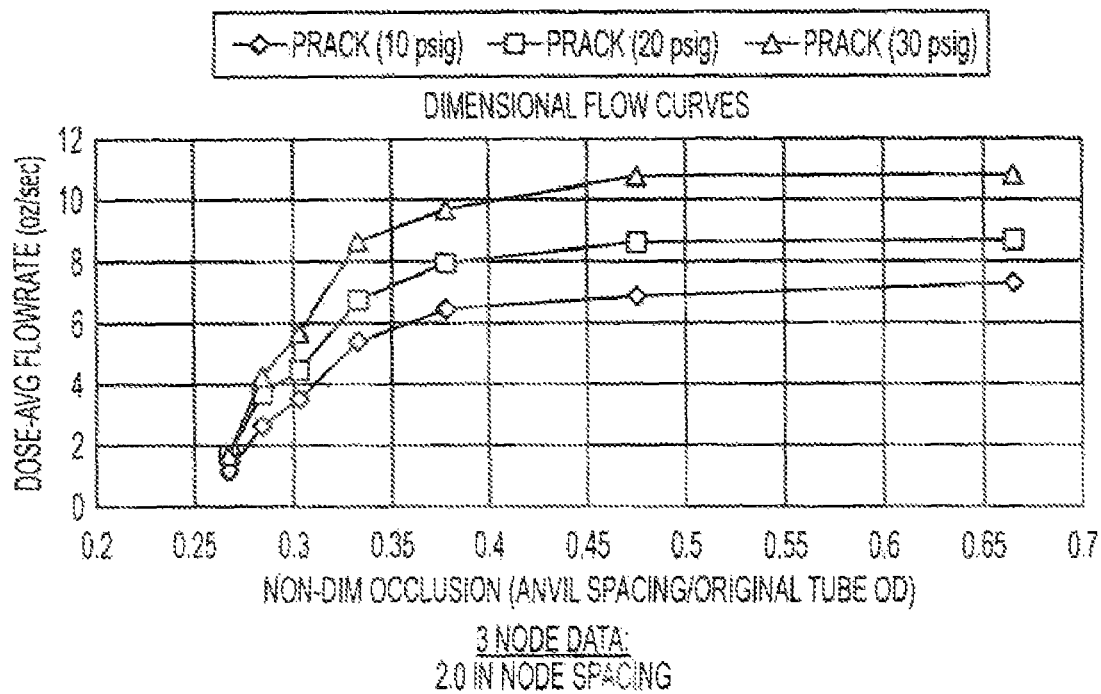
Figure 32A:
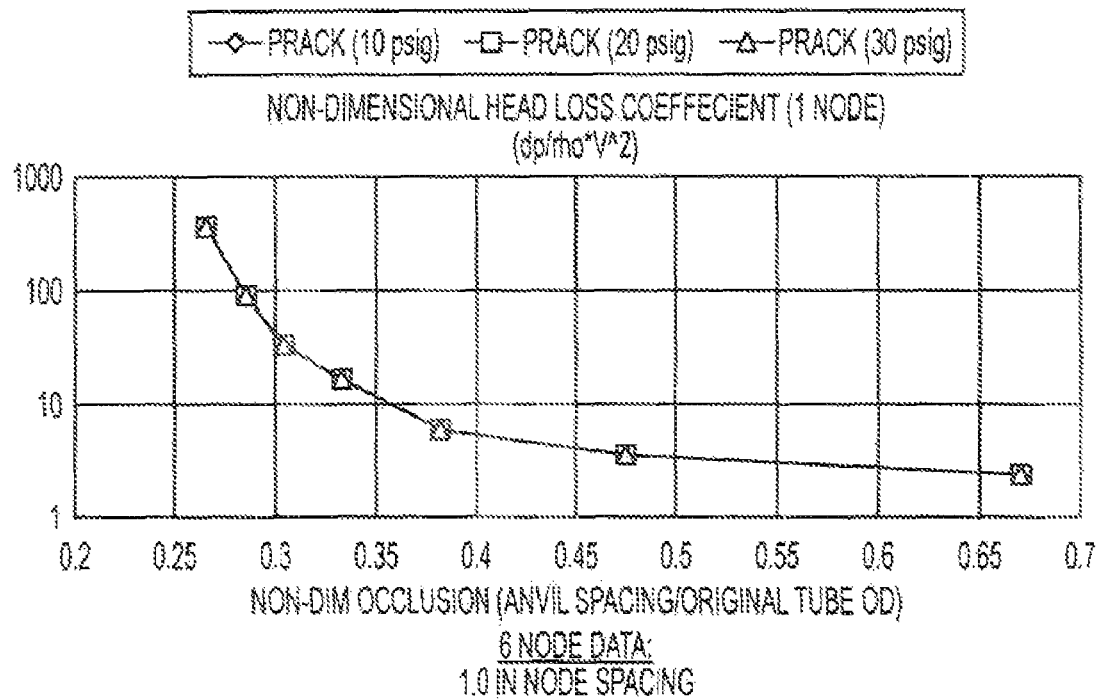
Figure 32B:
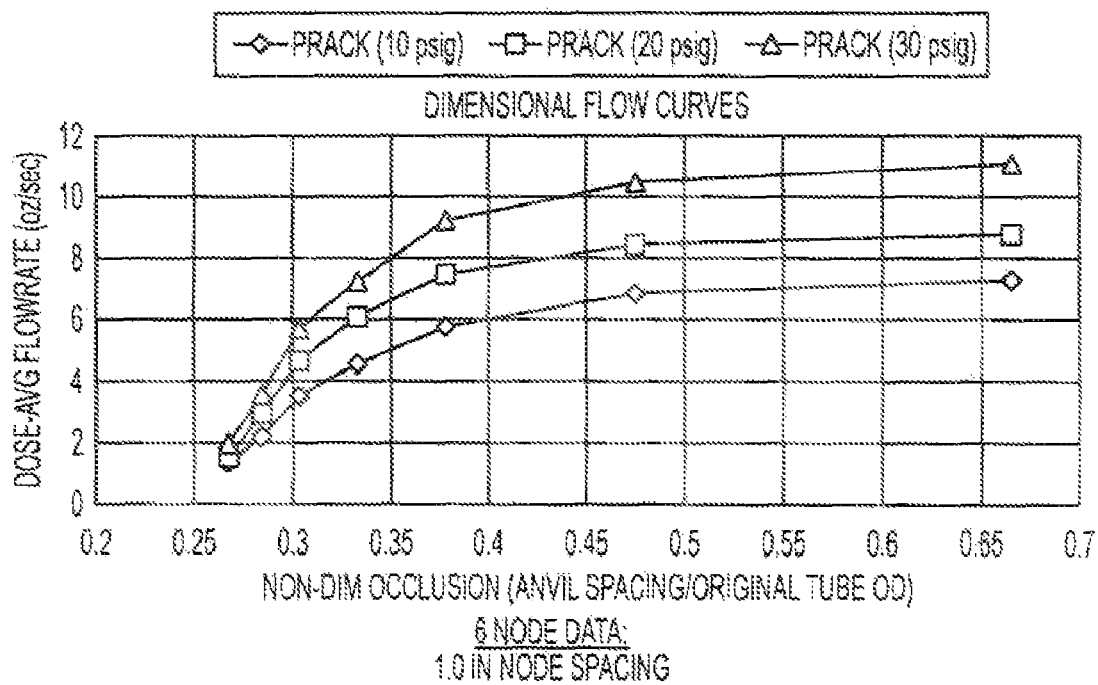
Figure 33A:
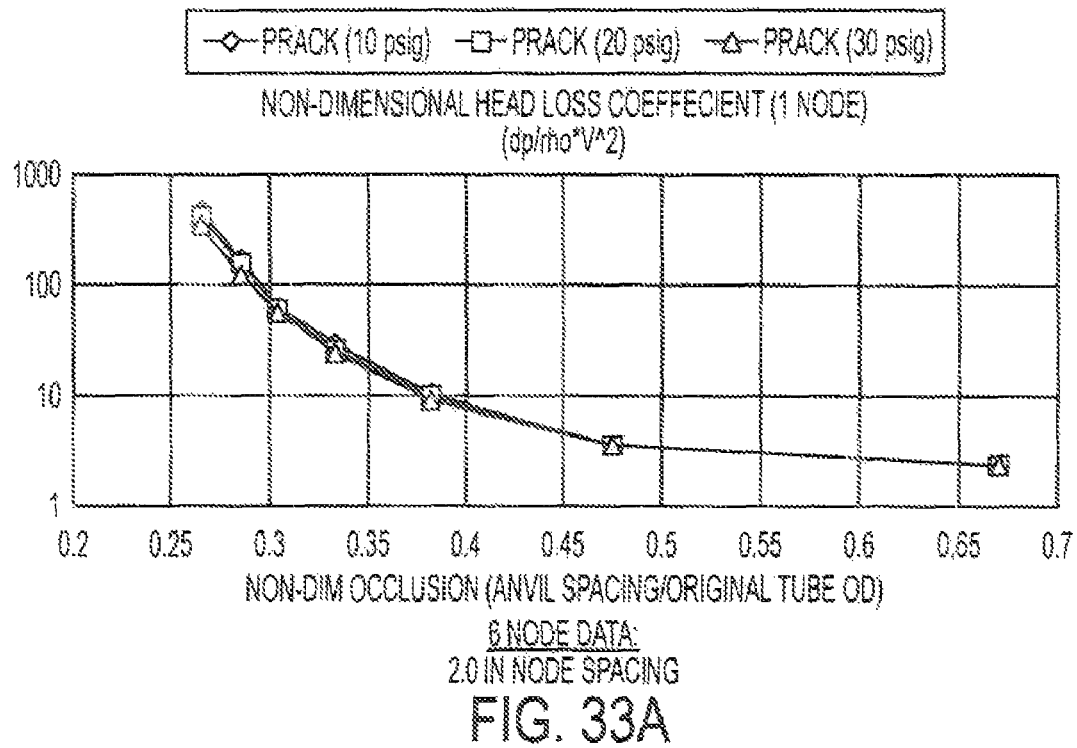
Figure 33B:
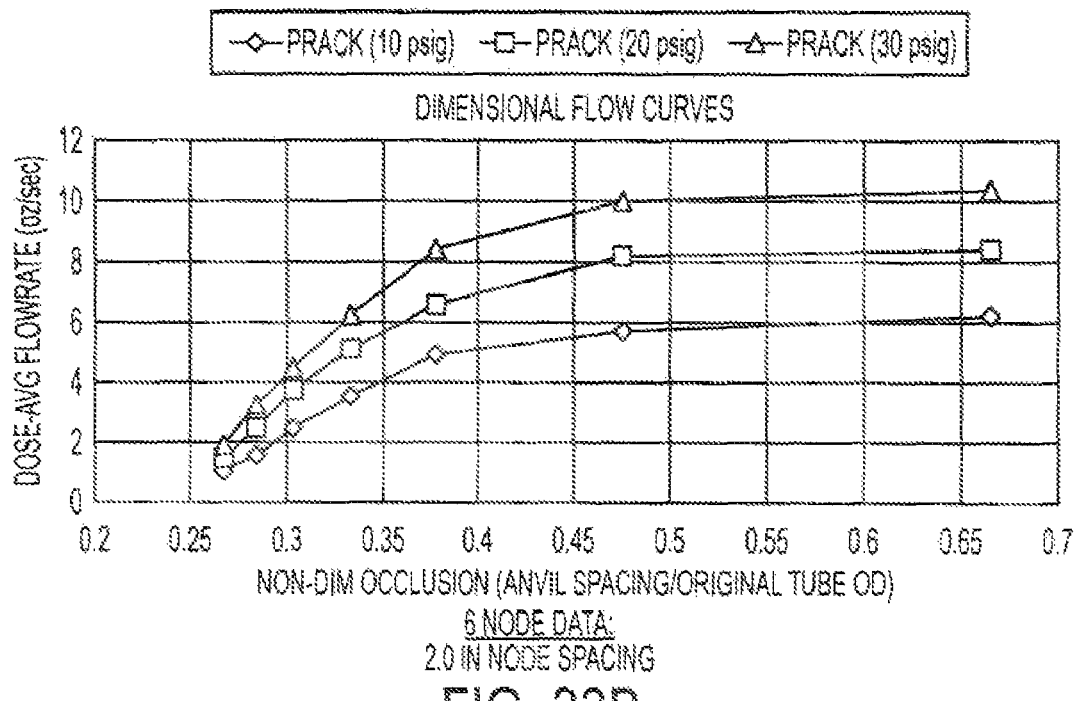
Figure 34:
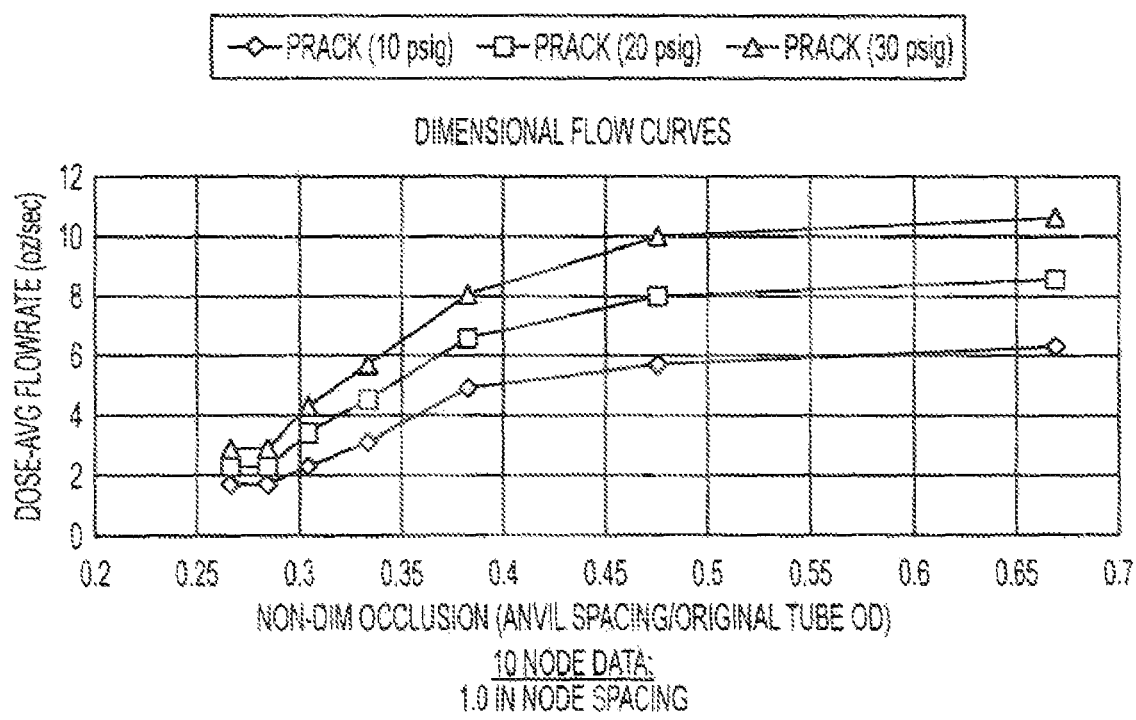
Figure 35A:
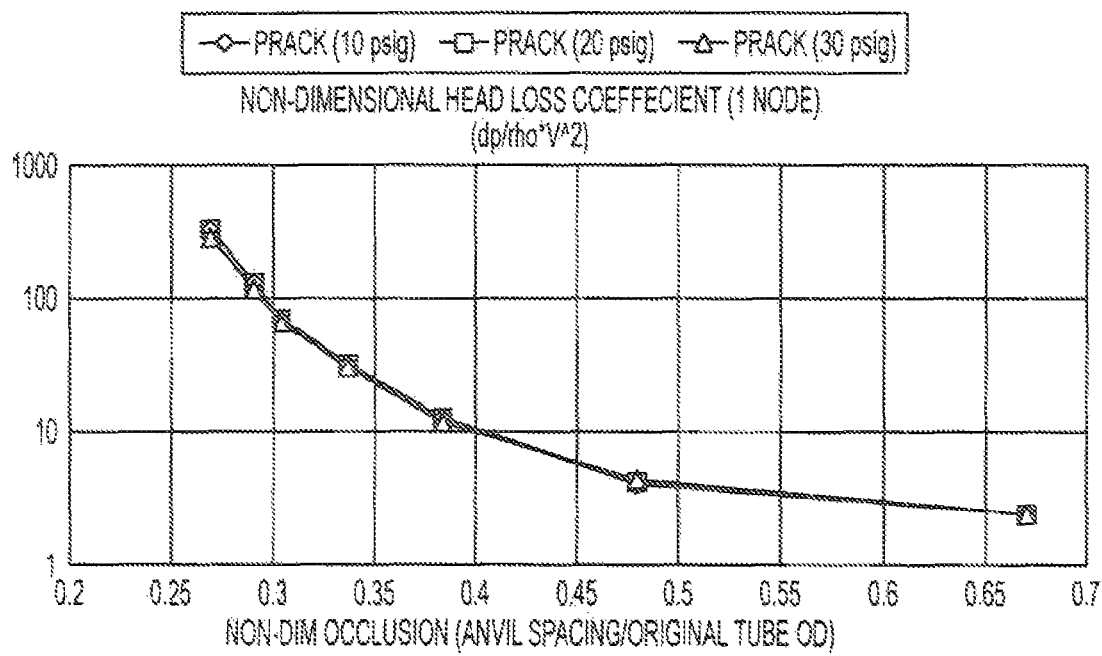
Figure 35B:
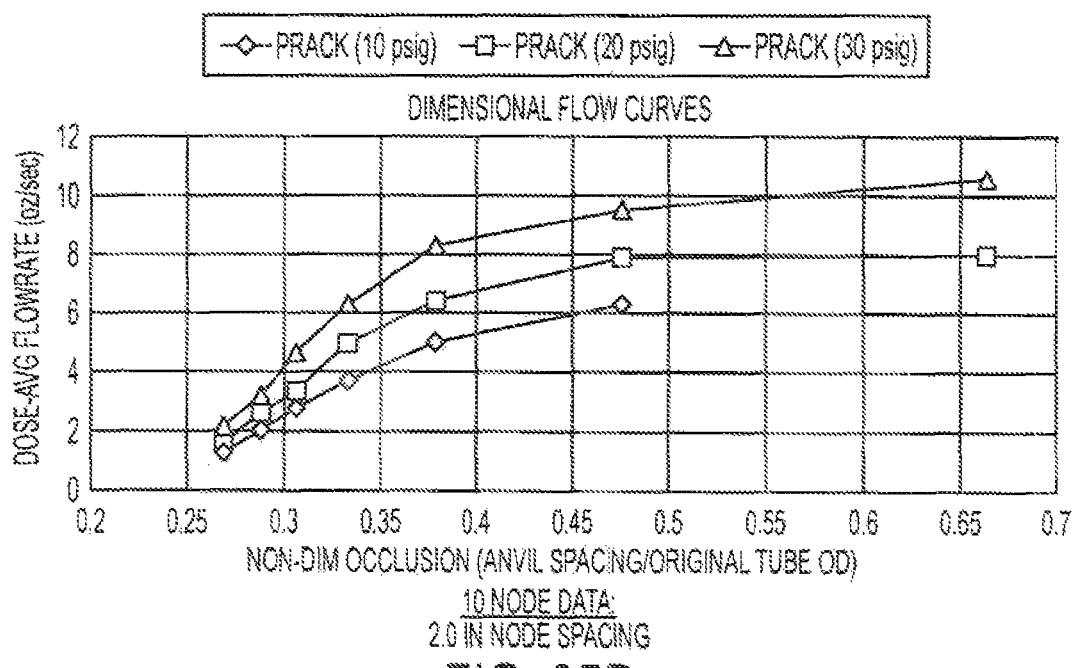
Figure 36B:
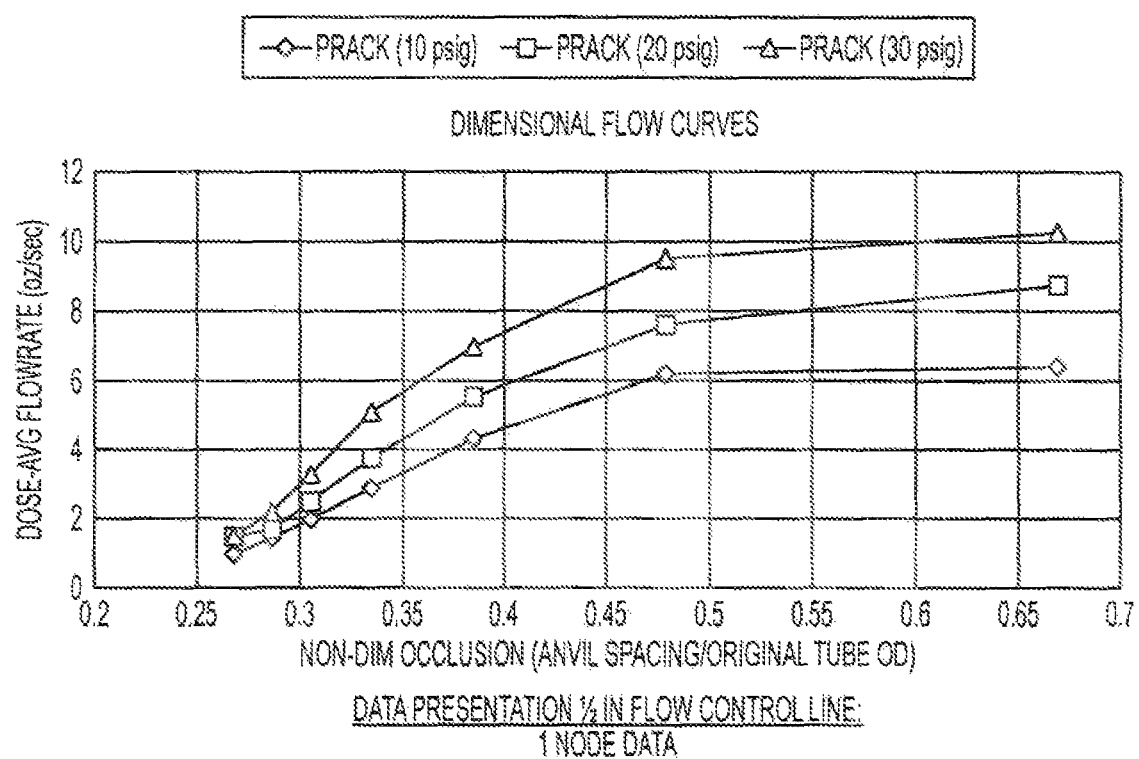
Figure 37:
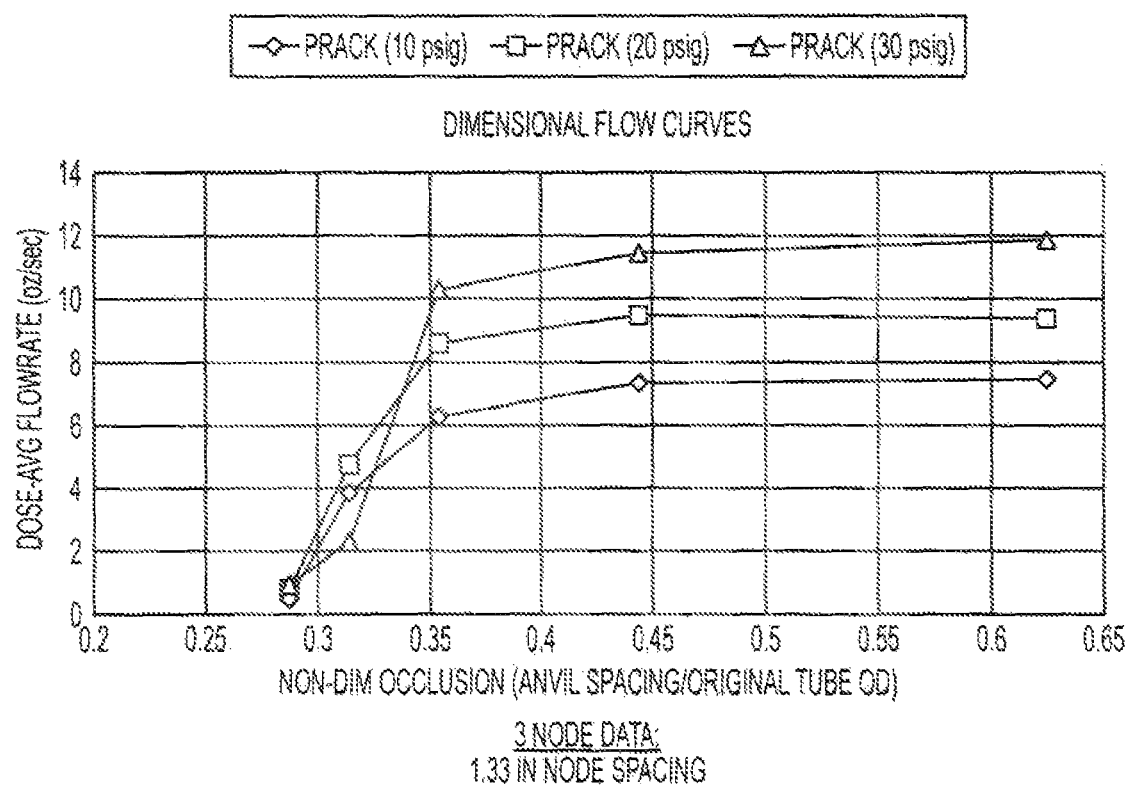
Figure 38A:
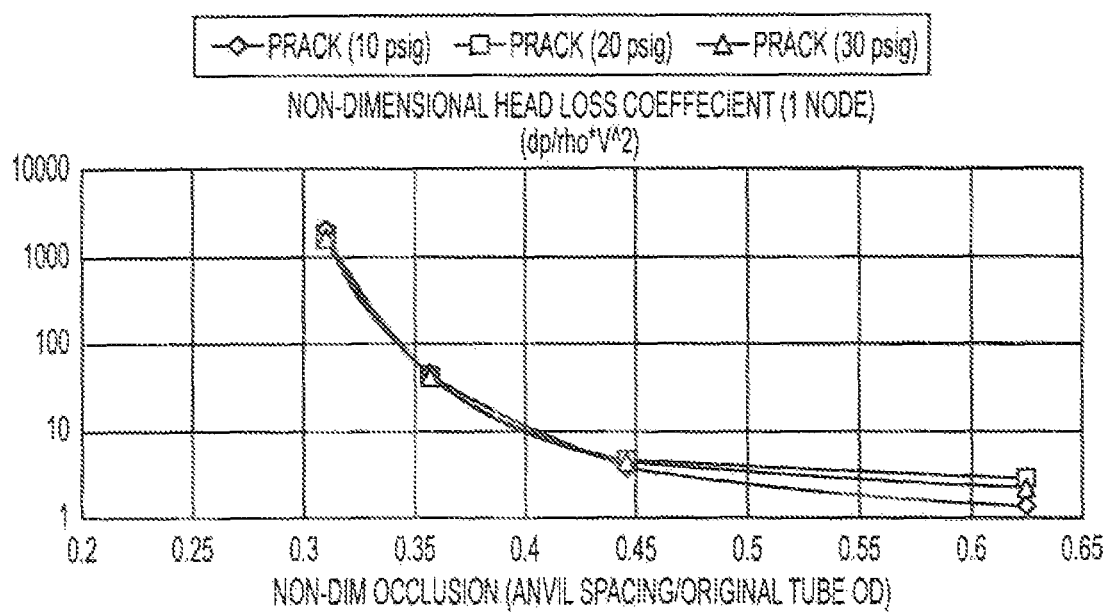
Figure 38B:
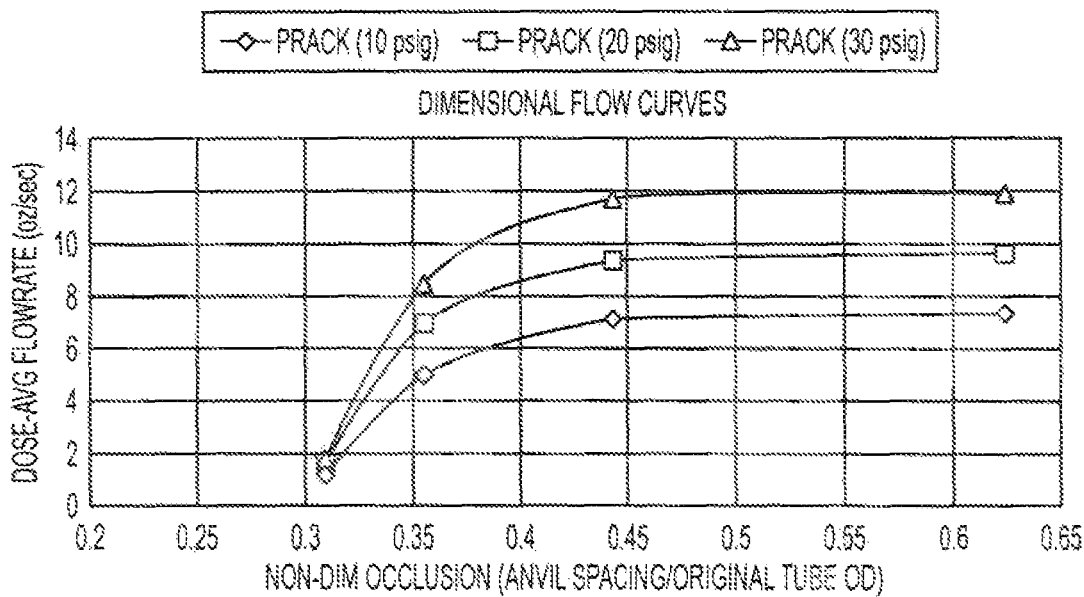
Figure 39A:
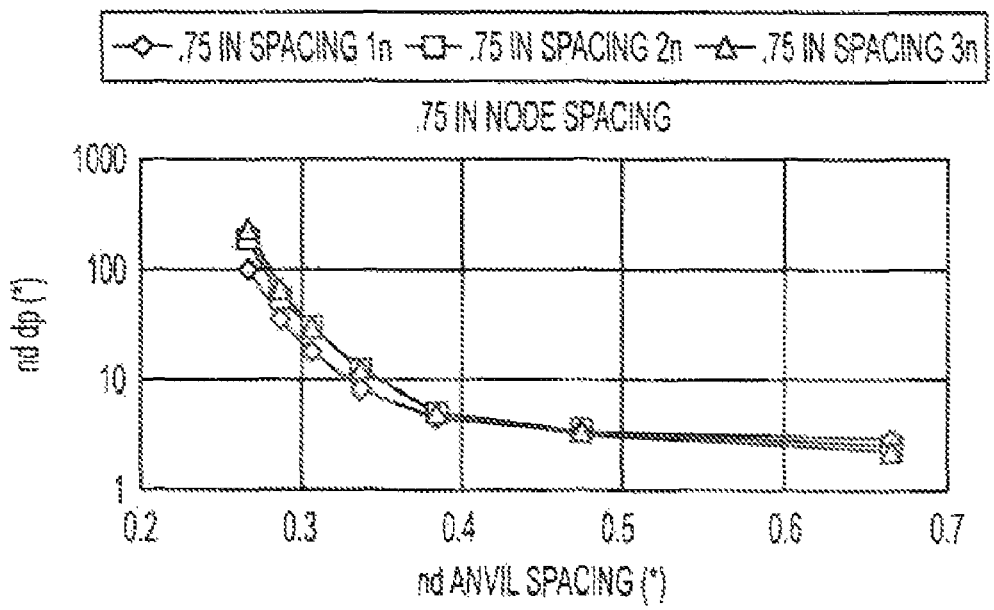
Figure 39B:
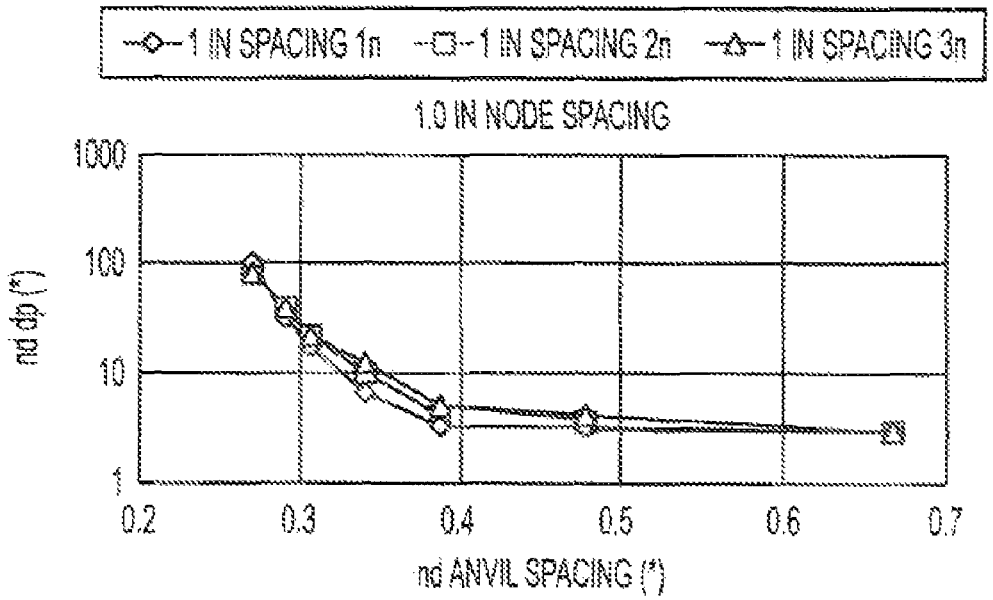
Figure 40A:
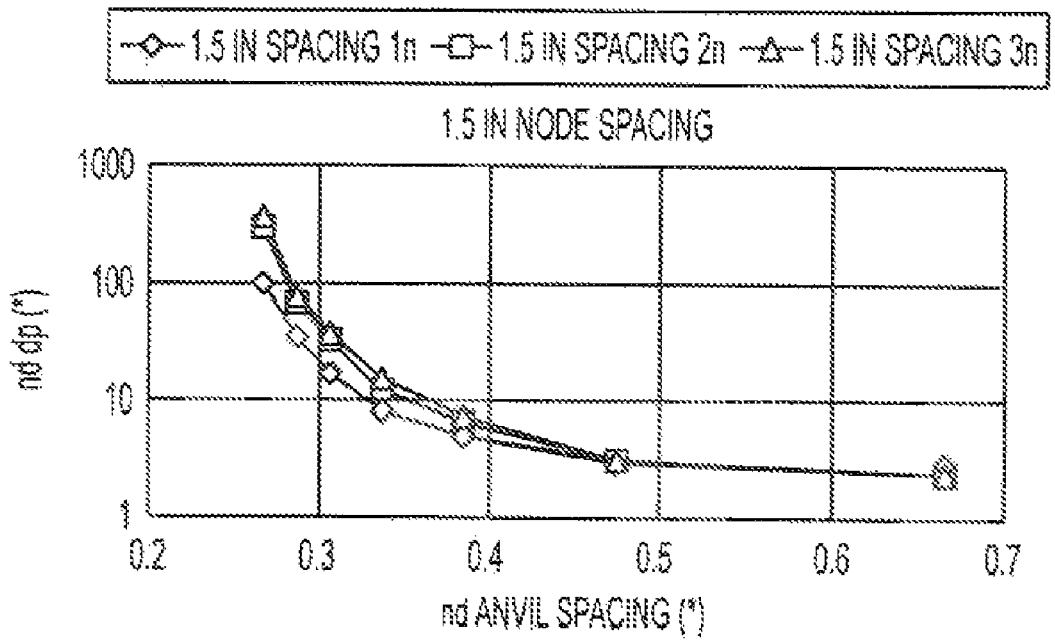
Figure 40B:
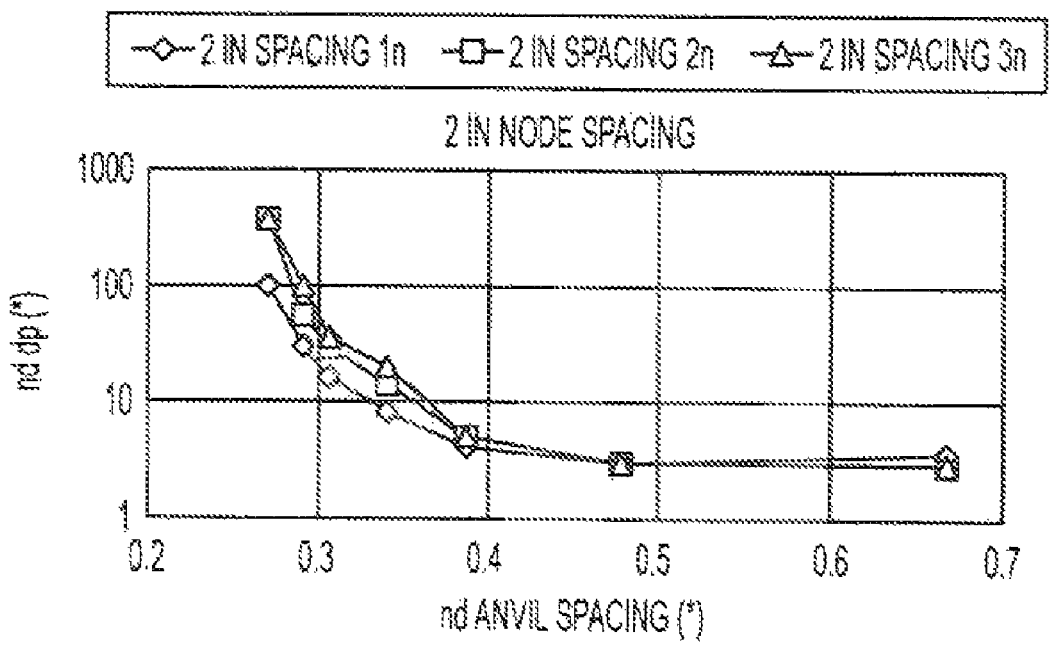
Figure 41A:
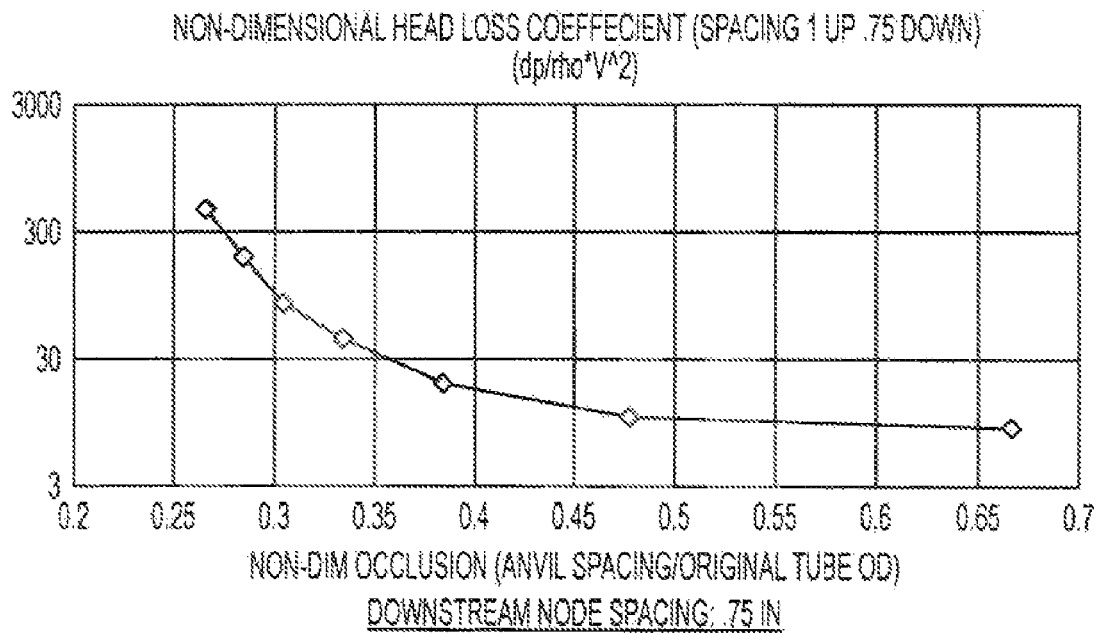
Figure 41B:
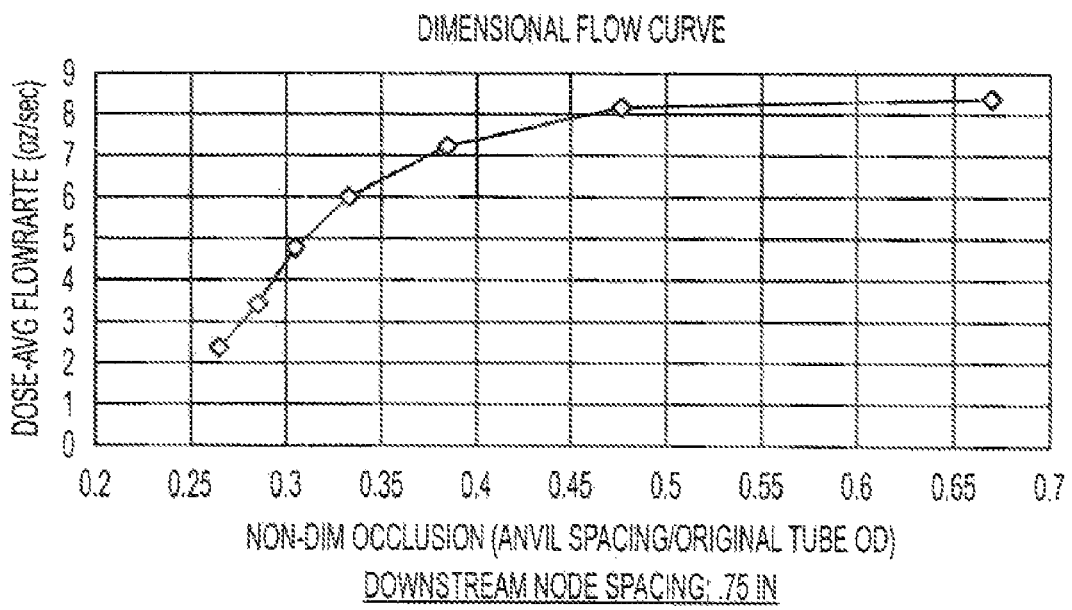
Figure 42A:
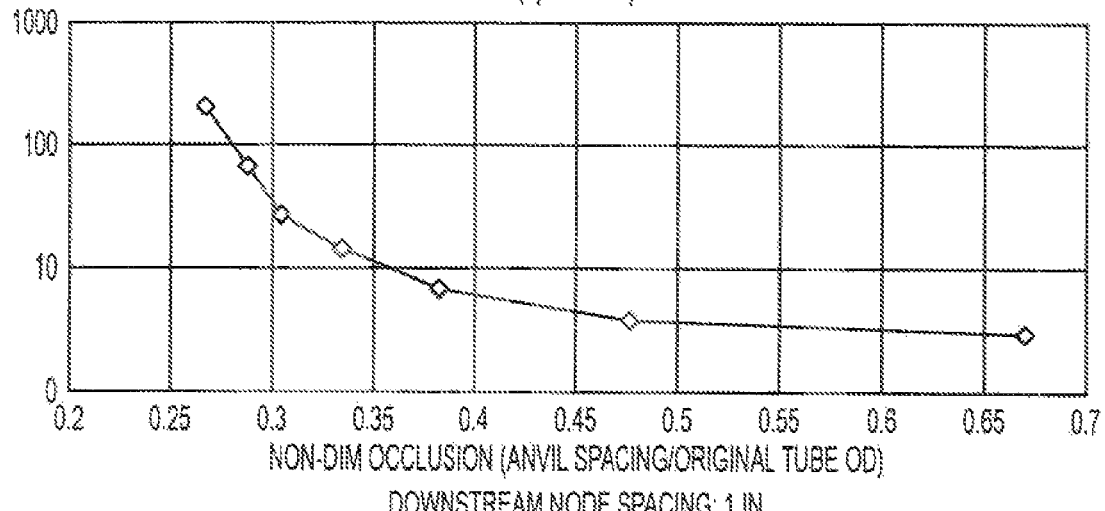
Figure 42B:
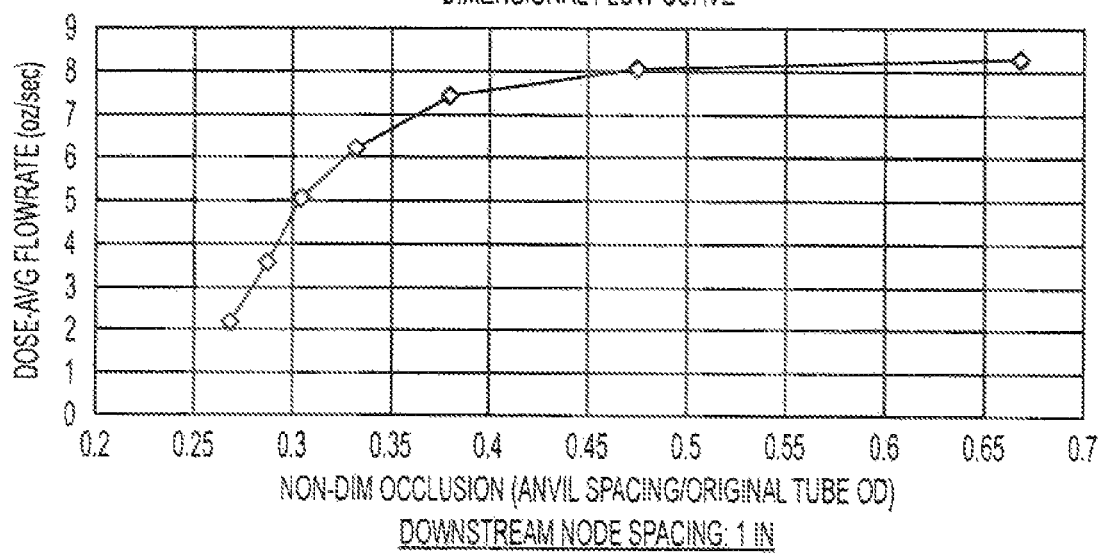
Figure 43A:
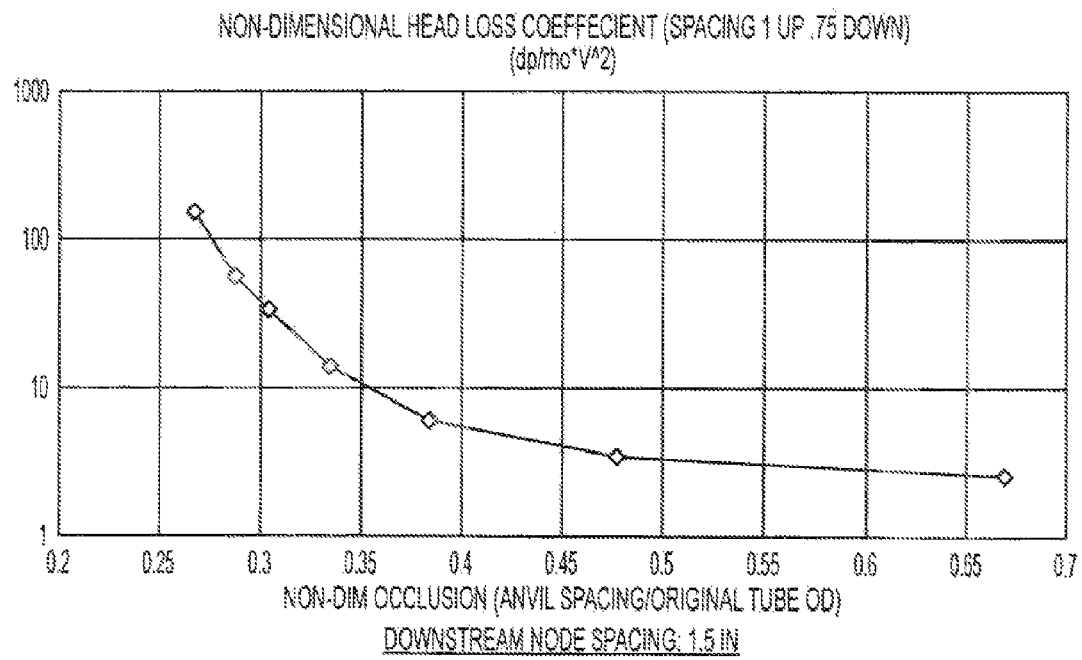
Figure 43B:
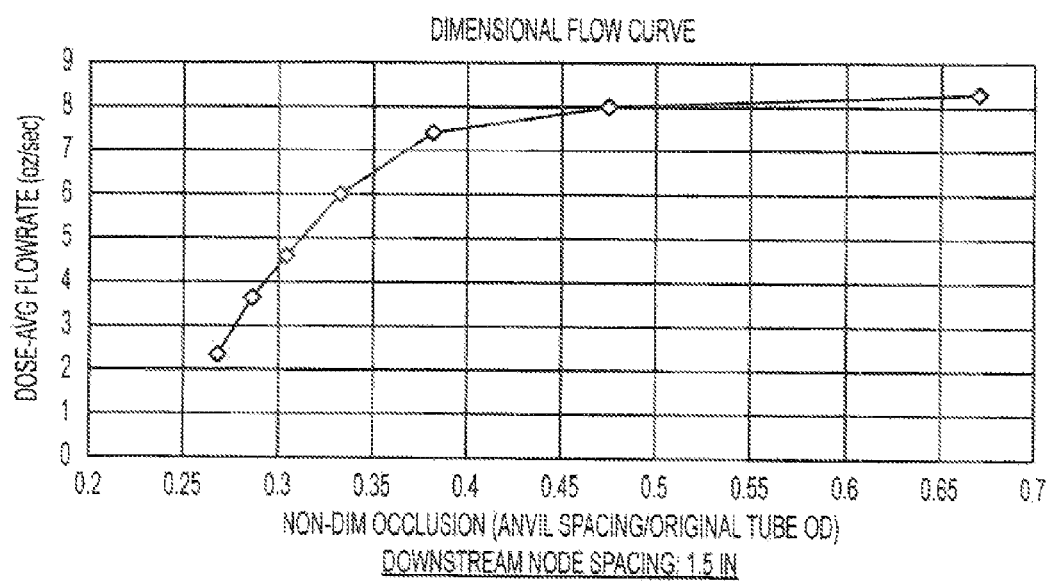
Figure 44:
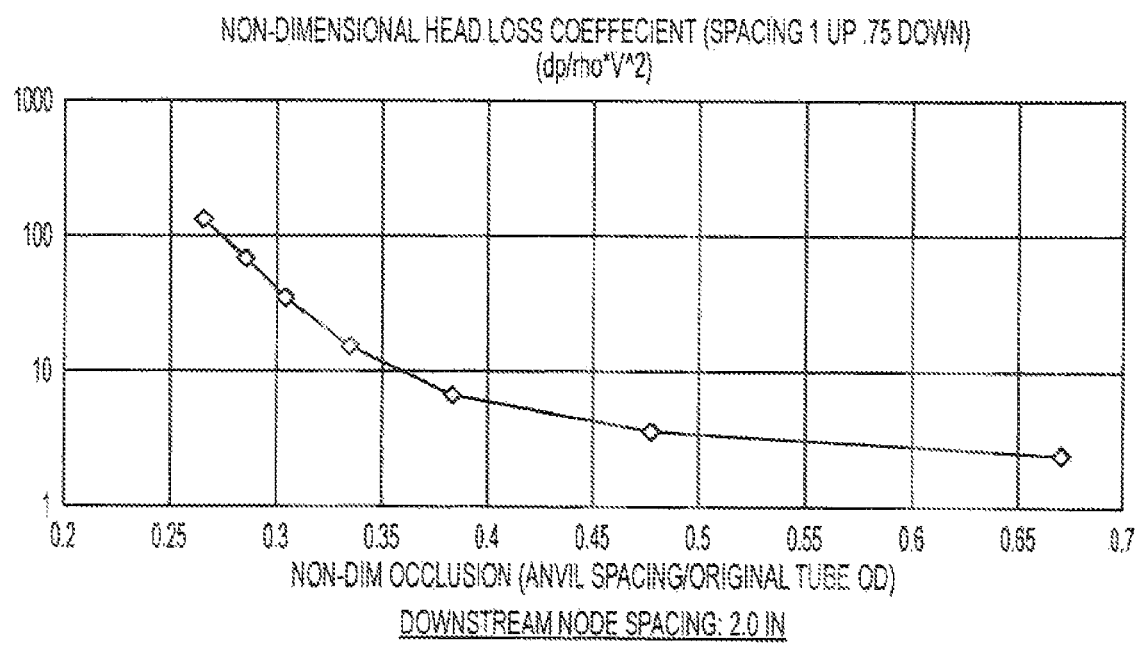
Figure 45:
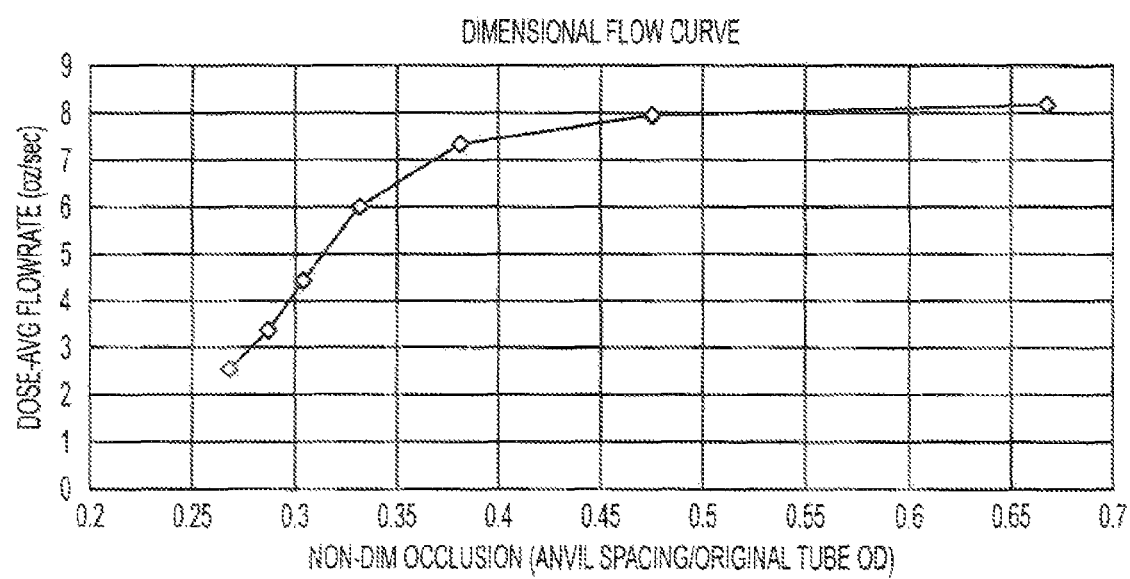

FIGS. 25 and 34 illustrate that a defined span of useful adjustment ranges, expressed as the flow orifice ratio span, increases as the number of series flow nodes in the flow control device increases. Thus, the resolution of flow adjustment per increment of flow rate change increases as the number of flow nodes increases. Therefore, by example in FIG. 25, a two flow nodes on one inch centers, the flow aperture ratio span to vary flow from two ounces per second to ten ounces per second is 0.21. At ten nodes on one inch centers and at the same flow pressure, the flow aperture ratio span to vary flow from over the same range is 0.27, which is an improvement over 28.5 percent.

A number of implementations of the control devices have been described. Nevertheless, it will be understood that various modifications may be made without departing from the spirit and scope of the invention. Accordingly, other implementations are within the scope of the following claims.

What is claimed is:

1. A digital flow control assembly for controlling the volumetric flow rate of fluids comprising:
   a fluid flow conduit;
   a plurality of serially-arranged flow nodes positioned along a length of the fluid flow conduit; and
   a controller for generating a signal to control one or more actuators to adjust one or more of the plurality of serially-arranged flow nodes to maintain a desired volumetric flow rate of fluid in the fluid flow conduit,
   wherein the spacing between the plurality of serially-arranged flow nodes is sufficient to provide an internal fluid flow wake structure that includes fluid separation and recirculation zones downstream of the flow nodes and substantial reattachment of the fluid to an inner wall of the conduit before a subsequent node is approached, and
   wherein the spacing between the plurality of serially-arranged flow nodes is an input to the controller.

2. The assembly of claim 1, wherein the plurality of serially-arranged flow nodes sum to define a total flow resistance through the fluid flow conduit.

3. The assembly of claim 2, wherein the flow resistance of each flow node is added in a manner equivalent to discrete electrical resistances.

4. The assembly of claim 1, wherein each of the plurality of flow nodes is discretely mechanically adjustable ranging from a minimum flow setting to a maximum flow setting.

5. The assembly of claim 1, wherein the fluid includes a liquid and a dissolved gas constituent and wherein the controller is configured to vary the flow rate of the fluid without dissolved gas leaving solution.

6. The assembly of claim 1, wherein each of the plurality of flow nodes is commonly mechanically adjustable ranging from a minimum flow setting to a maximum flow setting.

7. The assembly of claim 1, wherein each of the plurality of flow nodes is discretely actuated to allow electronically controlled adjustment of each nodal fluid flow restriction from a minimum setting to a maximum setting.

8. The assembly of claim 1, wherein all of the plurality of flow nodes are commonly actuated to allow electronically controlled adjustment of the flow rate through the digital flow control assembly ranging from a minimum flow setting to a maximum flow setting.

9. The assembly of claim 1, wherein a rate of fluid flow through the digital flow control assembly is incrementally altered by at least sixty percent of a total flow range value of the device in twenty milliseconds or less.

10. The assembly of claim 1, wherein a previously defined flow rate within the flow range of the digital flow control assembly is reproduced to within two tenths of one percent of a defined value under steady state inflow and outflow pressure conditions.

11. The assembly of claim 1, wherein the controller is configured to control at least one first fluid flow node to coarsely adjust fluid flow and to control at least one second fluid flow node to finely adjust fluid flow.

12. The assembly of claim 1, wherein one or more of the plurality of serially-arranged flow nodes can serve as a flow control valve in its fully closed position.

13. The assembly of claim 12, wherein the fully closed position of each flow node serving as a flow control valve is encoded.

14. The assembly of claim 12, wherein when one or more of the plurality of flow nodes serves as a flow control valve, the flow rate through the assembly allows the device to define a liquid batch or dose.

15. The assembly of claim 12, wherein two or more flow nodes serving as control valves provide redundant valving as a function of their series arranged structure.

16. The assembly of claim 6 or claim 8, further comprising:
   a common actuator for controlling the flow of the flow nodes;
   wherein the common actuator is encoded to provide one or more discrete position registrations or to provide digital or analog readout of the entire range of flow adjustment.

17. The assembly of claim 4 or claim 7, further comprising:
   one or more discrete actuators for controlling the flow of one or more of the plurality of flow nodes;
   wherein the one or more discrete actuators is encoded to provide one or more discrete position registrations or to provide digital or analog readout of the entire range of flow adjustment of the node.

18. The assembly of claim 1, wherein the plurality of serially-arranged flow nodes define an inter-nodal spacing between consecutive nodes that is variable to minimize liquid flow turbulence within a given flow rate range.

19. The assembly of claim 1, wherein the fluid flow conduit and plurality of flow nodes are constructed of rigid materials.

20. The assembly of claim 1, wherein the fluid flow conduit and plurality of flow nodes include a deformable or flexible conduit.

21. The assembly of claim 1, wherein the plurality of flow nodes can be variably spaced in order to accommodate flow system layout or spacing constraints.

22. The assembly of claim 1, wherein a plurality of fixed or manually adjustable flow control nodes are combined with a plurality of discretely automatically adjustable or commonly automatically adjustable flow control nodes within the same assembly.

23. The assembly of claim 1, wherein each of the plurality of flow nodes is discretely adjusted to a mechanically defined high flow opening and to a mechanically defined low flow opening, with all flow control nodes discretely and simultaneously shifted between the two flow positions.

24. The assembly of claim 1, wherein each of the plurality of flow nodes is commonly adjustable to a mechanically defined low flow opening and to a mechanically defined high flow opening, with all flow control nodes commonly and simultaneously shifted between the two flow positions.

25. The assembly of claim 1, wherein flow of fluid through the assembly is adjusted based upon at least one externally derived process signal selected from the group consisting of: temperature, pressure, pH, and conductivity.

26. The assembly of claim 1, further comprising:
   an inflow pressure sensor for measuring pressure just prior to entry of fluid into the digital flow control assembly; and
   an outflow pressure sensor for measuring pressure at a point just beyond the digital flow control assembly, wherein the inflow and outflow pressure sensors allow for a measurement of the volumetric flow rate through the assembly.

27. The assembly of claim 1, wherein the assembly can automatically adjust itself to a desired volumetric flow rate within an adjustable flow range of the assembly.

28. The assembly of claim 1, wherein one or more of the plurality of flow nodes is coarsely adjustable for purposes of establishing a flow rate through the assembly to within about 10 percent of the desired value and in which the remainder of the plurality of flow nodes is finely adjusted in order to adjust the coarse flow rate to within about 1 percent or less of the desired value.

29. The assembly of claim 1, wherein a gas saturated liquid at a defined temperature range can be flow rate controlled over a dynamic range of at least 8:1 without dissolved gas substantially leaving solution as a function of flow through the assembly.

30. The assembly of claim 1, wherein one or more of the plurality of serially-arranged flow nodes are mechanically or automatically adjusted to achieve linearization of flow rate across a variable flow range of the assembly.

31. The assembly of claim 1, wherein the plurality of serially-arranged flow nodes are controlled to prevent complete occlusion of the fluid flow conduit.

32. The assembly of claim 1, wherein the device for generating the signal includes a fluid flowmeter.

33. The assembly of claim 1, wherein the plurality of serially-arranged flow nodes are positioned along the length of the fluid flow conduit and disposed at the outer surface of the fluid conduit providing an unrestricted fluid flow pathway within the conduit that allows for liquid flow based cleaning and sanitizing of the beverage contact surfaces.

34. The assembly of claim 1, wherein the plurality of serially-arranged flow nodes are configured to reduce the amount of force necessary to compress the fluid conduit in order to achieve the desired flow rate.

35. The assembly of claim 1, wherein at least two of the plurality of flow nodes are simultaneously adjustable and at least two of the plurality of flow nodes are independently adjustable to provide a desired fluid flow restriction through the assembly.

36. The assembly of claim 1, wherein one or more of the plurality of flow nodes are independently adjustable and the remainder of the plurality of flow nodes are simultaneously adjustable to provide a desired fluid flow restriction through the assembly.

37. An assembly comprising:
a fluid flow conduit in fluid communication with a pressurized source and a dispenser;
a plurality of serially-arranged flow nodes positioned along a length of the fluid flow conduit; and
a controller for generating an electronic signal to control one or more actuators to automatically adjust one or more of the plurality of serially-arranged flow nodes to maintain a desired volumetric flow rate of fluid in the fluid flow conduit,
wherein the spacing between the plurality of serially-arranged flow nodes is sufficient to provide an internal fluid flow wake structure that includes fluid separation and recirculation zones downstream of the flow nodes and substantial reattachment of the fluid to an inner wall of the conduit before a subsequent node is approached, and
wherein the spacing between the plurality of serially-arranged flow nodes is an input to the controller.

38. An assembly comprising:
a fluid flow conduit in fluid communication with a pressurized source and a dispenser;
a plurality of serially-arranged flow nodes positioned along a length of the fluid flow conduit; and
a controller for generating an electronic signal to control one or more actuators to automatically adjust one or more of the plurality of serially-arranged flow nodes to maintain a desired volumetric flow rate of fluid in the fluid flow conduit,
wherein the spacing between adjacent ones of the plurality of serially-arranged flow nodes is an input to the controller.

* * * * *